United States Patent
Sun et al.

(10) Patent No.: US 11,960,800 B2
(45) Date of Patent: Apr. 16, 2024

(54) AUTOMATIC GENERATION OF FLEXIBLE LOAD DESIGN

(71) Applicant: Walmart Apollo, LLC, Bentonville, AR (US)

(72) Inventors: Ou Sun, Bentonville, AR (US); Minghui Liu, San Bruno, CA (US); Jing Huang, San Jose, CA (US); Mingang Fu, Palo Alto, CA (US); Joseph Wayne Hendricks, Bentonville, AR (US); Jamie Lee Hamilton, Dallas, TX (US)

(73) Assignee: WALMART APOLLO, LLC, Bentonville, AR (US)

( * ) Notice: Subject to any disclaimer, the term of this patent is extended or adjusted under 35 U.S.C. 154(b) by 364 days.

(21) Appl. No.: 17/161,559

(22) Filed: Jan. 28, 2021

(65) Prior Publication Data
US 2021/0150102 A1 May 20, 2021

Related U.S. Application Data

(63) Continuation-in-part of application No. 16/777,498, filed on Jan. 30, 2020, now Pat. No. 11,550,968, (Continued)

(51) Int. Cl.
*G06F 30/15* (2020.01)
*G06F 30/17* (2020.01)
*G06F 30/20* (2020.01)

(52) U.S. Cl.
CPC .............. *G06F 30/15* (2020.01); *G06F 30/17* (2020.01); *G06F 30/20* (2020.01)

(58) Field of Classification Search
CPC .. G06F 30/15; G06F 2111/06; G06F 2111/08; G06F 2113/20; G06F 30/20; G06F 30/17
See application file for complete search history.

(56) References Cited

U.S. PATENT DOCUMENTS

| 7,561,533 B2 | 7/2009 | Aklepi et al. |
| 9,171,277 B2 | 10/2015 | Rutt et al. |

(Continued)

FOREIGN PATENT DOCUMENTS

| CN | 103761635 | 4/2014 |
| CN | 106096881 A | 11/2016 |

(Continued)

OTHER PUBLICATIONS

Oliskevych, M. "Optimization of the load scheme of heavy vehicle for a given flow of goods." ECONTECHMOD: An International Quarterly Journal on Economics of Technology and Modelling Processes 6, No. 1 (2017): 55-62. (Year: 2017).*

(Continued)

*Primary Examiner* — Eunhee Kim
(74) *Attorney, Agent, or Firm* — BRYAN CAVE LEIGHTON PAISNER LLP

(57) ABSTRACT

A system including one or more processors and one or more non-transitory computer-readable media storing computing instructions that, when executed on the one or more processors, perform certain acts. The acts can include obtaining an original load design for loading a trailer to deliver stacks of pallets to physical stores. The load design specifies a respective floor spot assignment for each of the stacks. The original load design satisfies center-of-gravity constraints. The acts also can include generating fluid groups of the stacks to form an initial fluid grouping. The acts additionally can include determining that the fluid groups do not collectively satisfy the center-of-gravity constraints. The acts further can include until the fluid groups collectively satisfy the center-of-gravity constraints, repeatedly determining one or more infeasible groups from the fluid groups, and adjusting at least one of the one or more infeasible groups to update the fluid groups. The acts additionally can include outputting a (Continued)

flexible load design comprising the fluid groups that collectively satisfy the center-of-gravity constraints. Other embodiments are described.

20 Claims, 21 Drawing Sheets

Related U.S. Application Data which is a continuation-in-part of application No. 16/712,783, filed on Dec. 12, 2019, now Pat. No. 11,494,731.

(60) Provisional application No. 62/798,911, filed on Jan. 30, 2019.

(56) References Cited

U.S. PATENT DOCUMENTS

| | | | |
|---|---|---|---|
| 9,665,845 | B2 | 5/2017 | Ye et al. |
| 9,881,263 | B2 | 1/2018 | Kim et al. |
| 10,161,746 | B2 | 12/2018 | Ochsendorf et al. |
| 10,337,880 | B2 | 7/2019 | Koga et al. |
| 10,467,562 | B1 | 11/2019 | Mo et al. |
| 10,467,563 | B1 | 11/2019 | Mo et al. |
| 2002/0178074 | A1 | 11/2002 | Bloom |
| 2005/0149303 | A1 | 7/2005 | Agrawala et al. |
| 2005/0187711 | A1 | 8/2005 | Agrawala et al. |
| 2005/0246192 | A1 | 11/2005 | Jauffred et al. |
| 2008/0065262 | A1 | 3/2008 | Gottlieb et al. |
| 2008/0077464 | A1 | 3/2008 | Gottlieb et al. |
| 2008/0140597 | A1 | 6/2008 | Satir et al. |
| 2008/0306795 | A1 | 12/2008 | Ho |
| 2008/0312991 | A1 | 12/2008 | Bharadwaj et al. |
| 2009/0228417 | A1 | 9/2009 | Rothberg |
| 2009/0254405 | A1 | 10/2009 | Hollis |
| 2010/0318437 | A1 | 12/2010 | Yee et al. |
| 2011/0022298 | A1 | 1/2011 | Kronberg |
| 2011/0317570 | A1 | 12/2011 | Likar et al. |
| 2012/0283868 | A1 | 11/2012 | Rutt et al. |
| 2013/0138330 | A1 | 5/2013 | Xu et al. |
| 2013/0159206 | A1 | 6/2013 | Barahona et al. |
| 2016/0011073 | A1 | 1/2016 | Long |
| 2016/0032725 | A1 | 2/2016 | Heidari et al. |
| 2016/0202941 | A1 | 7/2016 | McLeod |
| 2016/0300186 | A1 | 10/2016 | Scharaswak et al. |
| 2017/0154394 | A1 | 6/2017 | Kan et al. |
| 2018/0111698 | A1 | 4/2018 | Podnar et al. |
| 2018/0349849 | A1 | 12/2018 | Jones et al. |
| 2019/0213529 | A1 | 7/2019 | Donnelly et al. |
| 2019/0318629 | A1 | 10/2019 | Ranjan et al. |
| 2020/0242285 | A1 | 7/2020 | Huang et al. |
| 2020/0292375 | A1 | 9/2020 | Murray et al. |

FOREIGN PATENT DOCUMENTS

| | | |
|---|---|---|
| CN | 110175402 | 8/2019 |
| DE | 102007027993 | 12/2008 |
| EP | 2573041 | 3/2013 |
| GB | 2524952 | 10/2015 |
| JP | 2007191296 | 8/2007 |
| WO | 2017221233 | 12/2017 |

OTHER PUBLICATIONS

Pollaris, Hanne. "Loading constraints in vehicle routing problems: a focus on axle weight limits." (2017). 206 Pages. (Year: 2017).*
Wikipedia, "Vehicle Routing Problem," https://en.wikipedia.org/wiki/Vehicle_routing_problem, accessed on Jan. 27, 2020.
Olsson et al., "Automating the Planning of Container Loading for Atlas Copco: Coping with Real-Life Stacking and Stability Constraints," European Journal of Operational Research, vol. 280, Issue 3, pp. 1018-1034, Feb. 1, 2020, https://www.sciencedirect.com/science/article/abs/pii/S0377221719306368, Accessed Nov. 12, 2020.
Wei et al. "A simulated annealing algorithm for the capacitated vehicle routing problem with two-dimensional loading constraints," European Journal of Operatoinal Research 225 (2018) 843-859 2018.
Zhao et al. "A Novel Algorithm for Nesting of 3-Dimensional Parts," 2009 International Asia Symposium on Intelligent Interaction and Affective Computing—4 pages 2009.
Ghomi et al., "Three-Dimensional Container Loading: A Simulated Annealing Approach," International Journal of Applied Engineering Research ISSN 0973-4562 vol. 12, No. 7 (2017) pp. 1290-1304 2017.
Zhu et al., "A two-state tabu search algorithm with enhanced packing heuristics for the 3L-CVRP and M3L-CVRP," Computers & Operations Research 39 (2012) 2178-2195 2012.
Pollaris, Hanne. "Loading constraints in vehicle routing problems: a focus on axle weight limits." (2017). 206 Pages. (Year: 2017) 2017.
Ruan, Qingfang, et al. "A hybrid approach for the vehicle routing problem with three-dimensional loading constraints." Computers & Operations Research 40.6 (2013): 1579-1589. (Year: 2013) 2013.
Van Rijn, Sander, et al. "Optimizing highly constrained truck loadings using a self-adaptive genetic algorithm." 2015 IEEE Congress on Evolutionary Computation (CEC). IEEE, 2015. (Year: 2015) 2015.

* cited by examiner

2010

| Row | Roadside | Temp. | Curbside |
|---|---|---|---|
| 1 | ID1581 -- S3380 -- 2495 lbs -- W | -20°F | ID1677 -- S3380 -- 1734 lbs -- N |
| 2 | ID1675 -- S3380 -- 1295 lbs -- N | | ID1504 -- S3380 -- 2727 lbs -- W |
| 3 | ID9243 -- S3380 -- 1339 lbs -- N | 32°F | ID6432 -- S3380 -- 968 lbs -- W |
| 4 | ID2318 -- S3380 -- 1364 lbs -- N | | ID6709 -- S3380 -- 673 lbs -- W |
| 5 | ID1506 -- S3380 -- 1218 lbs -- N | | ID7618 -- S3380 -- 1450 lbs -- W |
| 6 | ID3749 -- S3261 -- 1389 lbs -- N | | ID8163 -- S3380 -- 1294 lbs -- W |
| 7 | ID8216 -- S3261 -- 1381 lbs -- N | | ID4619 -- S3261 -- 969 lbs -- W |
| 8 | ID2197 -- S3261 -- 1320 lbs -- N | | ID9461 -- S3261 -- 1319 lbs -- W |
| 9 | ID2349 -- S3261 -- 1300 lbs -- N | | ID4641 -- S3261 -- 1545 lbs -- W |
| 10 | ID5769 -- S3380 -- 1823 lbs -- N | 32°F / -20°F | ID5007 -- S3261 -- 1024 lbs -- N |
| 11 | ID5309 -- S3380 -- 1163 lbs -- N | -20°F | ID6749 -- S3380 -- 2822 lbs -- N |
| 12 | ID5813 -- S3380 -- 387 lbs -- N | | ID8115 -- S3380 -- 1879 lbs -- N |
| 13 | ID4317 -- S3380 -- 1988 lbs -- N | | ID6105 -- S3380 -- 1492 lbs -- N |

2020

| Row | Roadside | Temp. | Curbside |
|---|---|---|---|
| 1 | ID1581 -- S3380 -- 2495 lbs -- W | -20°F | ID1677 -- S3380 -- 1734 lbs -- N |
| 2 | ID1675 -- S3380 -- 1295 lbs -- N | | ID1504 -- S3380 -- 2727 lbs -- W |
| 3 | ID9243 -- S3380 -- 1339 lbs -- N | 32°F | ID6432 -- S3380 -- 968 lbs -- W |
| 4 | ID2318 -- S3380 -- 1364 lbs -- N | | ID6709 -- S3380 -- 673 lbs -- W |
| 5 | ID1506 -- S3380 -- 1218 lbs -- N | | ID7618 -- S3380 -- 1450 lbs -- W |
| 6 | ID3749 -- S3261 -- 1389 lbs -- N | | ID8163 -- S3380 -- 1294 lbs -- W |
| 7 | ID8216 -- S3261 -- 1381 lbs -- N | 32°F | ID4619 -- S3261 -- 969 lbs -- W |
| 8 | ID2197 -- S3261 -- 1320 lbs -- N | | ID9461 -- S3261 -- 1319 lbs -- W |
| 9 | ID2349 -- S3261 -- 1300 lbs -- N | | ID4641 -- S3261 -- 1545 lbs -- W |
| 10 | ID5769 -- S3380 -- 1823 lbs -- N | 32°F / -20°F | ID5007 -- S3261 -- 1024 lbs -- N |
| 11 | ID5309 -- S3380 -- 1163 lbs -- N | -20°F | ID6749 -- S3380 -- 2822 lbs -- N |
| 12 | ID5813 -- S3380 -- 387 lbs -- N | | ID8115 -- S3380 -- 1879 lbs -- N |
| 13 | ID4317 -- S3380 -- 1988 lbs -- N | | ID6105 -- S3380 -- 1492 lbs -- N |

AUTOMATIC GENERATION OF FLEXIBLE LOAD DESIGN

CROSS-REFERENCE TO RELATED APPLICATIONS

This application is a continuation-in-part of U.S. patent application Ser. No. 16/777,498, filed Jan. 30, 2020, now U.S. Pat. No. 11,550,968, which is a continuation-in-part of U.S. patent application Ser. No. 16/712,783, filed Dec. 12, 2019, now U.S. Pat. No. 11,494,731, which claims the benefit of U.S. Provisional Application No. 62/798,911, filed Jan. 30, 2019. U.S. patent application Ser. Nos. 16/777,498 and 16/712,783, and U.S. Provisional Application No. 62/798,911 are incorporated herein by reference in their entirety.

TECHNICAL FIELD

This disclosure relates generally to automatic generation of load and route design.

BACKGROUND

Delivery trailers are often used to transport orders. Generally, the items in an order are prepared into stacks for transport. Stacks typically involve items stacked on pallets, and the stacks are often wrapped to keep the items from falling out from the stack. Such stacks can be loaded into the delivery trailer for transport, then unloaded at a destination. Some delivery routes involve multiple destinations.

BRIEF DESCRIPTION OF THE DRAWINGS

To facilitate further description of the embodiments, the following drawings are provided in which:

FIG. 20 illustrates a user interface display of an original load design for a tri-temp trailer and a user interface display of a flexible load design that includes fluid groups for the tri-temp trailer.

Figure 1:
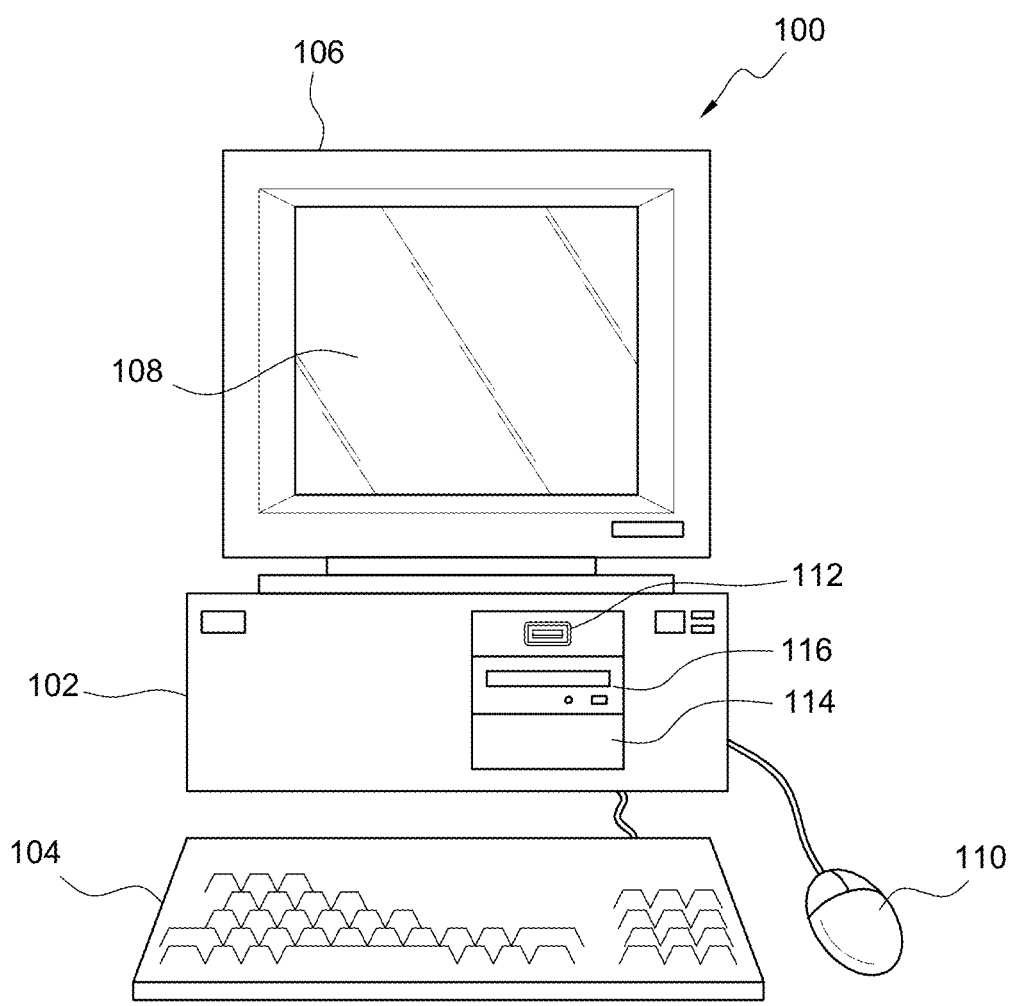
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 millisecond (ms), 10 ms, 50 ms, 100 ms, 500 ms, or 1 second (s).

DESCRIPTION OF EXAMPLES OF EMBODIMENTS

Figure 2:
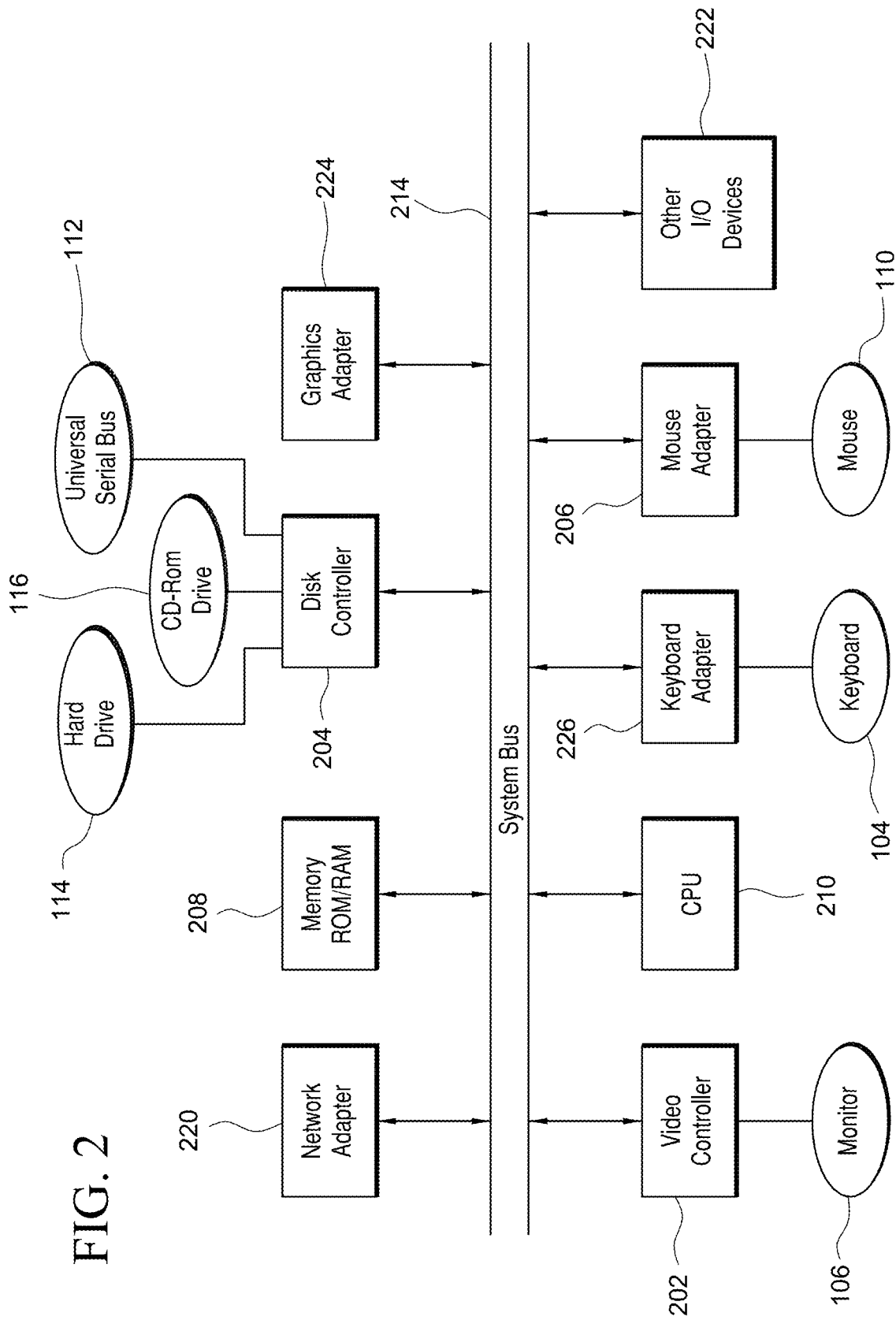
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIGS. 1-2). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
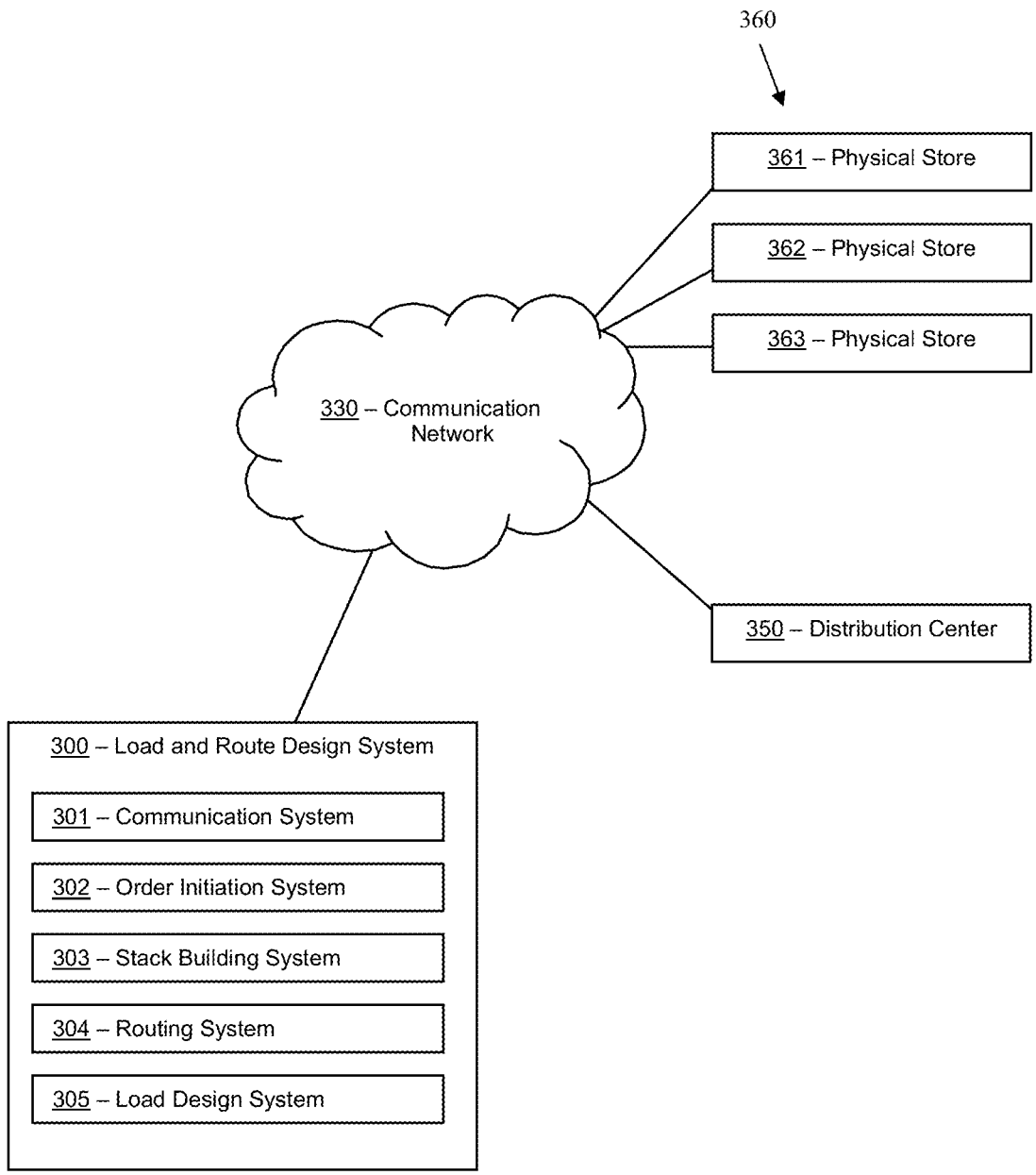
FIG. 3 illustrates a block diagram of a load and route design system that can be employed for automatic generation of load and route design, according to an embodiment.

Turning ahead in the drawings, FIG. 3 illustrates a block diagram of a load and route design system 300 that can be employed for automatic generation of load and route design, according to an embodiment. Load and route design system 300 is merely exemplary and embodiments of the system are not limited to the embodiments presented herein. The load and route design system can be employed in many different embodiments or examples not specifically depicted or described herein. In some embodiments, certain elements, modules, or systems of load and route design system 300 can perform various procedures, processes, and/or activities. In other embodiments, the procedures, processes, and/or activities can be performed by other suitable elements, modules, or systems of load and route design system 300. Load and route design system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of load and route design system 300 described herein.

In many embodiments, load and route design system 300 can be a computer system, such as computer system 100 (FIG. 1), as described above, and can each be a single computer, a single server, or a cluster or collection of computers or servers, or a cloud of computers or servers. In another embodiment, a single computer system can host load and route design system 300. Additional details regarding load and route design system 300 are described herein.

In some embodiments, load and route design system 300 can be in data communication through a communication network 330 with physical stores 360, which can include physical stores 361-363, for example, and distribution centers, such as distribution center 350. In several embodiments, each of the physical stores (e.g., 360) and each of the distribution centers (e.g., 350) can be a physical, brick-and-mortar location that are associated (e.g., operated by a common business entity or entities under common control) with load and route design system 300. In many embodiments, the physical stores (e.g., 360) and the distribution centers (e.g., 350) each can include one or more computer systems.

In a number of embodiments, each of physical stores 360 can be a retail store, such as a department store, a grocery store, or a super store (e.g., both a grocery store and a department store). In many embodiments, the distribution centers (e.g., 350) can provide the items sold at the physical stores (e.g., 360). For example, a distribution center (e.g., 350) can supply and/or replenish stock at the physical stores (e.g., 360) that are in a region of the distribution center. In many embodiments, a physical store (e.g., 361-363) can submit an order to a distribution center (e.g., 350) to supply and/or replenish stock at the physical store (e.g., 361-363). In many embodiments, distribution center 350 can be referred to as a warehouse or other facility that does not sell products directly to a customer.

In some embodiments, load and route design system 300 can be a distributed system that includes one or more systems in each of the distribution centers (e.g., 350). In other embodiments, load and route design system 300 can be a centralized system that communicates with computer systems in the physical stores (e.g., 360) and distribution centers (e.g., 350). In some embodiments, communication network 330 can be an internal network that is not open to the public, which can be used for communications between load and route design system 300, physical stores (e.g., 360), and distribution centers (e.g., 350). In other embodiments, communication network 330 can be a public network, such as the Internet. In several embodiments, operators and/or administrators of load and route design system 300 can manage load and route design system 300, the processor(s) of load and route design system 300, and/or the memory storage unit(s) of load and route design system 300 using the input device(s) and/or display device(s) of load and route design system 300, or portions thereof in each case.

In several embodiments, load and route design system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to load and route design system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of load and route design system 300. In a similar manner, the processors and/or the non-transitory computer-readable media can be local and/or remote to each other.

Meanwhile, in many embodiments, load and route design system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between load and route design system 300, physical stores 360, distribution center 350, and/or the one or more databases can be implemented using any suitable manner of wired and/or wireless communication. Accordingly, load and route design system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 7:
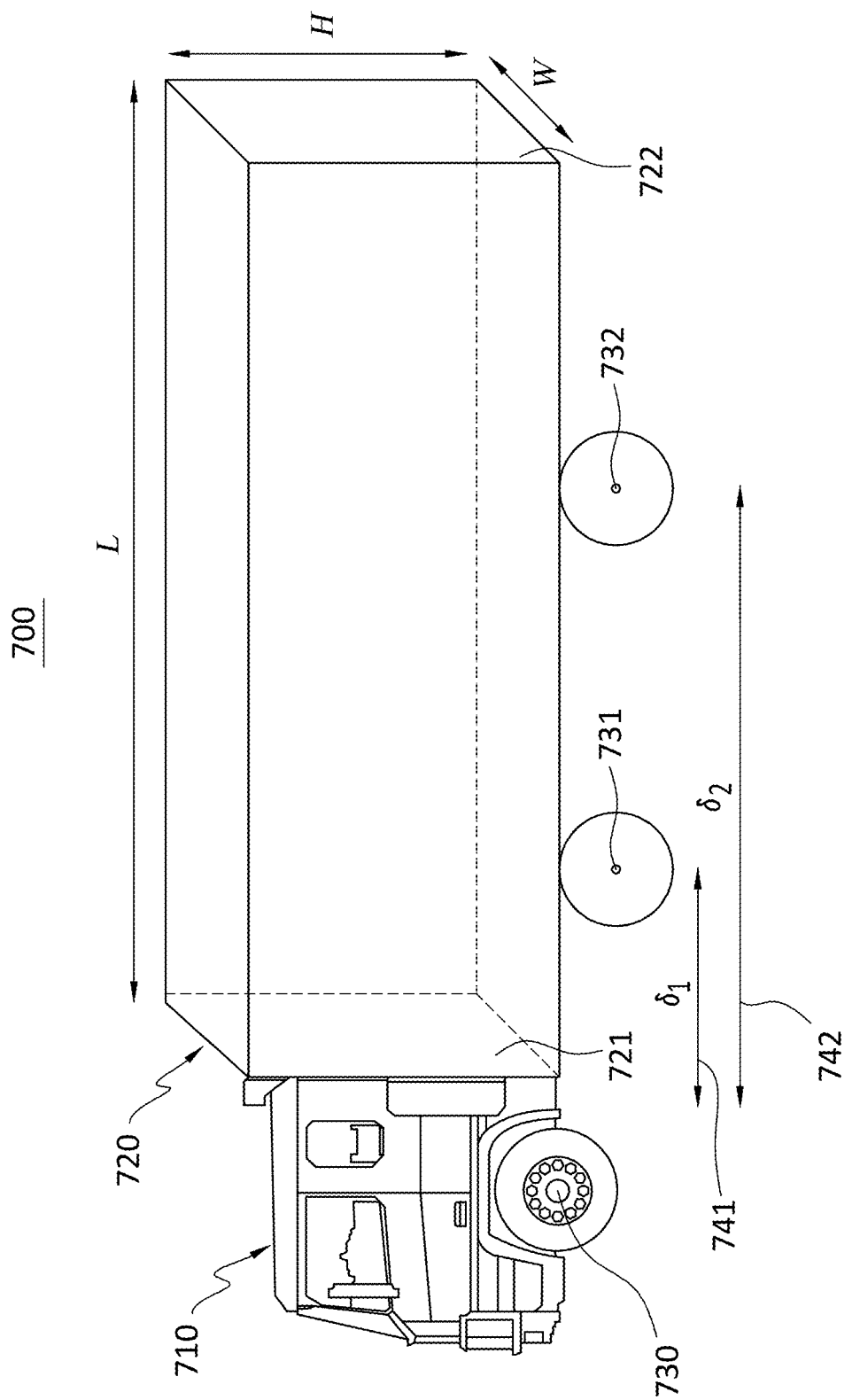
FIG. 7 illustrates a top, left side perspective view of a semi-trailer truck including a tractor and a trailer.

In several embodiments, load and route design system 300 can receive an order for a physical store (e.g., 361-363) and can automatically design how the order will be fulfilled from a distribution center to delivery at the store. In a number of embodiments, load and route design system 300 can determine pallets to be used for items in the order, how to build stacks of the pallets to be shipped in trailers, designing and/or obtaining routes to be used for the trailers, and designing loads within the trailers for these routes. In several embodiments, the trailers each can be any form of road haulage shipping container or compartment, such as a semi-trailer, a full trailer, etc. For example, the trailers can be similar or identical to trailer 720 which is attached to tractor 710, as shown in FIG. 7 and described below.

In many embodiments, load and route design system 300 can include a communication system 301, an order initiation system 302, a stacking building system 303, a routing system 304, and/or a load design system 305. In many embodiments, the systems of load and route design system 300 can be modules of computing instructions (e.g., software modules) stored at non-transitory computer readable media that operate on one or more processors. In other embodiments, the systems of load and route design system 300 can be implemented in hardware. Load and route design system 300 can be a computer system, such as computer system 100 (FIG. 1), as described above, and can be a single computer, a single server, or a cluster or collection of computers or servers, or a cloud of computers or servers. In another embodiment, a single computer system can host load and route design system 300. Additional details regarding load and route design system 300 and the components thereof are described herein.

Figure 4:
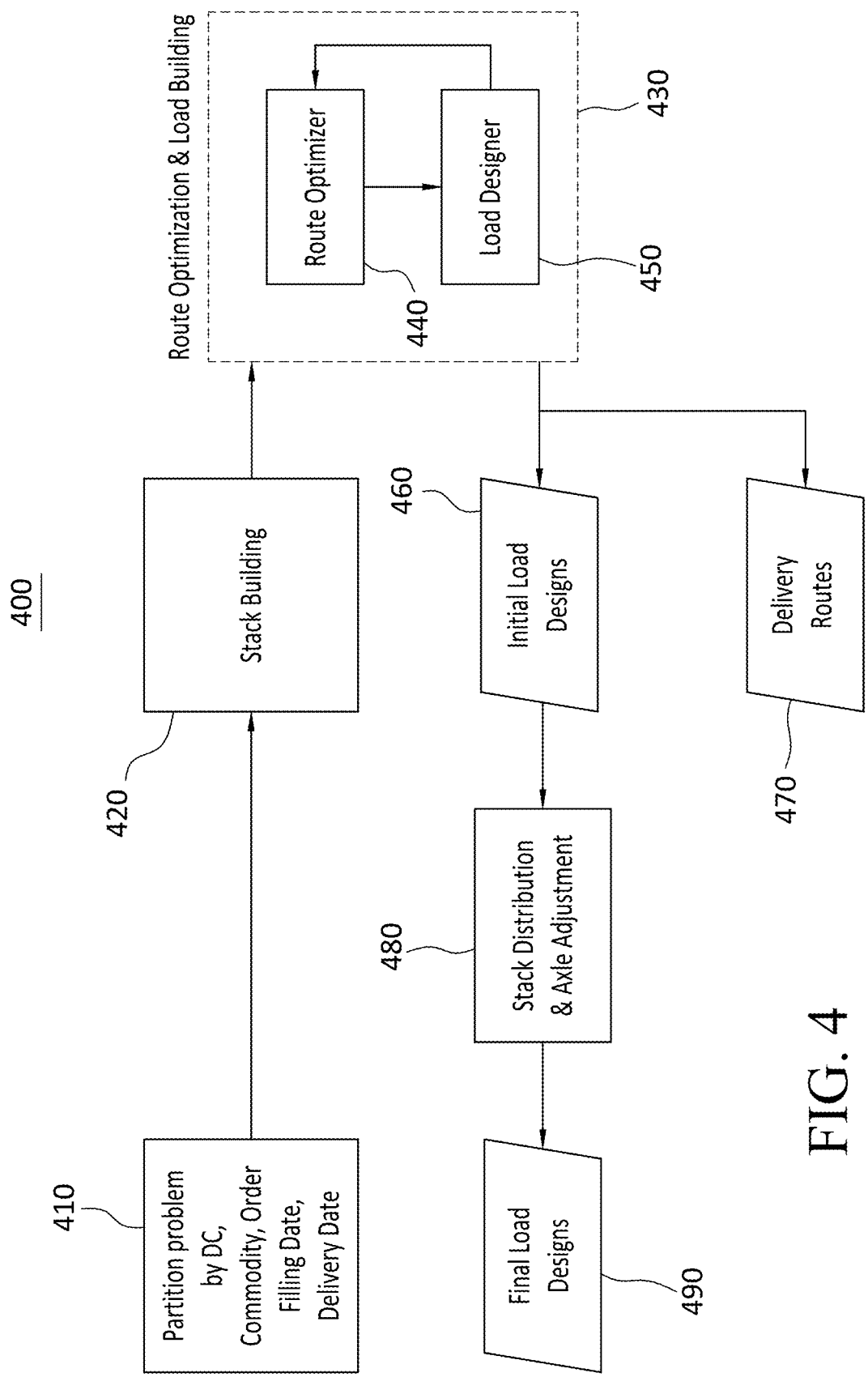
FIG. 4 illustrates a block diagram of acts, modules, and outputs, which can be employed for automatic generation of load and route design, according to an embodiment.

Turning ahead in the drawings, FIG. 4 illustrates a block diagram 400 of acts, modules, and outputs, which can be employed for automatic generation of load and route design, according to an embodiment. Block diagram 400 is merely exemplary and embodiments of the acts, modules, and outputs are not limited to the embodiments presented herein. The acts, modules, and outputs can be employed in many different embodiments or examples not specifically depicted or described herein. In some embodiments, certain elements of block 400 can perform, involve, and/or be generated by involve various procedures, processes, and/or activities. In other embodiments, the procedures, processes, and/or activities can be performed by, and the outputs can be generated by, other suitable elements of block 400. In many embodiments, block 400 can be implemented by load and route design system 300 (FIG. 3).

In many embodiments, block diagram 400 can begin at block 410 of receiving orders and performing initial processing. For example, the orders can be partitioned into the different distribution centers (e.g., 350 (FIG. 3)) to be used to fulfill the orders. As another example, the different types of items in the order can be determined in order to determine what categories of items are included in the order. The types of items (also referred to as "commodity types") can include (a) "MP," which can include meats and produce, which can involve temperature control; (b) "FDD," which can include food, dairy, and deli, which can involve temperature control; and (c) "dry," which can include any other items that do not require temperature control. As another example, the order can include a requested delivery date, which can be the day that the physical store (e.g., 361-363 (FIG. 3)) requests to receive the shipment of the order. In many embodiments, an order filling date can be calculated based on the requested delivery date. The order filling date can be the date that the order is filled at the distribution center (e.g., 350 (FIG. 3)) and placed on a trailer.

In several embodiments, block diagram 400 also can include a block 420 of stack building. In many embodiments, each of the types of items in the order can be stored in the distribution center (e.g., 350 (FIG. 3)) on separate pallets. For example, the order can include an order for one pallet of a particular brand of flour, and two pallets of a particular brand of sugar. In several embodiments, the pallets can be arranged into stacks at the distribution center (e.g., 350 (FIG. 3)). Block 420 can involve designing how the pallets should be stacked into a customized (e.g., optimized) arrangement, which can limit the amount of floor spots that will be used in the trailer when the stacks are shipped to the physical store (e.g., 361-363 (FIG. 3)).

Figure 9:
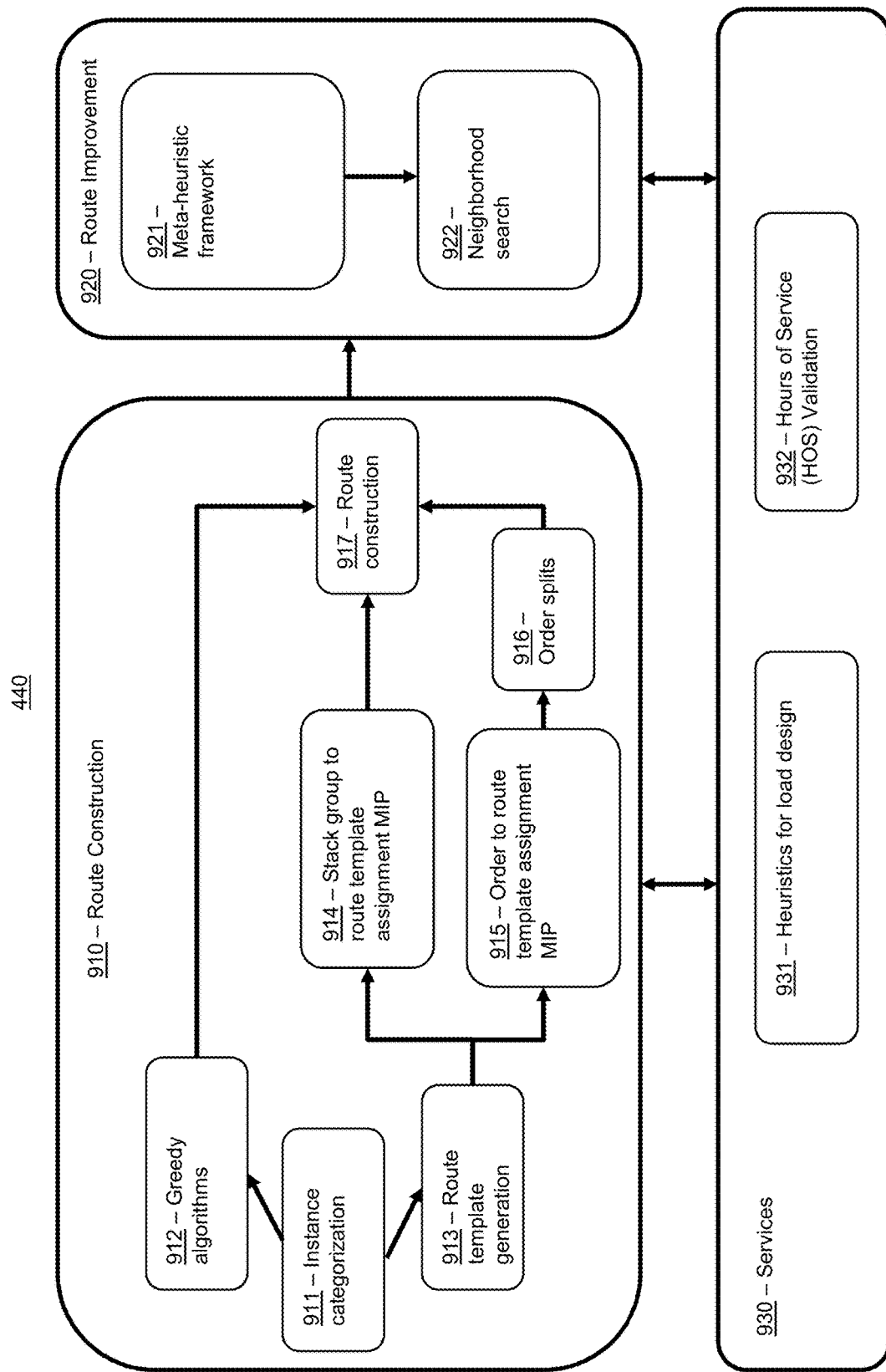
FIG. 9 illustrates a flow chart for a block of route optimizing, according to the embodiment of FIG. 4.

In many embodiments, block diagram 400 additionally can include a block 430 of route optimization and load building. In many embodiments, block 430 can include a block 440 for a route optimizer and a block 450 for a load designer. In many embodiments, the number of stacks that will be built to fill an order can be determined once block 420 of stacking building is completed. Each of these stacks can have a weight, which can be determined based on the weights of the pallets in the stacks. Each order has a destination at a physical store (e.g., 361-363 (FIG. 3)). Block 440 of route optimizing can determine a route for each trailer to go to deliver the orders. In many cases, a trailer can carry more than one order, such as two order or three orders, so the routes can be designed such that the trailer carries multiple orders to limit total distances traveled and/or total transit time across all the trailers involved in delivering the orders. In a number of embodiments, block 440 can be implemented as shown in FIG. 9 and described below. In many embodiments, blocks 440 and 450 are grouped in block 430 because route determination can involve determining an initial load design, the determining the stops at physical stores (e.g., 361-363 (FIG. 3)) on a route can involve determining the orders that will be included in a load that will leave the distribution center (e.g., 350) in a trailer. In many embodiments, route optimizer also can consider rest constraints on drivers to allow drivers delivering the trailers to have sufficient rest.

In a number of embodiments, block 430 can generate initial load designs, which can be stored in a block 460 of storing initial load design, and/or can generate delivery routes, which can be stored in a block 470 of storing the delivery routes. The initial load designs can include the orders that will be included in a trailer. The delivery routes can include the schedule of stops for the trailer.

In several embodiments, block diagram 400 further can include a block 480 of completing the load design, which can include a stack distribution and axle adjustment. In many embodiments, completing the load design can involve using the initial load designs, such as those generated in block 430 and stored in block 460, and determining how the stacks in the orders will be assigned to floor spots in the trailer in order to satisfy the schedule of stops and weight distribution requirements.

In a number of embodiments, block 480 can generate final load designs, which can be stored in a block 490 of storing the final load designs. These final load designs can then be used, together with the delivery routes stored in block 470 to fulfill and/or physically deliver the orders from the distribution centers (e.g., 350 (FIG. 3)) to the physical stores (e.g., 361-363 (FIG. 3)) using the trailers according to the plans in the final load designs and the delivery routes.

Figure 5:
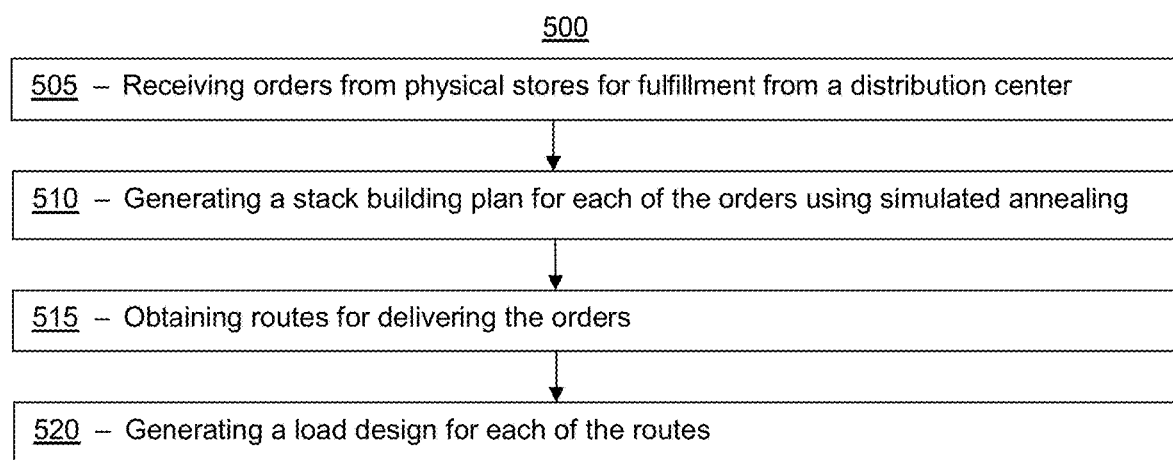
FIG. 5 illustrates a flow chart for a method, according to another embodiment.

Turning ahead in the drawings, FIG. 5 illustrates a flow chart for a method 500, according to another embodiment. In some embodiments, method 500 can be a method of automatically generating load and route design. Method 500 is merely exemplary and is not limited to the embodiments presented herein. Method 500 can be employed in many different embodiments or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped.

In many embodiments, load and route design system 300 (FIG. 3) can be suitable to perform method 500 and/or one or more of the activities of method 500. In these or other embodiments, one or more of the activities of method 500 can be implemented as one or more computing instructions configured to run at one or more processors and configured to be stored at one or more non-transitory computer readable media. Such non-transitory computer readable media can be part of a computer system such as load and route design system 300 (FIG. 3). The processor(s) can be similar or identical to the processor(s) described above with respect to computer system 100 (FIG. 1).

In some embodiments, method 500 and other blocks in method 500 can include using a distributed network including distributed memory architecture to perform the associated activity. This distributed architecture can reduce the impact on the network and system resources to reduce congestion in bottlenecks while still allowing data to be accessible from a central location.

Referring to FIG. 5, method 500 can include a block 505 of receiving orders from physical stores for fulfillment from a distribution center. The physical stores can be similar or identical to physical stores 360 (FIG. 3). The distribution center can be similar or identical to distribution center 350 (FIG. 3). In several embodiments, each of the orders can include a set of items and a requested delivery date. In many embodiments, an order filling date can be determined for each of the orders based at least in part on the requested delivery date of each respective one of the orders. In many embodiments, block 505 can include various acts of block 410 (FIG. 4).

In several embodiments, method 500 also can include a block 510 of generating a stack building plan for each of the orders using simulated annealing. In many embodiments, the stack building plan can minimize the number of stacks created for an order using the pallets that will be used to fulfill the order. By limiting the number of stacks created for the order, the number of floor spots used in the trailer can be minimized, which can allow more orders to be fulfilled in fewer total loads. In many embodiments, generating the stack building plan for each of the orders using simulated annealing can include, for each of the orders, determining the stack building plan for the order using simulated annealing to minimize a quantity of stacks to be built from pallets for the items in the order subject to a stack height limit, pallet stacking rules, and temperate range rules. In many embodiments, block 510 can include various acts of block 420 (FIG. 4).

A typical pallet is a frame (often a wood frame, but sometimes a plastic frame or metal frame) measuring approximately 40 inches by approximately 48 inches, with layers of products above the frame. For example, a pallet of sugar can include packages of sugar in piled in layers above the frame for a certain height, such as 4 feet, for example. A pallet is often wrapped with a plastic wrap to secure the products to the pallet and prevent the products from falling and/or spilling off of the pallet.

Pallets can be stacked to create a stack. A stack can be a sequence of pallets from bottom to top. A number of constraints can apply when building stacks from pallets. For example, the inside height of the trailer can limit the height of stacks, which can impose a stack height limit. For example, if the inside height of a trailer is approximately 111 inches, there can be a stack height limit of approximately 108 inches, for example, for that particular trailer. Depending on the stack height limit and the height of the individual pallets a stack can include one pallet, two pallets, three pallets, or four or more pallets.

Additional constraints for building stacks can include pallet stacking rules. In many embodiments, the pallet stacking rules can restrict certain types of pallets from being stacked above or below other types of pallets. For example, lighter pallets are typically stacked above heavier pallets within the same stack, and a pallet containing chemicals typically are not stacked above other pallets within the same stack. An exemplary set of pallet stacking rules is shown in Table 1, below.

TABLE 1

| Down | Up | | | | | | |
|---|---|---|---|---|---|---|---|
| | Any | Bottom | Chemical | Intact | Normal | Self Stack | Top |
| Any | 999 | | | X | X | | X |
| Bottom | X | 1 | | X | X | | X |
| Chemical | X | | 999 | X | X | | X |
| Intact | X | | | 999 | X | | X |
| Normal | X | | | | 999 | | X |
| Self Stack | | | | | | 999 | X |
| Top | | | | | | | 999 |

The rows in Table 1 indicate what types of pallets can be below the types of pallets in the columns, and the columns indicate what types of pallets can be above the types of pallets in the rows. A number indicates how many pallets are allowed, an X means unlimited, and a blank means not allowed. For example, the row for chemical indicates that a chemical pallet cannot be placed below the bottom pallet or below a self-stack pallet. The column for chemical indicates that a chemical pallet cannot be placed above any pallet except a chemical pallet.

Further constraints for building stacks can include temperature range rules. For example, a pallet that includes items at a certain temperature range (e.g., frozen, refrigerated, dry (non-refrigerated)) will be stacked with other pallets that include items at the same temperature range, not with pallets that include items at other temperature ranges.

Based on the order, the number of pallets and types of pallets (e.g., chemical, refrigerated, etc.) to be used to fill the order can be determined. Based on these inputs, an arrangement of the pallets in stacks can be generated to minimize the number of stacks that will include all the pallets in the order, subject to the stack height limit, the pallet stacking rules, and the temperate range rules. In some embodiments, constraint programming can be used to generate the arrangements of the pallets in the stacks for the order, such as by modelling mathematically with integer programming.

In many embodiments, simulated annealing can be used to determine the stacking building plan. Simulated annealing can be used to determine a global minimum despite local minimums. In greedy heuristic algorithms, local minimums can be achieved, but the actual best solution, a global minimum, often is not achieved. In simulated annealing, a local minimum can be overcome by allowing worse outcomes to get out of the local minimum. Eventually, with a view of other options outside of the confines of local minimums, the algorithm can become greedy to achieve the global minimum. For example, initially, each computer representation of a pallet can be assigned to a separate computer representation of stack. A pallet can then be randomly selected to be moved to another stack, at a random position within the stack. If the move is feasible, based on the constraints, the move can be made in the computer representation. If there are fewer stacks than before the move, then the move can be viewed as a positive outcome. A greedy heuristic algorithm would test whether the move results in a positive outcome, and if so, the move would be made, and if not, the move would not be made. By contrast, simulated annealing can allow moves to be made for non-positive (negative or neutral) outcomes in an effort to escape a local minimum to achieve a lower global minimum. In many embodiments, after exploration of moves that are non-positive to escape one or more local minimum, the simulated annealing can become greedy to achieve the global minimum.

In a number of embodiments, method 500 additionally can include a block 515 of obtaining routes for delivering the orders in trailers from the distribution center to the physical stores based at least in part on the stack building plan. The trailers can be similar or identical to trailer 720, as shown in FIG. 7 and described below. In many embodiments, a route can include a single order, multiple orders, or part of an order. In several embodiments, the routes can split an order across two of the trailers when a quantity of stacks in the order exceeds a floor spot capacity for one of the trailers, such as one of the trailers that has the highest floor spot capacity that is available to the distribution center. For example, if there are 32 floor spots in a trailer, and the number of stacks in an order is 40, the order can be split among two different routes for two different trucks. In many embodiments, block 515 can include various acts of block 430 (FIG. 4), block 440 (FIG. 4), block 450 (FIG. 4), block 460 (FIG. 4), and/or block 470 (FIG. 4). In some embodiments, the routes can be obtained from another system or another module of the system. In other embodiments, the routes can be determined, as described below.

In a number of embodiments, the routes for the trailers can be obtained using simulated annealing based at least in part on the stack building plan to determine routes that minimize distances subject to a weight constraint for each of the trailers and a floor spot capacity for each of the trailers. In many embodiments, the stack building plan can include the number of stacks in the order and the total weight of all of the stacks in the order. Each trailer can have a weight constraint, which can be the total amount of weight that the trailer can carry in a load. Each trailer also can have a floor spot capacity. Each floor spot can be an area of the trailer floor that can hold a stack. For example, because pallets are typically approximately 40 inches by approximately 48 inches in area, the stacks can have a bottom surface area of approximately 40 inches by approximately 48 inches. Each floor spot can hold a single stack, and can be approximately 40 inches by approximately 48 inches. The floor spot capacity of a trailer can be dependent on the inside length of the trailer and the inside width of the trailer.

The inside width of the trailer can determine the type of loading pattern used in the trailer. For example, FIG. 6(*a*) illustrates a top, rear, right side perspective view of a lengthwise loading pattern 610 for a trailer, which can include stacks, such as stacks 611 and 612. A trailer can allow a lengthwise loading pattern, which means positioning the stacks with the lengths along the cross-sectional width of the trailer, when the inside width of the trailer is greater than or equal to approximately 98 inches, which can fit two stacks lengthwise at approximately 48 inches a piece plus approximately 2 inches additional for buffer. For a trailer having an inside length of approximately 53 feet, the lengthwise loading pattern can allow a floor spot capacity of 30 stacks.

Figure 6A:
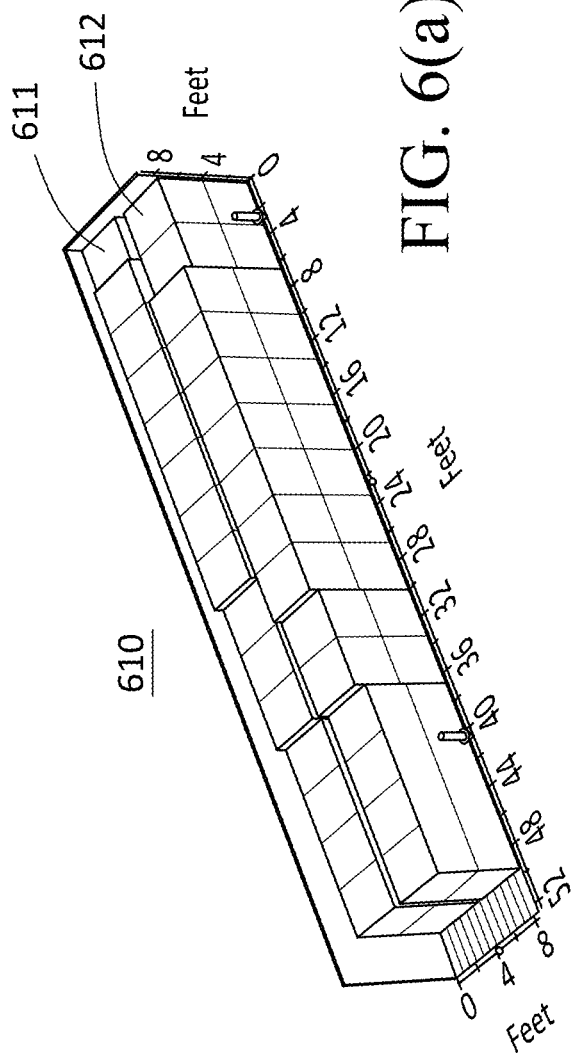
FIG. 6(a) illustrates a top, rear, right side perspective view of a lengthwise loading pattern for a trailer.
Figure 6B:
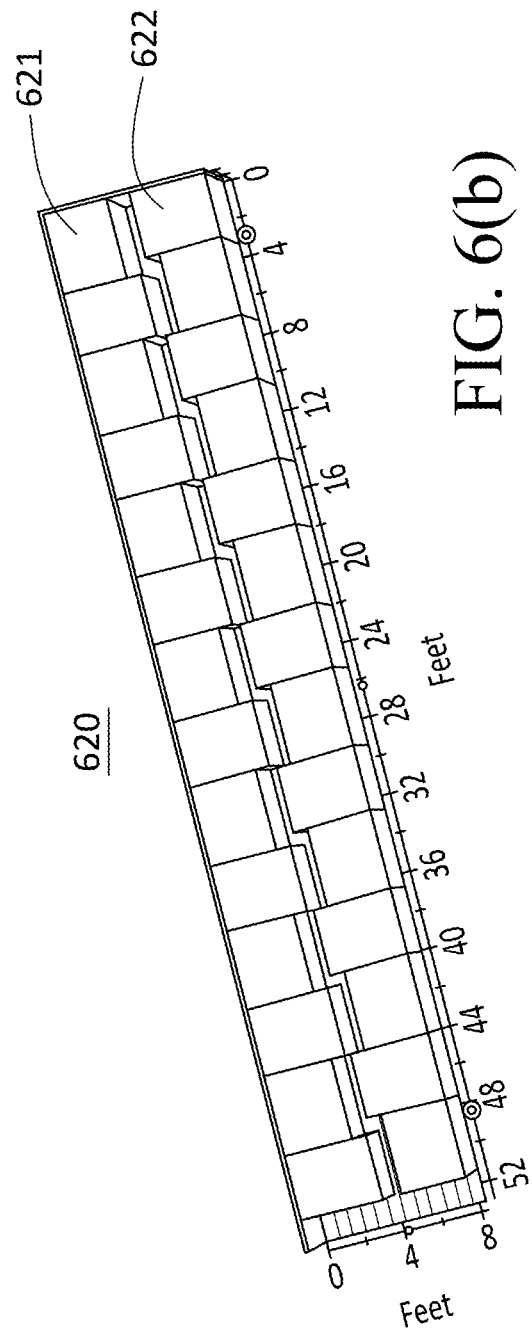
FIG. 6(b) illustrates a top plan view of a pinwheel loading pattern for a trailer.

FIG. 6(*b*) illustrates a top plan view of a pinwheel loading pattern 620 for a trailer, which can include stacks, such as stacks 621 and 622. When the inside width of the trailer is less than approximately 98 inches, two lengthwise stacks will not fit across the inside width. Instead, if the inside width of the trailer is greater than or equal to approximately 90 inches, the stacks can be arranged in the trailer in a "pinwheel" manner, in which one of the stacks across the inside width of the trailer is positioned lengthwise and the other stack is positioned widthwise. For a trailer having an inside length of approximately 53 feet, the pinwheel loading pattern can allow a floor spot capacity of 28 stacks.

When the inside width of the trailer is less than approximately 90 inches, the pinwheel loading pattern will not fit. Instead, as long as the inside width of the trailer is at least approximately 82 inches, a widthwise loading pattern can be used, in which the stacks are positioned with the widths of the stacks along the cross-sectional width of the trailer. For a trailer having an inside length of approximately 53 feet, the widthwise loading pattern can allow a floor spot capacity of 26 stacks.

In many embodiments, simulated annealing can be used to determine the routes. Simulated annealing can be used to determine a global optimum despite local optimums. As explained above, in greedy heuristic algorithms, local optimums can be achieved, but the actual best solution, a global optimum, often is not achieved. In simulated annealing, a local optimum can be overcome by allowing worse outcomes to get out of the local optimum. Eventually, with a view of other options outside of the confines of local optimums, the algorithm can become greedy to achieve the global optimum. For example, initially, each computer representation of an order can be assigned to a separate computer representation of a route using a computer representation of a trailer. An order can then be randomly selected to be moved to another route, at a sequence within the route. If the move of the order to the route with the trailer is feasible, based on the constraints of the number of stacks in the order, the total weight of the stacks in the order, the floor spot capacity of the trailer, and the weight constraints of the trailer, then the move can be made in the computer representation. If the total distances traveled and/or total transit time for all the orders is decreased, then the move can be viewed as a positive outcome. A greedy heuristic algorithm would test whether the move results in a positive outcome, and if so, the move would be made, and if not, the move would not be made. By contrast, simulated annealing can allow moves to be made for non-positive (negative or neutral) outcomes in an effort to escape a local minimum to achieve a lower global minimum. In many embodiments, after exploration of moves that are non-positive to escape one or more local minimum, the simulated annealing can become greedy to achieve the global minimum.

In several embodiments, the routes, as obtained and/or determined, can include a sequence of delivery for the orders in the load of the trailer that will be used for the route. The sequence of delivery can be viewed as sequence-of-delivery constraints to be satisfied when generating a load design in block 530, described below.

In many embodiments, the routes can include a driving schedule generated subject to rest constraints. Rest constraints can be based on legal regulations, company policies, and/or driver specifications, for example. For example, in the United States, the U.S. Department of Transportation (DOT) requires that drivers have 10 hours or rest for every 10 hours of driving. In a number of embodiments, the schedule can be generated based on cumulative driving time and rest time. For example, if the number of hours to be driven in a day will exceed 10 hours, an additional ten hours can be added to the transit time to allow for rest. For example, if the following condition is satisfied, then an additional ten hours can be added to the driving time:

$$(\text{origin's cumulative time} + \text{driving time to destination}) \% \ 20 > 10,$$

where origin's cumulative time is the driving time for the day for the driver at the start of the trip, the driving time to destination is the remaining driving time to reach the destination, and the % is the mod (modulo) operator.

In several embodiments, method 500 further can include a block 520 of generating a load design for each of the routes to deliver in a trailer of the trailers a load for one or more of the orders, such that floor spot assignments for stacks for each of the one or more of the orders in the load carried by trailer satisfy sequence-of-delivery constraints and center-of-gravity constraints. In many embodiments, the center-of-gravity constraints of the trailer can be determined as a range of positions of the trailer based on a weight of the load carried by the trailer, positions of axles of the trailer, and weight limits for the axles of the trailer. In many embodiments, block 520 can include various acts of block 450 (FIG. 4), block 460 (FIG. 4), block 480 (FIG. 4), and/or block 490 (FIG. 4).

For example, FIG. 7 illustrates a top, left side perspective view of a semi-trailer truck 700 including a tractor 710 and a trailer 720. Semi-trailer truck 700 shown in FIG. 7 can be modified from the actual semi-trailer truck, as the actual tractor typically will include a front axle with two wheels, one on each side, and two rear axles, each having four wheels, two on each side for each rear axle, which are positioned under a front portion of the actual trailer, and the actual trailer typically will have two rear axles, each having four wheels, two on each side for each rear axle, which are positioned under a rear portion of the actual trailer. As shown in FIG. 7, semi-trailer truck 700 is simplified such that the two front axles of the actual tractor are modeled as a single axle, specifically, axle 731, and the two rear axles of the actual trailer are modeled as a single axle, specifically, axle 732. Trailer 720 can have a length L, a height H, and a width W, as shown in FIG. 7. The length L can extend from a front 721 of trailer 720 to a rear 722 of trailer 720. Axle 731 can have a position 741, which is a distance $\delta_1$ from front 721 of trailer 720, and axle 732 can have a position 742, which is a distance $\delta_2$ from front 721 of trailer 720. As used herein, the axles of the trailer can include axle 731 and axle 732, even when axle 731 is actually part of the tractor.

In many embodiments, as modeled in FIG. 7, axle 731 can be located at a midpoint between the two rear axles of the actual tractor, and axle 732 can be located at a midpoint between the two rear axles of the actual trailer. Axle 731 can have a weight limit, which can be based on the weight limits of the two rear axles of the actual tractor, and axle 732 can have a weight limit, which can be based on the weight limits of the two rear axles of the actual trailer. In many embodiments, the routes determined in block 515 (FIG. 5) above were subject to the weight constraint of the trailer, meaning that the total weight of the stacks is less than the sum of the weight limits for axle 731 and axle 732. However, these weight constraints assume a perfectly balanced load, such as a center of gravity at the exact center between axle 731 and axle 732 of trailer 720. In practice, the center of gravity can be frontward or rearward of the center point between axles 731 and 732 of trailer 720. A range of positions for the center of gravity can be determined in order to satisfy the weight limits of the axles. This range of positions can be based on the total weight of the load, which can be the total weight of all the stacks in the all the orders in the load carried in the trailer (e.g., 720), the positions of the axles, and the weight limits for the axles, as follows:

$$maxCOG = AxlePos_1 + \frac{\max Weight_1 \times (AxlePos_2 - AxlePos_1)}{total\ Weight},$$

$$minCOG = AxlePos_2 - \frac{\max Weight_2 \times (AxlePos_2 - AxlePos_1)}{total\ Weight},$$

where maxCOG is the upper bound of the range of positions, minCOG is the lower bound of the range of positions, $AxlePos_1$ is position 741 ($\delta_1$) of axle 731, $AxlePos_2$ is position 742 ($\delta_2$) of axle 732, $maxWeight_1$ is the weight limit for axle 731, $maxWeight_2$ is the weight limit for axle 732, and totalWeight is the total weight of the load. The position of the center of gravity can be between the positions of minCOG and maxCOG, which can provide the range of positions for the center-of-gravity constraints. For heavier loads, the range of positions is smaller, converging on the center point between axles 731 and 732 of trailer 720. For lighter loads, the range of positions is larger, and for loads that are light enough, the position can be anywhere in the trailer.

Once the center-of-gravity constraints have been determined for the trailer for the load based on the orders for the route, the load design can be generated, which can generate floor spot assignments for the stacks in the orders. For example, each stack can be assigned a particular floor spot in the trailer. These floor spot assignments for the stacks can be subject to satisfying the sequence-of-delivery constraints and center-of-gravity constraints. These floor spot assignments can be based on the type of trailer. For example, some trailers are "dry" trailers, which a single compartment trailers that can carry "dry" (non-refrigerated and non-frozen) items. Other trailers are tri-temp trailers, which can include three compartments that can each be at a different temperature range. For many of the tri-temp trailers, the size of each compartment is variable, within ranges, based on separators that can be adjusted to different positions. Adjusting the separators to increase the size of one of the compartments can affect range of sizes available for one or more of the other compartments. For many of the tri-temp trailers, the temperature range for each of the compartments can be adjusted to the desired temperature range, such as frozen, refrigerated, or "dry."

Figure 8:
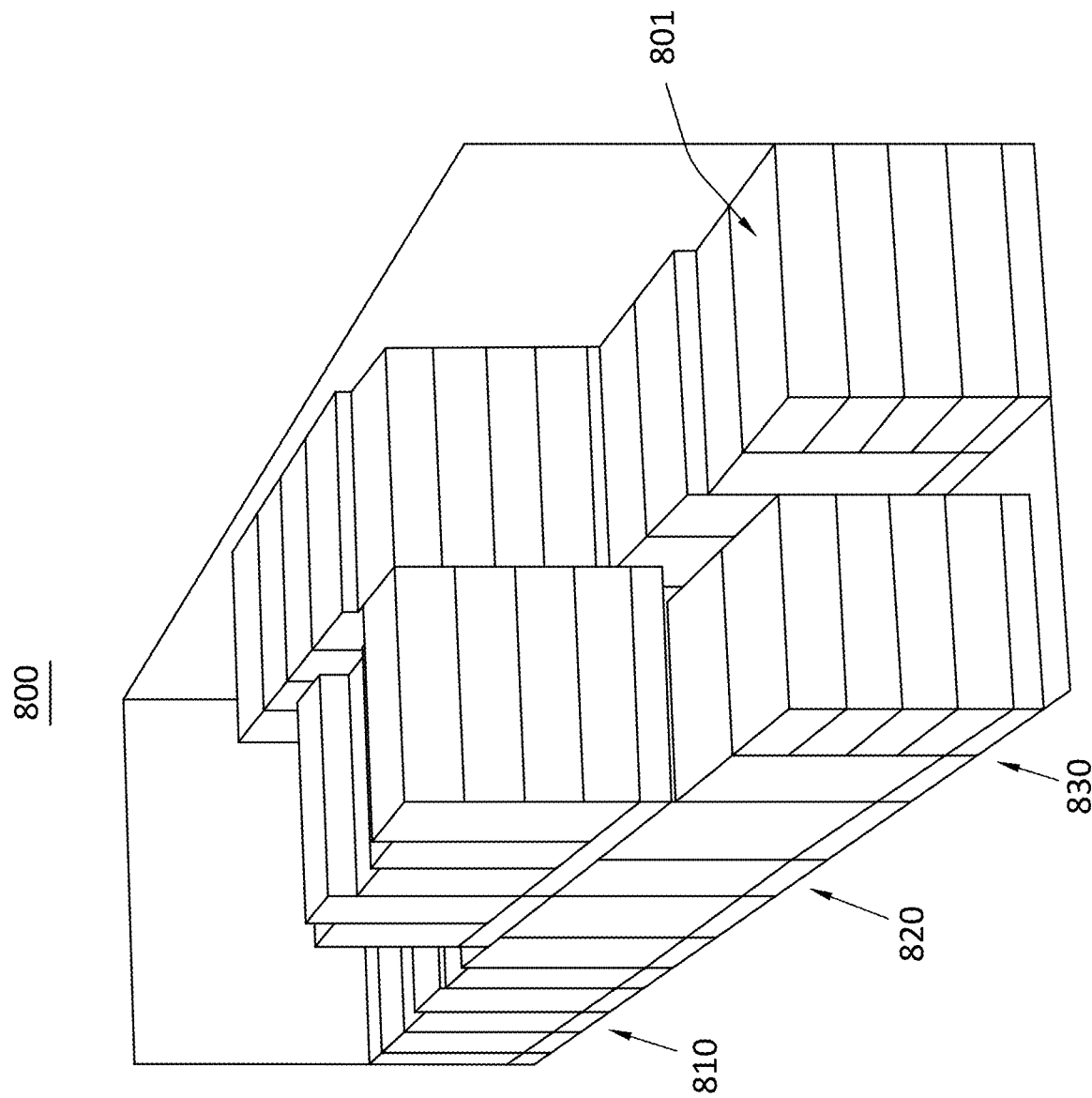
FIG. 8 illustrates a top, rear, left side perspective view of a load in a trailer in which the largest and heaviest stacks are positioned in the middle of the trailer, closest to the center point between the axles.

In many embodiments, when the trailer is a dry trailer, the floor spot assignments for the stacks can be assigned based at least in part on a quantity of the one or more of the orders in the load. For example, when the quantity of the one or more of the orders in the load is equal to one, the floor spot assignments can place the stacks that are heaviest in a middle of the trailer. FIG. 8 illustrates a top, rear, left side perspective view of a load 800 in a trailer. The trailer can include a front region 810, a middle region 820, and a rear region 830. Load 800 can include stacks, such as stack 801. The largest and heaviest stacks of load 800 are positioned in middle region 820, closest to the center point between the axles, between front region 810 and rear region 830 of the trailer.

When the quantity of the one or more of the orders in the load is equal to two, the floor spot assignments place the stacks associated with a first stop in descending weight order and can place the stacks associated with a last stop in ascending weight order. The first stop can be the first stop in the sequence of deliveries, and the stacks associated with the order associated with the first stop can be placed in the rear portion (e.g., approximately rear half) of the trailer, in a manner such that the weight of the stacks is descending when moving front-to-rear in the trailer (e.g., heaviest to lightest). The last stop can be the last stop in the sequence of deliveries, and the stacks associated with the order associated with the last stop can be placed in the front portion (e.g., approximately front half) of the trailer, in a manner such that the weight of the stacks is ascending when moving front-to-rear in the trailer (e.g., lightest to heaviest).

When the quantity of the one or more of the orders in the load is equal to three, the floor spot assignments can place the stacks associated with a first stop (e.g., in the rear of the trailer) in descending weight order, can place the stacks associated with a second stop that are heaviest in a middle of the trailer, and place the stacks associated with a last stop (e.g., in the front of the trailer) in ascending weight order. In several embodiments, when the load design results in empty floor spots at the front and/or the rear of the trailer, padding can be added in these floor spots to secure the load and prevent frontward or rearward shifting of the load during transit.

By arranging the positions of the stacks based on the individual weights of the stacks, while center-of-gravity can be positioned near the center point between the axles. As part of generating the load design, the load design can be verified that the floor spot assignments in fact keep the center of gravity of the trailer within the center-of-gravity constraints for the trailer. Additionally, the load design can be verified that the floor spots assignments maintaining the sequence of deliveries, so that the stacks associated with order are positioned in a manner that the stacks for the order to be delivered at the first stop on the route are at the rear of the trailer, and the stacks for the orders for each subsequent stop are positioned immediately frontward of the stacks for the previous stop. This approach can handle the first-in-first-out manner of loading and unloading from the rear for the trailers.

In some embodiments, when the trailer is a tri-temp trailer, the floor spot assignments for the stacks can be determined based at least in part on a quantity of different temperature ranges associated with the one or more of the orders in the load. For example, when all of the stacks in the load are for a single temperature range (e.g., all frozen, or all refrigerated, or all dry), the load design can be treated the same as a "dry" trailer, as there is effectively a single compartment, even if there are multiple actual compartments, because each of the actual compartments will be at the same temperature range.

When there are two different temperature ranges for the stacks in the load, the stacks are separated into the three compartments with a first group of the stacks for a first temperature range in one or two of the compartments, and a second group of the stacks (e.g., those remaining after removing the first portion) in the other one or two compartments. Both compartments can be set to the same temperature range for the group that is in two compartments. Generally, in a tri-temp trailer, the compartment with the largest possible capacity is smaller than the combined capacity of the second-largest and third-largest compartments. With these types of tri-temp trailers, as long as the number of stacks in the larger of the two groups of stacks fits within the combined capacity of the second-largest and third-largest compartments, the load design can satisfy compartment capacity constraints.

When there are three different temperature ranges for the stacks in the load, the stacks are separated into the three compartments with a first group of the stacks for a first temperature range in one of the compartments, a second group of the stacks in a second one of the compartments, and a third group of the stacks in the remaining compartment. As long as the number of stacks in the largest of the three groups of stacks fits within the capacity of the largest compartment, the number of stacks in the second-largest of the three groups of stacks fits within the capacity of the second-largest compartment, and the number of stacks in the third-largest of the three groups of stacks fits within the capacity of the third-largest compartment, the load design can satisfy compartment capacity constraints. For a tri-temp trailer with one, two, or three different temperature ranges, the load also can be verified to satisfy the center-of-gravity constraints for the trailer.

Turning ahead in the drawings, FIG. 9 illustrates a flow chart for a block 440 of route optimizing, according to the embodiment of FIG. 4. Block 440 is merely exemplary and is not limited to the embodiments presented herein. Block 440 can be employed in many different embodiments or examples not specifically depicted or described herein. In some embodiments, the procedures, the processes, and/or the activities of block 440 can be performed in the order presented. In other embodiments, the procedures, the processes, and/or the activities of block 440 can be performed in any suitable order. In still other embodiments, one or more of the procedures, the processes, and/or the activities of block 440 can be combined or skipped.

Referring to FIG. 9, block 440 can include a block 910 of route construction. In many embodiments, block 910 of route construction can involve receiving an input the stack building plan output from block 420 (FIG. 4) of stack building. For example, the input can be a set of orders to be delivered to physical stores from a distribution center, and the stacks that will be used to deliver the orders. In a number of embodiments, the stack building plan can specify stack groups, which can be sets of stacks that are to be delivered in the same load. For example, an order can be split for delivery across multiple loads to be delivered on different routes, but stacks in the same stack group can be kept in the same load.

In several embodiments, splitting orders across multiple loads can beneficially result in using fewer overall loads to deliver the orders. For example, for trailers that have a floor capacity of 30, meaning they can carry 30 stacks, there can be three trailers used to ship three orders in which the first of the three orders contains 16 stacks, the second of the three orders contains 17 stacks, and the third of the three orders contains 18 stacks. A single trailer with a floor capacity of 30 cannot carry any two of these orders in their entirety, so if none of the orders are split, the fewest number of trailers (with a floor capacity of 30) used to delivery these three orders is 3 trailers. By splitting these order, such as splitting the first order into a first suborder of 9 stacks and a second suborder of 7 stacks, splitting the second order into a first suborder of 9 stacks and a second suborder of 8 stacks, and splitting the third order into a first suborder of 9 stacks and a second suborder of 9 stacks, the three orders can be delivered using 2 trailers with a floor capacity of 30, as the first trailer can include the first suborder of each order, which would include a total 27 stacks, and the second trailer can include the second suborder of each order, which would include of 24 stacks. Although two trailers would be used to deliver the orders to each of the physical stores, the number of total trailers used can be reduced. Splitting loads can beneficially save on total delivery costs, particularly when most of the orders include around 16-20 stacks.

In many embodiments, block 910 of route construction can include a block 911 of instance categorization. In many embodiments, block 911 of instance categorization can include categorizing the orders into (a) orders in which route construction for the orders can be handled using greedy algorithms, in which case the flow of block 910 can proceed to a block 912 of greedy algorithms, and (b) orders in which route template generation using mixed integer programming can be beneficial, in which case the flow of block 910 can proceed to a block 913 of route template generation. In a number of embodiments, orders that can be handled using greedy algorithms can be smaller orders (e.g., less than half of the floor spots of a trailer) in which the routes for delivering the orders can be determined using conventional greedy algorithms. In many embodiments, orders that can be handled using route template generation can be routes that are larger (e.g., more than half of the floor spots of a trailer), which can benefit, in some cases, from splitting the orders.

In a number of embodiments, block 912 of greedy algorithms can perform conventional greedy algorithms that are used to address the class of problems known as the vehicle routing problem (VRP) to assign orders to routes.

Figure 11:
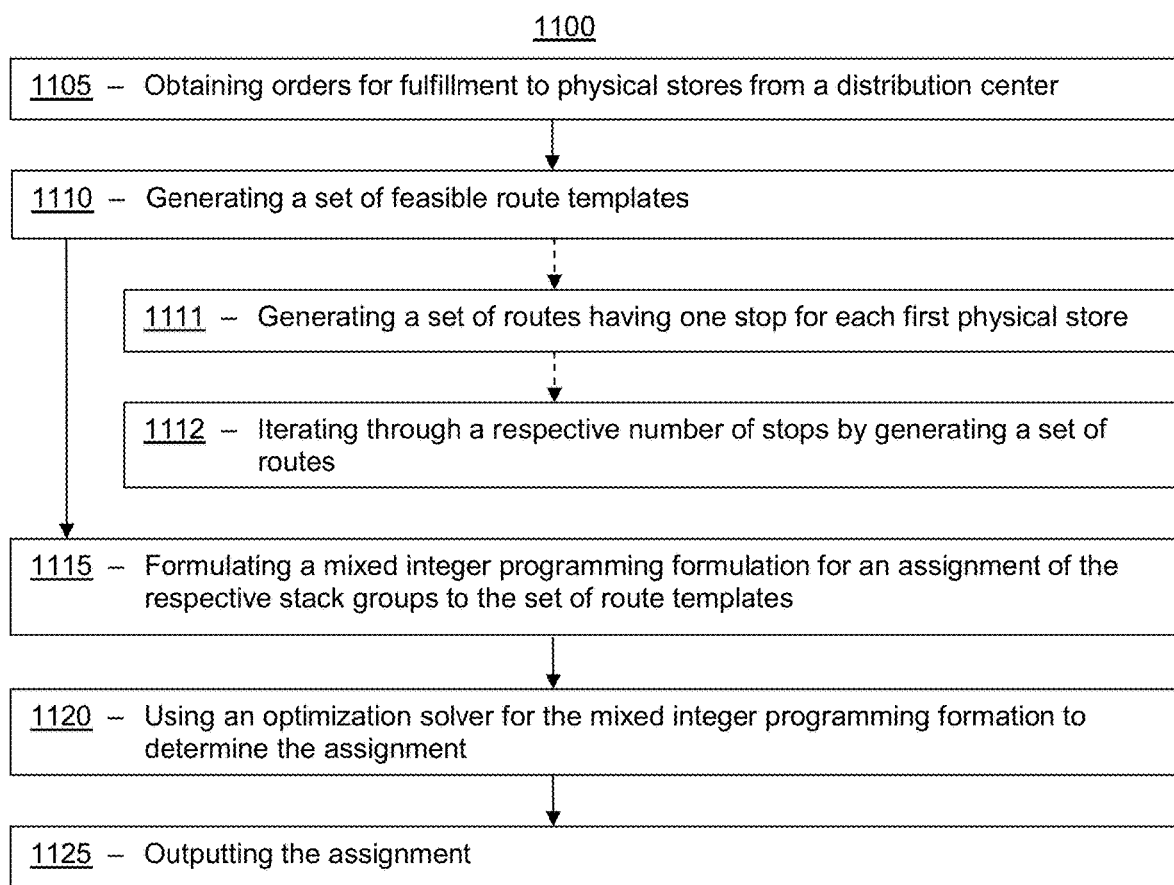
FIG. 11 illustrates a flow chart for a method, according to another embodiment.

In many embodiments, block 913 of route template generation can generate a set of feasible route templates that can be used, based on the physical stores that have submitted the orders. In many embodiments, block 913 of route template generate can be similar or identical to block 1110 (FIG. 11, described below).

In some embodiments, the flow of block 910 can proceed after block 913 to either a block 914 of stack group to route template assignment MIP (mixed integer programming), or instead to a block 915 of order to route template assignment MIP, followed by a block 916 of order splits. These two separate flow paths can be different approaches of assigning orders to route templates. In several embodiments, block 914 of stack group to route template assignment MIP can involve using the stack groups of the orders as inputs, and assigning the stack groups to route templates. By contrast, block 915 of order to route template assignment MIP can involve assigning entire orders to route templates, then proceeding to block 916 of order splits to split the orders and adjust the assignments to achieve improvements. In some embodiments, block 914 can be used for orders that involve dry trailers, and blocks 915 and 916 can be used for orders that involve tri-temp trailers. Blocks 914 and 915 can both use MIP formulations, but these formulations can be different. In many embodiments, block 914 of stack group to route template assignment MIP can be similar or identical to blocks 1115 and 1120 (FIG. 11, described below).

In a number of embodiments, the flow of block 910 can proceed, after block 912, block 914 and/or block 916 to a block 917 of route construction, which can involve assembling the routes and/or route template assignments generated in block 912, block 914 and/or block 916, to be used as output of block 910 of route construction.

In several embodiments, block 440 also can include a block 920 of route improvement. In many embodiments, the route template assignments generated in block 910 of route construction can be input into block 920 of route improvement, which can involve using various approaches to improve the route template assignments created in block 910 of route constructions. For example, block 920 of route improvement can include a block 921 of meta-heuristic framework, which can involve using a simulated annealing approach to improve the route template assignments. As another example, block 910 of route improvement can include a block 922 of neighborhood search, which can involve performing conventional neighborhood search algorithms to improve the route template assignments.

Figure 12:
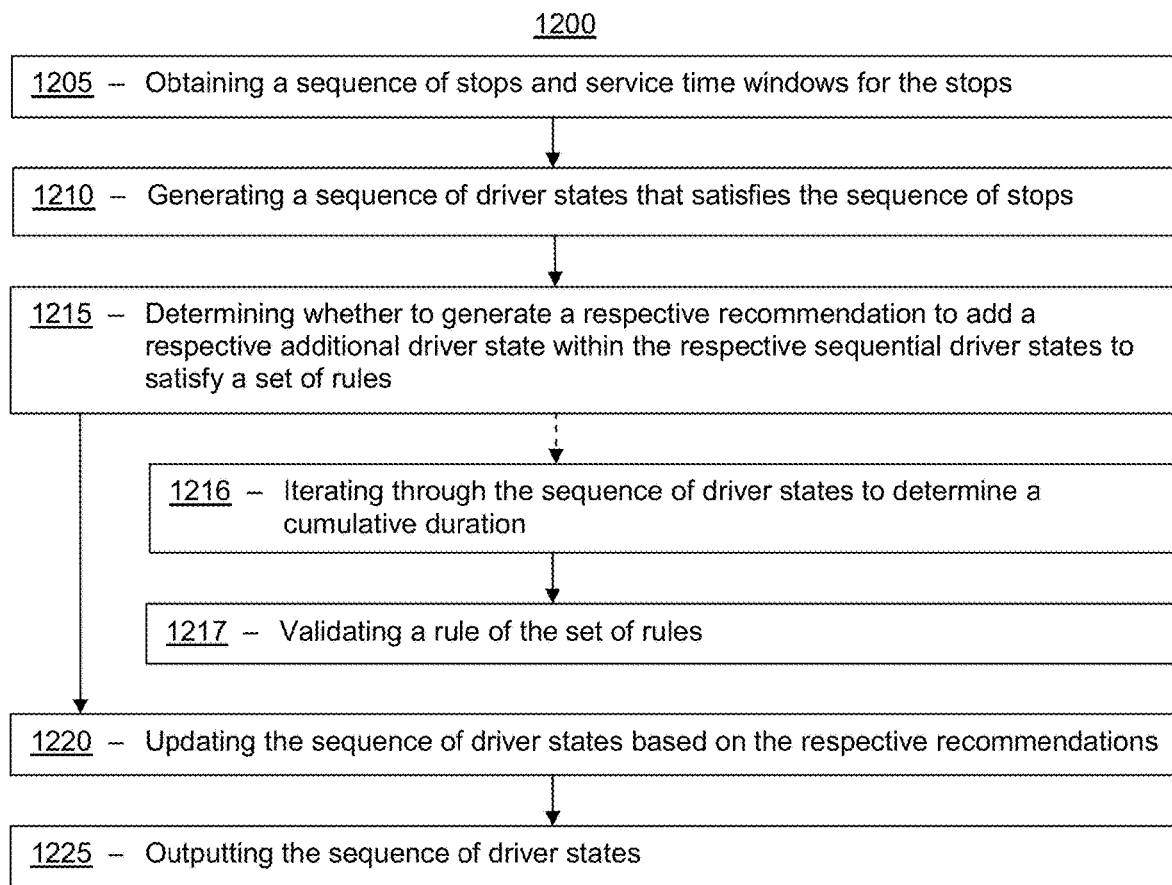
FIG. 12 illustrates a flow chart for a method, according to another embodiment.

In a number of embodiments, block 440 additionally can include a block 930 of services. In a number of embodiments, various elements of block 440 can make a call to block 930 of services, which can include a block 931 of heuristics for load design and/or a block 932 of hours of service (HOS) validation. In some embodiments, block 931 of heuristics for load design can include various heuristics that can be called to assist with determining various aspects, such as what type of trailer to use, loading pattern selections, and/or other suitable heuristics. In many embodiments, block 932 of HOS validation can involve determining whether a route template is feasible based on rules, such as HOS rules promulgated by various agencies, such as the U.S. DOT. In a number of embodiments, block 932 of HOS validation can involve customizing (e.g., optimizing) route templates to be feasible, which can be similar or identical to implementation of block 932 shown in FIG. 10 and described below, and/or method 1200 (FIG. 12, described below). In many embodiments, block 932 of HOS validation can be called many times, such as each time a route is considered while performing block 913 of route template generation, and/or by other suitable blocks of block 440.

Figure 10:
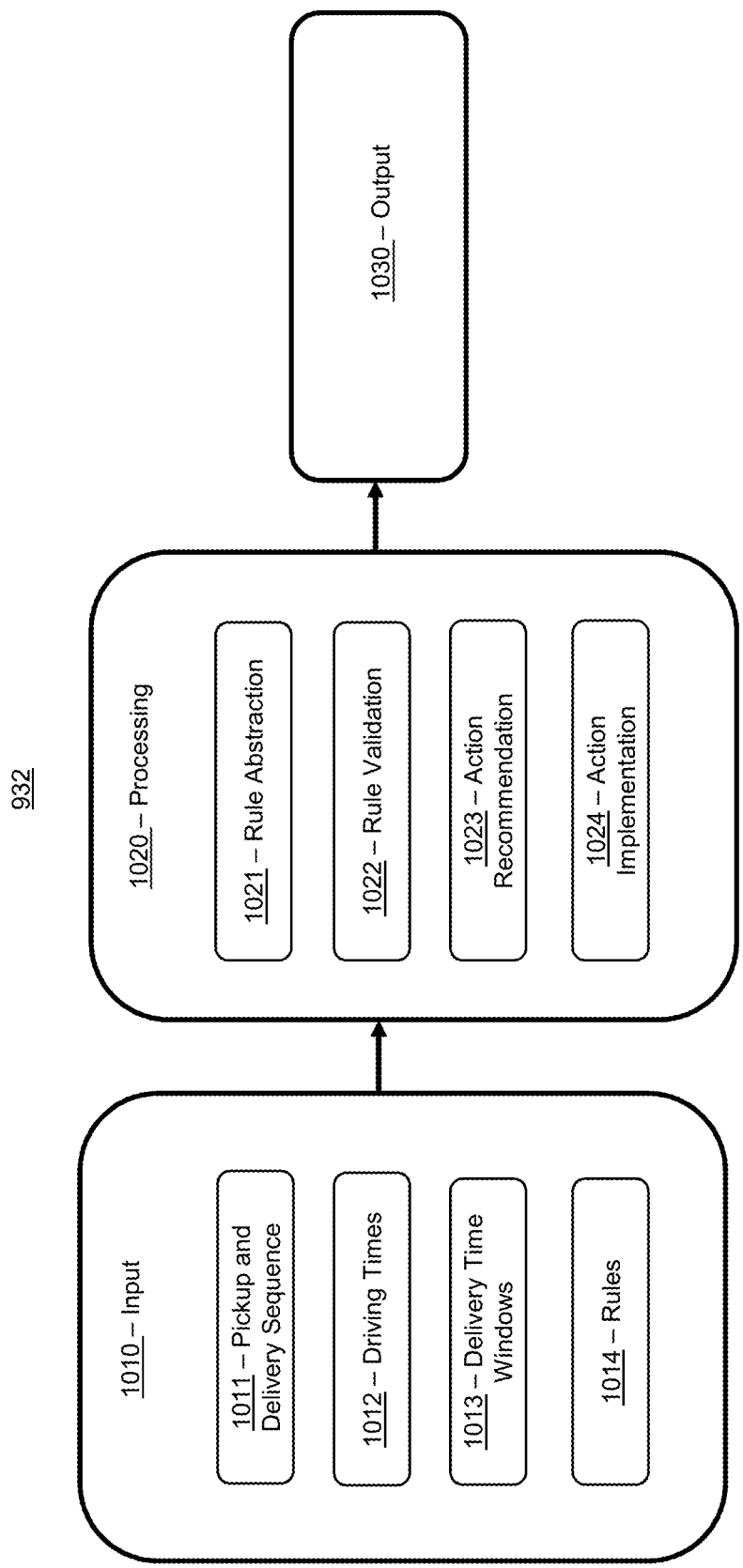
FIG. 10 illustrates a flow chart for a block of Hours of Service (HOS) validation, according to the embodiment of FIG. 9.

Turning ahead in the drawings, FIG. 10 illustrates a flow chart for a block 932 of HOS validation, according to the embodiment of FIG. 9. Block 932 is merely exemplary and is not limited to the embodiments presented herein. Block 932 can be employed in many different embodiments or examples not specifically depicted or described herein. In some embodiments, the procedures, the processes, and/or the activities of block 932 can be performed in the order presented. In other embodiments, the procedures, the processes, and/or the activities of block 932 can be performed in any suitable order. In still other embodiments, one or more of the procedures, the processes, and/or the activities of block 932 can be combined or skipped.

Referring to FIG. 10, block 932 can include a block 1010 of receiving inputs, such as a pickup and delivery sequence 1011, driving times 1012, delivery time windows 1013, rules 1014, and/or other suitable inputs. In a number of embodiments, pickup and delivery sequence 1011 can specify the sequence of pickups and deliveries in the route template. For example, the route template can start at a distribution center, such as Distribution Center 1 (DC1), then proceed to a physical store Store 1 (S1), then proceed to a physical store Store 3 (S3), then return to DC1. Each of pickup and delivery sequence 1011 can be a separate route template generated in block 913 (FIG. 9) of route template generation.

In several embodiments, driving times 1012 can include about how long it takes to drive between each pair of stops in pickup and delivery sequence 1011. For example, driving times 1012 can include peak (e.g., rush hour) and/or off-peak (non-rush hour) driving times for driving between DC1 and S1, between S1 and S3, and between S3 and DC1, for example.

In a number of embodiments, delivery time windows 1013 can include information about when each of the physical stores allows the delivery to be made, which can be specified by the physical stores. For example, S1 can have a delivery time window of 14:00-19:00, and S3 can have a delivery time window of 11:00-17:00.

In several embodiments, rules 1014 can be HOS rules specified by a compliance authority, business rules, and/or other suitable rules. In a number of embodiments, rules 1014 can specify which set of rules to use when the service has already pre-processed one or more sets of rules.

In several embodiments, block 932 also can include a block 1020 of processing. In a number of embodiments, block 1020 of processing can provide a response in real-time to determine if a route template is feasible for delivery sequence 1011, when provided with driving times 1012, delivery time windows 1013, and rules 1014. If the route template is feasible, in a number of embodiments, block 1020 of processing can generate a sequence of driver states with associated times for the route template.

In many embodiments, block 1020 can include a block 1021 of rule abstraction. In a number of embodiments, a set of rules, such as HOS rules provided by the DOT, can be abstracted to create drive rules, which can be based on driver states. In some embodiments, types of driver states can be defined hierarchically, such as follows:

> NON-SLEEP (ANY)
> ON-DUTY (NON-SLEEP)
> SERVICE (ON-DUTY)
> DRIVE (ON-DUTY)
> WAIT (ON-DUTY)
> BREAK (NON-SLEEP)
> LAYOVER (ANY)

On each row, a driver state type can be followed by a parenthetical, which can specify the driver state type that is the parent of the driver state type on that row, based on the hierarchy of driver state types. These driver state types can be defined hierarchically to accommodate the rules provided by the DOT, which also are hierarchical. For example, a DOT rule can be that a driver must take a break after 8 hours on duty. Any of the driver state types of service, drive, and wait would qualify as being on duty under the hierarchical definition above.

In several embodiments, one or more drive rules can be used to represent the DOT rules. In a number of embodiments, a drive rule can include a rule identifier, a minimum duration, a maximum duration, a, applied driver state type, and/or a stop driver state type. In several embodiments, the drive rules can be duration rules and/or cumulative rules. In many embodiments, a duration rule does not include a stop driver state type, but a cumulative rule does include a stop driver state type. As an example, a DOT rule can be that "if more than 8 consecutive hours have passed since the last off-duty (or sleeper berth), you must take an off-duty break of at least 30 minutes before driving." This DOT rule can be represented as the following two drive rules, each of which are duration rules:

Drive Rule 1
 Rule Identifier: "ON-DUTY-LIMIT"
 Minimum Duration: 0
 Maximum Duration: 8 hours
 Applied Driver State Type: ON-DUTY
Drive Rule 2
 Rule Identifier: "BREAK"
 Minimum Duration: 30 minutes
 Maximum Duration: max
 Applied Driver State Type: BREAK As another example, another DOT rule can be that a driver is "allowed a period of 14 consecutive hours in which to drive up to 11 hours after being off duty for 10 or more consecutive hours. This DOT rule can be represented as the following three drive rules, the first two of which are duration rules, and the last of which is a cumulative rule:

Drive Rule 1
 Rule Identifier: "NON-SLEEP-LIMIT"
 Minimum Duration: 0
 Maximum Duration: 14 hours
 Applied Driver State Type: NON-SLEEP
Drive Rule 2
 Rule Identifier: "LAYOVER"
 Minimum Duration: 10 hours
 Maximum Duration: max
 Applied Driver State Type: LAYOVER
Drive Rule 3
 Rule Identifier: "CUMULATIVE-DRIVE-LIMITS"
 Minimum Duration: 0
 Maximum Duration: 11 hours
 Applied Driver State Type: DRIVE
 Stop Driver State Type: LAYOVER In several embodiments, block 1021 of rule abstraction can be performed offline in pre-processing, such that the set of drive rules can be selected and used in later online processing, such as in blocks 1023 and/or 1024, described below.

In a number of embodiments, block 1020 of processing can include a block 1022 of rule validation. In many embodiments, block 1022 of rule validation can include defining how a drive rule can be validated. For example, for a drive rule that is a cumulative rule, the validation can involve iterating through each driver state, and determining a cumulative duration θ while the driver state is within the Applied Driver State Type, until the driver state is the Stop Driver State Type. The drive rule can be validated when $\theta \in [\theta_{min}, \theta_{max}]$, where $\theta_{min}$ is the Minimum Duration defined by the drive rule, and $\theta_{max}$ is the Maximum Duration defined by the drive rule. For a drive rule that is a duration rule, the validation can involve iterating through each driver state, and determining a cumulative duration θ while the driver state is within the Applied Driver State Type, until the driver state is not within the Applied Driver State Type. The drive rule can be validated when $\theta \in [\theta_{min}, \theta_{max}]$, where $\theta_{min}$ is the Minimum Duration defined by the drive rule, and $\theta_{max}$ is the Maximum Duration defined by the drive rule.

In several embodiments, block 1022 of rule validation can be performed offline in pre-processing, such that the validation procedures can be used in later online processing, such as in blocks 1023 and/or 1024, described below.

In a number of embodiments, block 1020 of processing can include a block 1023 of action recommendation. In many embodiments, block 1023 of action recommendation can include apply process each segment of a pair of driver states that occurs in pickup and delivery sequence 1011. For example, pickup and delivery sequence 1011 fora route template can be DC1, S1, S3, DC1, as described above. Pickup and delivery sequence 1011 can be converted into a sequence of driver states that will be involved in implementing pickup and delivery sequence 1011. For example, the sequence of driver states can be Drive (0), Service (DC1, load), Drive (DC1 to S1), Service (S1, unload), Drive (S1 to S3), Service (S3, unload), Drive (S3 to DC1), Service (DC1). A segment can be a sequential pair of driver states, such as Service (DC1, load), Drive (DC1 to S1).

In many embodiments, block 1023 also can involve receiving pre-drive conditions for each segment. For example, the pre-drive conditions can include a Pre-Drive condition ($D_{prev}$), which can indicate how long the driver has been in the driver state of DRIVE when the segment begins. As another example, the pre-drive conditions can include a Pre-On-Duty condition ($OD_{prev}$), which can indicate how long the driver has been in the driver state of ON-DUTY when the segment begins. As yet another example, the pre-drive conditions can include a Pre-Non-Sleep condition ($NS_{prev}$), which can indicate how long since the driver has been in the driver state of LAYOVER when the segment begins.

In a number of embodiments, block 1023 can involve outputting a recommendation of a driver state to add at a time t. For example, the driver state to add can be one of BREAK (B), LAYOVER (L), or WAIT (W). In many embodiments, the recommendations to add one of these driver states can be made to satisfy the drive rules when a drive rule is violated, for example. For example, block 1023 can include applying logic rules based on the drive rules. As an example, a state time $st_D$ for a driver state of DRIVE (D)

and/or a start time $st_s$ for a driver state of SERVICE (S) can be calculated for the segment, a recommendation can be generated to add a wait W if necessary in order to satisfy the service time window for associated with the service driver state. As another example, the ON-DUTY-LIMIT rule can be applied to the segment, and if the rule is violated, a recommendation can be generated to add a break B at a time t, where $t=st_D+(\theta_{max}-OD_{prev})$. As yet another example, a DRIVE rule can be applied to the segment, and if the rule is violated, a recommendation can be generated to add a layover L at a time t, where $t=st_D(\theta_{max}-D_{prev})$. As a further example, the NON-SLEEP-LIMIT rule can be applied to the segment, and if the rule is violated, a recommendation can be generated to add a layover L at a time t, where $t=st_D+(\theta_{max}-NS_{prev})$.

In a number of embodiments, block 1020 of processing can include a block 1024 of action implementation. In many embodiments, block 1024 of action implementation can include determining whether a recommendation to add a new state (NS) at a time t that was generated in block 1023 can be implemented, and if so, adding the new state at the time t. In many embodiments, the input to block 1024 can include the set of driver states in the segment, the new state NS that is recommended, and the time t. In several embodiments, the output can be an updated set of driver states. In some embodiments, if the new state NS cannot be added at time t, block 1024 can determine whether a different new state NS can be added that can be feasible under the drive rules.

For example, block 1024 can include applying logic rules based on the driver states in the segment and the recommended new state NS. As an example, if time t is in the middle of a driver state of DRIVE (D), the driver state of D can be split into two parts, in which a duration for the first part, $D1_{duration}=X-st_D$, and a duration for the second part, $D2_{duration}=X+NS_{duration}$, where $NS_{duration}$ is the duration of the new state NS, where X is time t. As another example, if time t is in the middle of a driver state of WAIT (W), let $X'=\min(st_{NS}, \max(st_W, (et_W-NS_{duration})))$, where X' is a temporary variable, $st_{NS}$ is a start time of the new state NS, $st_W$ is a start time of the W driver state, and $et_W$ is an end time driver state W. As an additionally example, if time t is in the middle of a driver state of SERVICE (S), let $X'=et_{previous\ state\ of\ drive\ state\ S}$, and $et_{previous\ state\ of\ driver\ state\ S}$ is the end time of the previous state of driver state S. As a further example, if time t is in the middle of a driver state of BREAK (B), and the new state NS is B, the action can be to do nothing. As an additional example, if time t is in the middle of a driver state of BREAK (B), and the new state NS is L, the action can be replace the B with L. As a further example, if time t is in the middle of a driver state of LAYOVER (L), the action can be to do nothing.

In a number of embodiments, block 1024 can improve the route template by adding new states in an intelligent manner. In several embodiments, block 1023 and block 1024 can be performed for each of the segments in a pairwise analysis of driver states. In a number of embodiments, block 1023 and block 1024 can be performed iteratively. In many embodiments, when a new state NS is added in a segment, there can be two new pairs, which can then be analyzed under block 1023 of action recommendation. In many embodiments, if a drive rule is violated, and there is no action recommendation made in order to satisfy the drive rule, then the route template can be infeasible. In a number of embodiments, there can be multiple iterations of attempts to make a segment feasible. In several embodiments, the number of iterations can be limited at a threshold, such as 100 iterations, after which the segment can be determined to be infeasible.

In a number of embodiments, block 932 additionally can include a block 1030 of responding with an output. The output can be that the route is not feasible, or if the route is feasible, including the sequence of driver states that are associated with the route template. For example, an output can be similar to the output shown in Table 2 below.

TABLE 2

| Driver State | Start Time | End Time | Service Window Start | Service Window End |
|---|---|---|---|---|
| SERVICE (DC1) | 9:00 | 10:00 | | |
| DRIVE (DC1 to S1) | 10:00 | 12:00 | | |
| WAIT | 12:00 | 14:00 | | |
| SERVICE (S1) | 14:00 | 14:50 | 14:00 | 19:00 |
| DRIVE (S1 to S3) | 14:50 | 15:00 | | |
| SERVICE (S3) | 15:00 | 15:50 | 11:00 | 17:00 |
| DRIVE | 15:50 | 17:00 | | |
| BREAK | 17:00 | 17:30 | | |
| DRIVE | 17:30 | 18:00 | | |
| BREAK | 18:00 | 19:00 | | |

Table 2 shows that various driver states, such as WAIT and BREAK, have been added to the route template to make it feasible under the rules. As another example, an output can be similar to the output shown in Table 3 below. Table 3 shows an example of an intelligent wait that was added in conjunction with a break between 14:00 and 16:00.

TABLE 3

| Driver State | Start Time | End Time | Service Window Start | Service Window End |
|---|---|---|---|---|
| WAIT | 8:00 | 9:00 | | |
| SERVICE (S1) | 9:00 | 10:00 | 9:00 | 10:00 |
| DRIVE (S1 to S3) | 10:00 | 14:00 | | |
| WAIT | 14:00 | 15:30 | | |
| BREAK | 15:30 | 16:00 | | |
| SERVICE (S3) | 16:00 | 17:00 | 16:00 | 19:00 |
| DRIVE | 17:00 | 22:00 | | |
| LAYOVER | 22:00 | 8:00 | | |
| DRIVE | 8:00 | 9:00 | | |
| SERVICE (DC1) | 9:00 | | | |

In a number of embodiments, block 932 of HOS validation can advantageously provide a fast heuristic algorithm to check for feasibility and generate driver states to make the route template feasible, if possible. In many embodiments, the HOS validation can be performed in real-time, which can make it possible to evaluate thousands or even millions of possible route templates. In a number of embodiments, the wait time can be minimized under the rules which can lower cost. In several embodiments, the processing framework in block 1020 of processing can use a generalized design that can apply for multiple different sets of rules, and/or can be used to readily adapt to ever-changing rules. In many embodiments, the HOS validation can perform the pairwise comparison and generate new states in a greedy way, which may not be optimal, but can validate feasible route templates and customizations that provide some intelligence to lower overall durations and/or wait times, while being performed in real-time.

Turning ahead in the drawings, FIG. 11 illustrates a flow chart for a method 1100, according to an embodiment. In some embodiments, method 1100 can be a method of constructing route templates for trailers that include an assignment of stack groups, according to an embodiment. Method 1100 is merely exemplary and is not limited to the embodiments presented herein. Method 1100 can be employed in many different embodiments or examples not specifically depicted or described herein. In some embodiments, the procedures, the processes, and/or the activities of method 1100 can be performed in the order presented. In other embodiments, the procedures, the processes, and/or the activities of method 1100 can be performed in any suitable order. In still other embodiments, one or more of the procedures, the processes, and/or the activities of method 1100 can be combined or skipped.

In many embodiments, load and route design system 300 (FIG. 3) can be suitable to perform method 1100 and/or one or more of the activities of method 1100. In these or other embodiments, one or more of the activities of method 1100 can be implemented as one or more computing instructions configured to run at one or more processors and configured to be stored at one or more non-transitory computer readable media. Such non-transitory computer readable media can be part of load and route design system 300. The processor(s) can be similar or identical to the processor(s) described above with respect to computer system 100 (FIG. 1).

In some embodiments, method 1100 and other blocks in method 1100 can include using a distributed network including distributed memory architecture to perform the associated activity. This distributed architecture can reduce the impact on the network and system resources to reduce congestion in bottlenecks while still allowing data to be accessible from a central location.

Referring to FIG. 11, method 1100 can include a block 1105 of obtaining orders for fulfillment to physical stores from a distribution center. The physical stores can be similar or identical to physical stores 360 (FIG. 3). The distribution center can be similar or identical to distribution center 350 (FIG. 3). In many embodiments, there can be one or more respective stack groups associated with each of the orders. Each stack group can include one or more stacks, such that the stacks in a stack group can be kept together in a single load for delivery. For example, an order for a physical store can indicate that various items and/or pallets ordered are to be kept together. The stacks can be the output from the stack building, such as block 420 (FIG. 4) of stack building, for example. in many embodiments, the orders can be the orders received at a distribution center for next day delivery to physical stores, for example.

In a number of embodiments, method 1100 also can include a block 1110 of generating a set of feasible route templates for delivering the orders to the physical stores.

In several embodiments, block 1110 of generating a set of feasible route templates for delivering the orders to the physical stores optionally can include a block 1111 of generating a set of routes having one stop for the each first physical store, wherein the set of routes having one stop comprises a respective single route having the each first physical store. For example, there can be a set S of physical stores that have submitted orders. For each physical store $S_i$ in set S, a one-stop route, r1, can be created such that r1={D→$S_i$→D}, where D represents the distribution center, such that route r1 is a route from the distribution center D to physical store $S_i$, then back to the distribution center D. there can be one route for each physical store $S_i$.

In a number of embodiments, block 1110 of generating a set of feasible route templates for delivering the orders to the physical stores additionally and optionally can include a block 1112 of iterating through a respective number of stops from 2 up to a predetermined limit of stops by generating a set of routes each having the respective number of stops by adding, to one or more respective routes in a set of routes having one fewer stop than the respective number of stops, respective additional physical stores that satisfies a distance condition. In a number of embodiments, the distance condition can be based at least in part on a distance of a respective additional physical store of the respective additional physical stores to the distribution center being greater than a distance of the each first physical store to the distribution center. In several embodiments, the distance condition can be based at least in part on a distance of a respective additional physical store of the respective additional physical stores to the respective route having one fewer stop than the respective number of stops.

In many embodiments, a respective quantity of the respective additional physical stores to add to respective routes can be based on a respective predetermined limit for the respective number of stops. In some embodiments, the predetermined limit of stops can be 2, 3, 4, 5, or another suitable number.

For example, for adding a second physical store $S_j$ to create a two-stop route, any store $S_n$ in which Dist{D, $S_n$}<Dist{D,$S_j$} can be excluded, where Dist{ } is the distance between the two inputs. In many embodiments, excluding such stores can ensure that the first store in the route is the closest store to the distribution center among the stores in the route, which can satisfy a business condition.

In a number of embodiments, after excluding such stores, a first iteration can involve generating two-stop routes using the one-stop routes. In several embodiments, for each store $S_i$, the K1 th closest stores $S_j$ to route $r1_j$ can be determined, and K1 two-stop routes $r2_j$={D→$S_i$→$S_j$→D} can be generated. K1 can be a design parameter. In many embodiments, the closest store $S_j$ to route $r1_j$ can be the store with minimal distance defined as follows:

$$\text{Dist}\{S_j,r1\}=\text{Dist}\{D,S_i\}+\text{Dist}\{S_i,S_j\}-\text{Dist}\{D,S_j\}$$

Similarly, the iterations can continue. For example, for each store $S_j$, the K2 th closest stores $S_k$ to route $r2_j$ can be determined, and K1×K2 three-stop routes $r3_k$={D→$S_i$ → $S_j$ →$S_k$ →D} can be generated. K2 can be a design parameter. Similarly, for each store $S_k$, the K3 th closest stores $S_m$ to route $r3_k$ can be determined, and K1×K2×K3 four-stop routes $r4_m$={D→$S_i$ →$S_j$→$S_k$→$S_m$ →D} can be created. K1 can be a design parameter. In many embodiments, these iterations can continue to the predetermined limit of stops.

In various embodiments, block 1110 of generating a set of feasible route templates for delivering the orders to the physical stores further can include, for each route of the sets of routes for the respective numbers of stops from 1 to the predetermined limit of stops, determining if the each route is feasible based at least in part on a respective sequence of stops for respective physical stores of the physical stores in the each route, respective service time windows for the respective physical stores in the each route, and hours-of-service rules. In many embodiments, block 932 (FIGS. 9, 11) and/or of HOS validation method 1200 (FIG. 12) can be used to determine if the route is feasible. In many embodiments, block 1110 can create many possible routes for the physical stores, such as a set of routes $R_i$ for each physical store $S_i$.

In several embodiments, method 1100 also can include a block 1115 of formulating a MIP formulation for an assignment of the respective stack groups associated with the orders to the set of route templates. Some of the route templates generated in block 1110 can be matched to stack groups, based on the MIP formulation. In some embodiments, the mixed integer programming formulation for the assignment can be based at least in part on a predetermined quantity limit of the two or more respective routes for splitting an order of the one or more orders. In several embodiments, the mixed integer programming formulation for the assignment can be based at least in part on a predetermined size threshold for each respective split order of the each of the one or more orders. In many embodiments, the mixed integer programming formulation for the assignment can be based at least in part on a quantity of trailers that are available to deliver the orders, a respective floor spot capacity for each of the trailers, a respective weight capacity for each of the trailers, respective dimension limits for each of the trailers, and/or other suitable inputs. In a number of embodiments, the assignment can include splitting each of one or more orders of the orders across two or more respective routes of the set of feasible routes.

In some embodiments, the MW formulation can determine an assignment of stack groups to route templates with the objective of minimizing route cost. For example, in some embodiments, the following a first decision variable $X_s^r$ can be defined as follows:

$X_r^s$ is 1 if stack group $s \in S$ is assigned to route $r \in R_s$; 0 otherwise.

A second decision variable $Y_o^r$ can be defined as follows:

$Y_o^r$ is 1 if order $o \in O$ is assigned to router $r \in R_o$; 0 otherwise.

A third decision variable $Z_r$ can be defined as follows:

$Z_r$ is 1 if route $r \in R$ is open—has stack group assigned to it; 0 otherwise.

A fourth decision variable $U_r^t$ can be defined as follows:

$U_r^t$ 1 if route $r \in R$ chooses to use trailer type $t \in T_r$; 0 otherwise.

A fifth decision variable $L_s$ can be defined as follows:

$L_s$ is 1 if stack group $s \in S$ is not assigned to any route; 0 otherwise.

In a number of embodiments, an objective function for the MIP formulation can be defined as follows, which can minimize an overall cost of the routes plus a penalty for any stack groups that are not assigned to a route:

$$\text{Minimize } \Sigma_{r \in R} C_r \times Z_r + \Sigma_{s \in S} \text{Penalty}_s \times L_s$$

In several embodiments, various constraints can be applied in the MIP formulation, such as the following constraints:

$$\Sigma_{r \in R_s} X_s^r + L_s = 1 \quad \forall s \in S \tag{1}$$

$$\Sigma_{s \in S_o} X_s^r \leq M \times Y_o^r \quad \forall o \in O, r \in R_o \tag{2}$$

$$\Sigma_{o \in O_r} Y_o^r = \|O_r\| \times Z_r \quad \forall r \in R \tag{3}$$

$$\Sigma_{r \in R_s} X_s^r \leq \text{MaxSplitNumber}_o \quad \forall o \in O, s \in S_o \tag{4}$$

$$\Sigma_{s \in S_o} \text{Cube}_s \times \text{MinSplitSize}_o \quad \forall o \in O, r \in R_o \tag{5}$$

$$\Sigma_{t \in T_r} U_t^r = 1 \quad \forall r \in R \tag{6}$$

$$\Sigma_{r \in R_t} U_t^r = \text{MaxNumber}_t \quad \forall t \in T \tag{7}$$

$$\Sigma_{s \in S_r} FS_s \times X_s^r \leq \Sigma_{t \in T_r} \text{CapSpot}_t \times U_t^r \quad \forall r \in R \tag{8}$$

$$\Sigma_{s \in S_r} \text{Weight}_s \times X_s^r \leq \Sigma_{t \in T_r} \text{CapWeight}_t \times U_t^r \quad \forall r \in R \tag{9}$$

$$\Sigma_{s \in S_r} Cub_s \times X_s^r \leq \Sigma_{t \in T_r} Cub_t \times U_t^r \quad \forall r \in R \tag{10}$$

where the sets are defined as follows:
S=Set of stack groups,
O=Set of orders (a stack groups placed by the same store and potential can ride on the same routes),
R=Set of routes,
$S_o$=Set of stack groups belongs to the same order o,
$S_r$=Set of stack groups can potentially ride on route r,
$R_s$=Set of routes a stack group s can potential ride on,
$R_o$=Set of routes an order o can potential ride on,
$R_t$=Set of routes a trailer type t can use (e.g., different lengths of trailers),
$O_r$=Set of orders on a route r,
$\|O_r\|$=size of the set $O_r$,
R=Set of trailer types, and
$T_r$=Set of trailer types a route r can potentially use,
and where the parameters are defined as follows:
$C_r$ is the cost of a route $r \in R$,
$FS_s$ is the floor spots a stack group $s \in S$ takes,
$\text{Penalty}_s$ is the penalty cost of not assigning a stack group $s \in S$ to any route,
$\text{MaxSplitNumber}_o$ is the maximum number of splits for each order $o \in O$,
$\text{MinSplitSize}_o$ is the minimum size of the sub-orders if order $o \in O$ is split,
$\text{MaxNumber}_t$ is the available number of trailers with trailer type t,
$\text{CapSpot}_t$ is the floor spot capacity of trailer type t,
$\text{CapWeight}_t$ is the weight capacity of trailer type t,
$\text{CapCube}_t$ is the cubic volume capacity of trailer type t,
$\text{Cube}_s$ is the cube volume of a stack group s, and
$\text{Weight}_s$ is the weight of a stack group s, In many embodiments, constraint 1 above can impose a constraint such that each stack group is only assigned to one route. In several embodiments, constraint 2 above can be used to derive the second decision variable, $Y_o^r$. In a number of embodiments, constraint 3 above can be used to derive the third decision variable, $Z_r$, and if a route is open (e.g., selected for assignment), used to ensure that the orders use this route. In various embodiments, constraint 4 above can be used to constrain split orders such that a maximum number of splits for each order, which can be configurable as a design parameter, such as 2, 3, or 4, for example. In several embodiments, constraint 5 above can constrain split order such that there is a minimal split size for each sub-order, such as 3, 4, 5, 6, 7, 8, 9, or 10 stacks, for example. In a number of embodiments, constraint 6 above can impose a constraint such that each route can choose a single trailer type. In some embodiments, constraint 7 above can impose a constraint such that a trailer type has a finite number of trailers available. In some embodiments, constraint 8 above can impose a capacity constraint on floor spots. In various embodiments, constraint 9 above can impose a capacity constraint on weight. In many embodiments, constraint 10 above can impose a capacity constraint on cubic volume.

In a number of embodiments, method 1100 further can include a block 1120 of using an optimization solver for the mixed integer programming formation to determine the assignment that minimizes an overall cost of delivering the orders to the physical stores from the distribution center. In many embodiments, a conventional optimization solver can be used to determine the assignment. For example, the CPLEX Optimization Solver developed by International Business Machines, Inc. of Armonk, New York, can be used to solve the MIP formulation. In many embodiments, the optimization solver can be run until convergence or for a present amount of time, such as 3 minutes, 5 minutes, 10 minutes, 15 minutes, or another suitable amount of time. In a number of embodiments, the MIP formulation, when solved can generate an assignment that includes order splits. For example, for an order S100 from a physical store, stack groups 1, 5, and 6 can be assigned to a route template 11, and stack groups 2, 3, and 4 can be assigned to a route template 23, which can indicate that order S100 is split across multiple loads on two separate routes.

In several embodiments, method 1100 also can include a block 1125 of outputting the assignment. In many embodiments, the assignment can be an assignment of each of the stack groups to a route template. In several embodiments, the assignment can be used as an input for block 920 (FIG. 9) of route improvement, as input for load designer 450 (FIG. 4).

Turning ahead in the drawings, FIG. 12 illustrates a flow chart for a method 1200, according to an embodiment. In some embodiments, method 1200 can be a method of determining a feasible sequence of driver states for a route template, according to an embodiment. Method 1200 is merely exemplary and is not limited to the embodiments presented herein. Method 1200 can be employed in many different embodiments or examples not specifically depicted or described herein. In some embodiments, the procedures, the processes, and/or the activities of method 1200 can be performed in the order presented. In other embodiments, the procedures, the processes, and/or the activities of method 1200 can be performed in any suitable order. In still other embodiments, one or more of the procedures, the processes, and/or the activities of method 1200 can be combined or skipped.

In many embodiments, load and route design system 300 (FIG. 3) can be suitable to perform method 1200 and/or one or more of the activities of method 1200. In these or other embodiments, one or more of the activities of method 1200 can be implemented as one or more computing instructions configured to run at one or more processors and configured to be stored at one or more non-transitory computer readable media. Such non-transitory computer readable media can be part of load and route design system 300. The processor(s) can be similar or identical to the processor(s) described above with respect to computer system 100 (FIG. 1).

In some embodiments, method 1200 and other blocks in method 1200 can include using a distributed network including distributed memory architecture to perform the associated activity. This distributed architecture can reduce the impact on the network and system resources to reduce congestion in bottlenecks while still allowing data to be accessible from a central location.

Referring to FIG. 12, method 1200 can include a block 1205 of obtaining a sequence of stops and service time windows for the stops. The sequence of stops can be similar or identical to pickup and delivery sequence 1011 (FIG. 10). The service time windows can be similar or identical to delivery time windows 1013 (FIG. 10).

In a number of embodiments, method 1200 also can include a block 1210 of generating a sequence of driver states that satisfies the sequence of stops. For example, as described above in connection with block 1023 (FIG. 10), a sequence of stops can be DC1, S1, S3, DC1. The sequence of driver states can for this sequence of stops can be Drive (0), Service (DC1, load), Drive (DC1 to S1), Service (S1, unload), Drive (S1 to S3), Service (S3, unload), Drive (S3 to DC1), Service (DC1).

In several embodiments, method 1200 also can include a block 1215 of determining, for each pair of respective sequential driver states from the sequence of driver states, whether to generate a respective recommendation to add a respective additional driver state within the respective sequential driver states in order to satisfy a set of rules. Block 1215 can be similar or identical to block 1023 (FIG. 10) of action recommendation. A pair of sequential driver states can be the pair of Service (DC1, load), Drive (DC1 to S1), for example.

In several embodiments, driver state types that apply to the set of rules can be defined hierarchically based on hours of service rules. In a number of embodiments, the respective additional driver state can include one of a break state, a layover state, or a wait state.

In many embodiments, the set of rules can include one or more duration rules and one or more cumulative rules. In several embodiments, each of the one or more duration rules can include a respective rule identifier, a respective minimum duration, a respective maximum duration, and a respective applied driver state type. In a number of embodiments, each of the one or more duration rules can include a respective rule identifier, a respective minimum duration, a respective maximum duration, a respective applied driver state type, and a respective stop driver state type.

In several embodiments, block 1215 of, determining, for each pair of respective sequential driver states from the sequence of driver states, whether to generate the respective recommendation to add the respective additional driver state within the respective sequential driver states in order to satisfy the set of rules further can include applying a respective duration rule of the one or more duration rules and/or applying a respective cumulative rules of the one or more cumulative rules by perform blocks 1216 and 1217, described below.

In several embodiments, block 1215 of determining, for each pair of respective sequential driver states from the sequence of driver states, whether to generate the respective recommendation to add the respective additional driver state within the respective sequential driver states in order to satisfy the set of rules optionally can include a block 1216 of iterating through the sequence of driver states to determine a cumulative duration for the respective applied driver state type. In a number of embodiments, for the one or more duration rules, the iterating can continue until a respective driver state of the driver sequence of driver states is not within the respective applied driver state type. In several embodiments, for the for the one or more cumulative rules, the iterating can continue until a respective driver state of the driver sequence of driver states is within the respective applied stop driver type.

In a number of embodiments, block 1215 of determining, for each pair of respective sequential driver states from the sequence of driver states, whether to generate the respective recommendation to add the respective additional driver state within the respective sequential driver states in order to satisfy the set of rules additionally can include a block 1217 of validating the respective duration rule and/or the respective cumulative rule when the cumulative duration is between the respective minimum duration and the respective maximum duration.

In a number of embodiments, method 1200 further can include a block 1220 of updating the sequence of driver states based on the respective recommendations, such that the sequence of driver states is feasible in view of the service time windows and the set of rules. Block 1220 can be similar or identical to block 1024 (FIG. 10) of action implementation. In several embodiments, block 1220 of updating the sequence of driver states based on the respective recommendations further can include, for each of the respective recommendations, determining whether the respective additional driver state can be added at a specified time, and if not, whether to replace the respective additional driver state with a different respective additional driver state.

In several embodiments, method 1200 also can include a block 1225 of outputting the sequence of driver states. In a number of embodiments, block 1225 of outputting the sequence of driver states further can include outputting a respective start time and a respective end time for each driver state of the sequence of driver state. The output can be similar or identical to the output returned in block 1030 (FIG. 10) of responding with an output.

Figure 16:
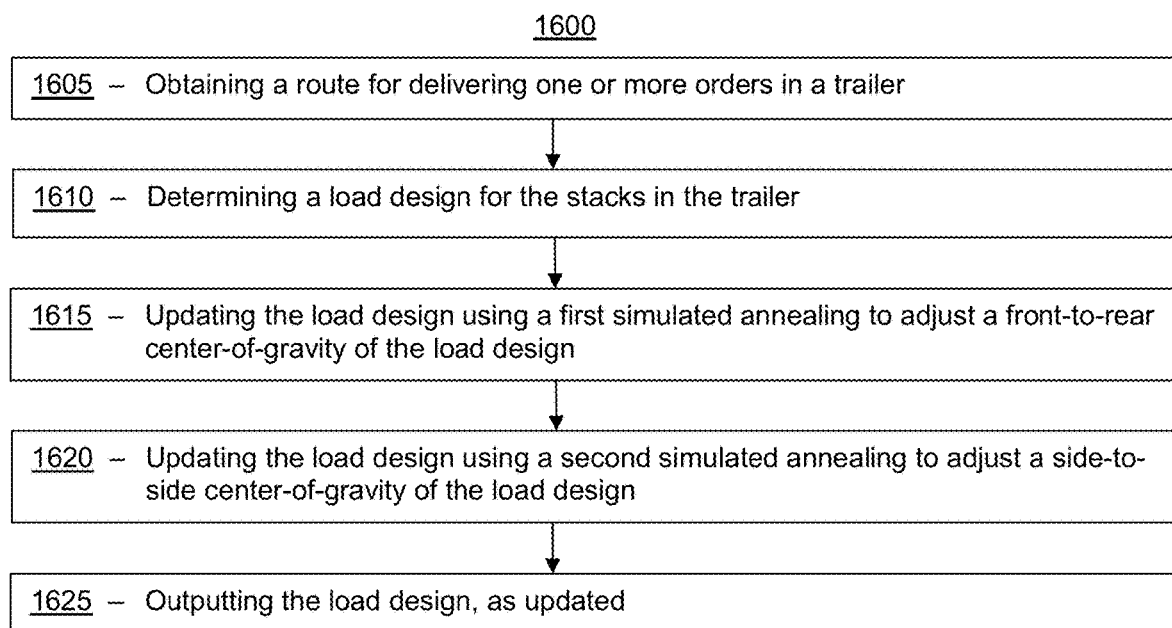
FIG. 16 illustrates a flow chart for a method, according to another embodiment.

Jumping ahead in the drawings, FIG. 16 illustrates a flow chart for a method 1600, according to an embodiment. In some embodiments, method 1600 can be a method of determining a load design, according to an embodiment. Method 1600 is merely exemplary and is not limited to the embodiments presented herein. Method 1600 can be employed in many different embodiments or examples not specifically depicted or described herein. In some embodiments, the procedures, the processes, and/or the activities of method 1600 can be performed in the order presented. In other embodiments, the procedures, the processes, and/or the activities of method 1600 can be performed in any suitable order. In still other embodiments, one or more of the procedures, the processes, and/or the activities of method 1600 can be combined or skipped. In many embodiments, method 1600 can be similar to block 520, and can include various acts of block 450 (FIG. 4), block 460 (FIG. 4), block 480 (FIG. 4), and/or block 490 (FIG. 4).

In many embodiments, load and route design system 300 (FIG. 3) can be suitable to perform method 1600 and/or one or more of the activities of method 1600. In these or other embodiments, one or more of the activities of method 1600 can be implemented as one or more computing instructions configured to run at one or more processors and configured to be stored at one or more non-transitory computer readable media. Such non-transitory computer readable media can be part of load and route design system 300. The processor(s) can be similar or identical to the processor(s) described above with respect to computer system 100 (FIG. 1).

In some embodiments, method 1600 and other blocks in method 1600 can include using a distributed network including distributed memory architecture to perform the associated activity. This distributed architecture can reduce the impact on the network and system resources to reduce congestion in bottlenecks while still allowing data to be accessible from a central location.

Referring to FIG. 16, method 1600 can include a block 1605 of obtaining a route for delivering one or more orders in a trailer from a distribution center to physical stores in a sequence of stops. In a number of embodiments, the route can have an associated assignment of stack groups comprising stacks of pallets. For example, the assignment can be similar to the assignment output in block 1225 (FIG. 12).

Figure 13:
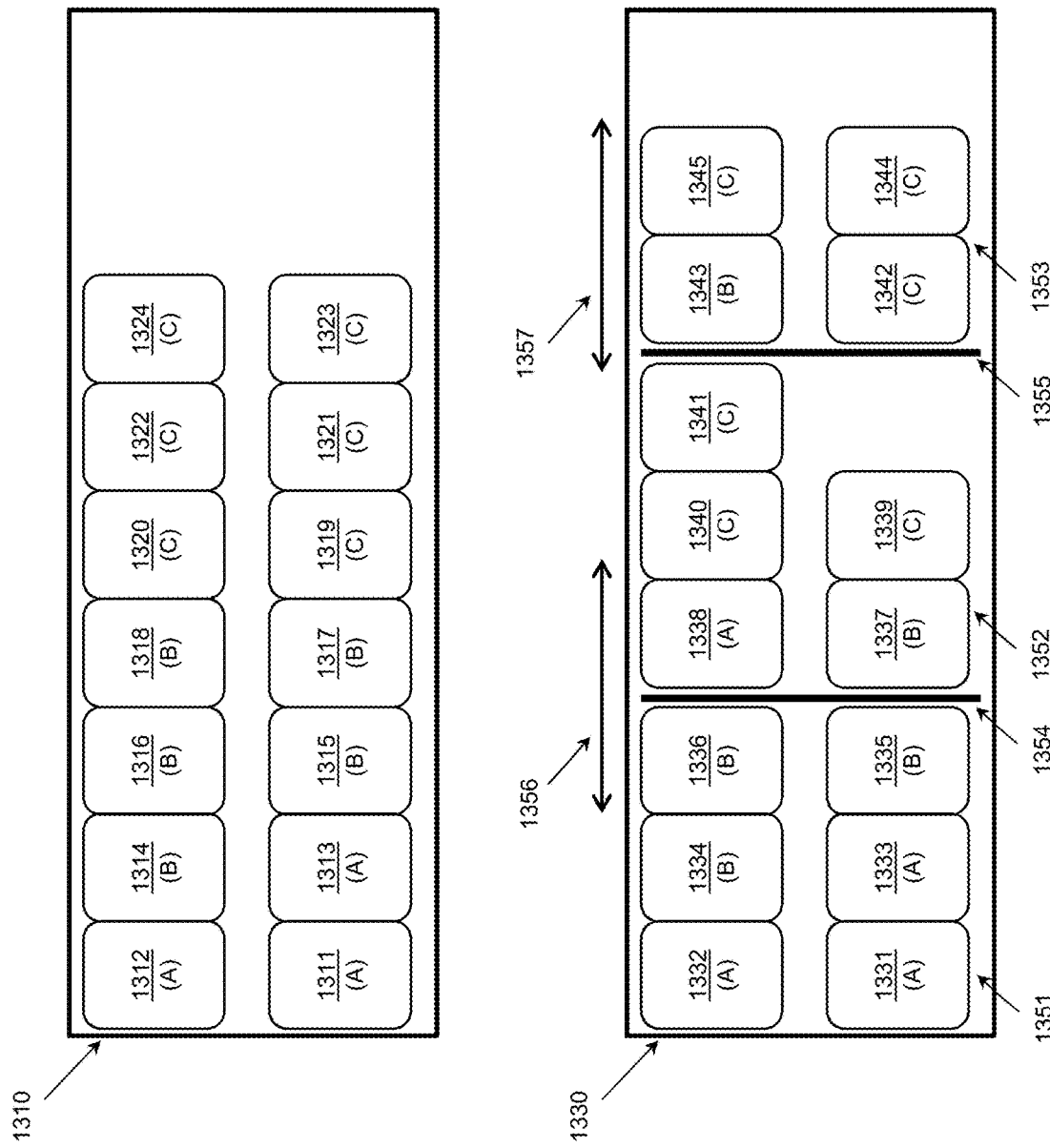
FIG. 13 illustrates top plan views of a load design for a dry trailer and a load design for a tri-temp trailer.

In a number of embodiments, method 1600 also can include a block 1610 of determining a load design for the stacks in the trailer based on the sequence of the stops in the route. In several embodiments, block 1610 of determining the load design for the stacks in the trailer further can include, when the trailer is a dry trailer, determining the load design such that each of the stacks can be unloaded a single time when the trailer delivers the orders to the physical stores. For example, the load design for the dry trailer can be similar or identical to load design 1310 (FIG. 13, described below). In many embodiments, block 1610 of determining the load design for the stacks in the trailer further can include, when the trailer is a tri-temp trailer, determining the load design such that unloading each of the stacks is minimized when the trailer delivers the orders to the physical stores. For example, the load design for the tri-temp trailer can be similar or identical to load design 1330 (FIG. 13, described below).

Turning back in the drawings, FIG. 13 illustrates top plan views of a load design 1310 for a dry trailer and a load design 1330 for a tri-temp trailer. As shown in load design 1310 in FIG. 13, a dry trailer can include various stacks, such as stacks 1311-1324. Stacks 1311-1324 can be in a single compartment of the trailer at the same temperature. In many embodiments, stacks 1311-1324 can be from separate orders, to be delivered at different physical stores (e.g., 360 (FIG. 3)). For example, stacks 1311-1313 can be for part or all of an order A, stacks 1314-1318 can be for part or all of an order B, and stacks 1319-1324 can be for part or all of an order C. In order to eliminate unloading and reloading of stacks, stacks 1311-1313 for order A can be loaded first (at the front of the trailer, which is on the left side of FIG. 13) because these stacks will be delivered at the last stop of the route, stacks 1314-1318 for order B can be loaded second because these stacks will be delivered at the second to last stop of the route, and stacks 1319-1324 for order C can be loaded last because these stacks will be delivered at the first stop of the route. In a number of embodiments, the number of stacks that can fit in a trailer can be based on the number of floor spots in the trailer, the dimensions (e.g., width, length, height) of the trailer, the number of stacks, and/or the dimensions of the stacks.

As shown in load design 1330 in FIG. 13, a tri-temp trailer can include various stacks, such as stacks 1331-1354, which can be loaded in three separate compartments 1351-1353 in the trailer, each set for a different temperature. The compartments (e.g., 1351-1351) can be separate by bulkheads, such as bulkheads 1354-1355. The bulkheads (e.g., 1354-1355) can be adjustable in position, such that a front-to-rear position of bulkhead 1354 can be located within a range 1356, and a front-to-rear position of bulkhead 1355 can be located within a range 1357. The adjustability of the position of the bulkheads (e.g., 1354-1355) can result in different sized compartments (e.g., 1351-1352), depending on the number of stacks to be transported at each of the temperature settings. For example, stacks 1331-1336 can be loaded into compartment 1351 at a first temperature setting, stacks 1337-1341 can be loaded into compartment 1352 at a second temperature setting, and stacks 1342-1345 can be loaded into compartment 1353 at a third temperature setting.

In many embodiments, stacks 1331-1345 can be from separate orders, to be delivered at different physical stores (e.g., 360 (FIG. 3)). For example, stacks 1331-1333 and 1338 can be for part of an order A, stacks 1334-1337 ad 1343 can be for part of an order B, and stacks 1339-1341, 1342, and 1345 can be for part of an order C. In order to minimize unloading and reloading of stacks, 1331-1333 and 1338 for order A can be loaded at the front of compartments 1351 and 1352, and stacks 1339-1341, 1342, and 1345 for order C can be loaded at the rear of compartments 1352 and 1353.

Returning to FIG. 16, in several embodiments, method 1600 also can include a block 1615 of updating the load design using a first simulated annealing to adjust a front-to-rear center-of-gravity of the load design. In a number of embodiments, block 1615 of updating the load design using a first simulated annealing to adjust the front-to-rear center-of-gravity of the load design further can include minimizing a distance between the front-to-rear center-of-gravity of the load design and an optimal front-to-rear center-of-gravity for the trailer, as described below.

Figure 14:
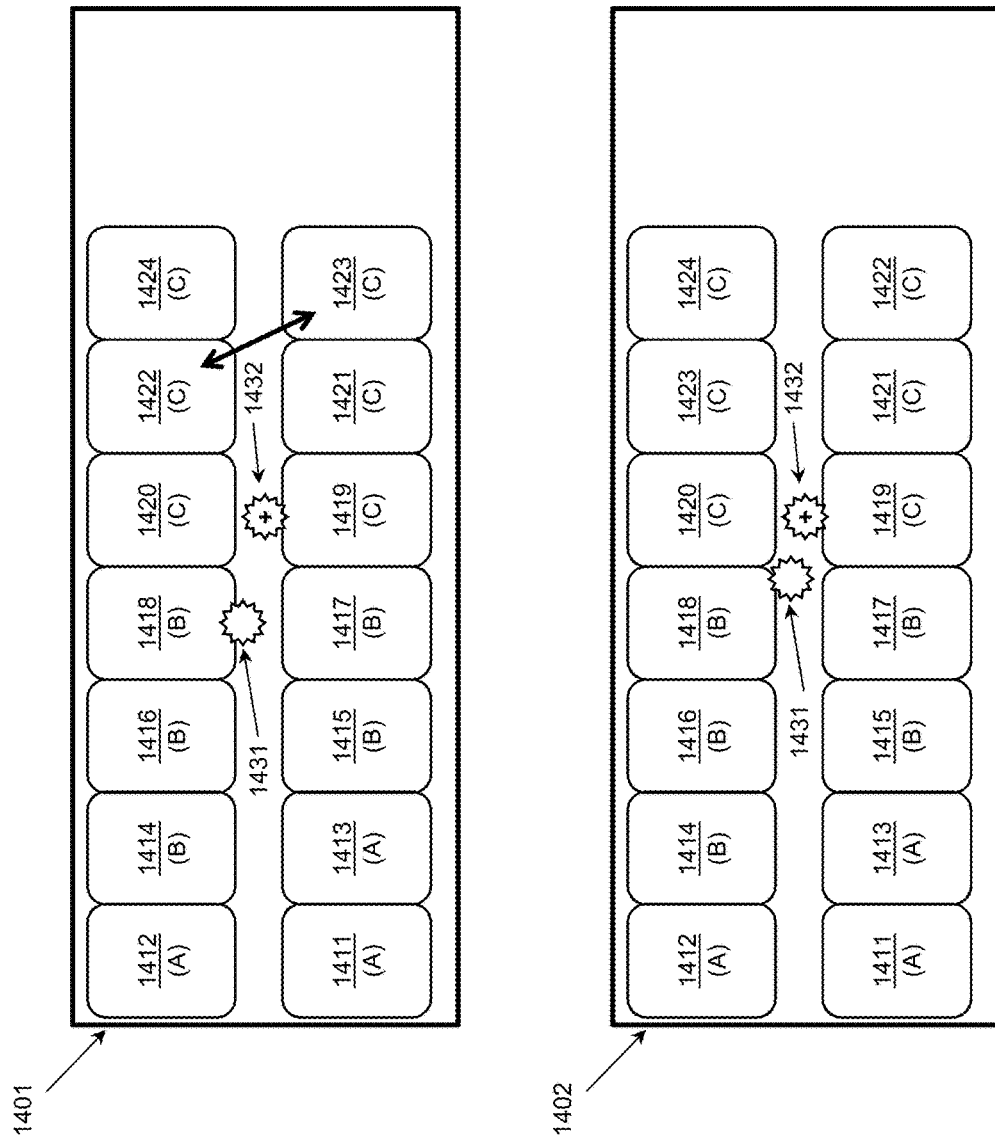
FIG. 14 illustrates top plan views of load designs for a dry trailer showing a swap in a first simulated annealing.

Turning back in the drawings, FIG. 14 illustrates top plan views of load designs 1401 and 1402 for a dry trailer, showing a swap in a first simulated annealing. In many embodiments, as described above in connection with FIG. 7, a trailer can have weight limits for its axles (e.g., 731-732 (FIG. 7)). In a number of embodiments, the center of gravity (COG) in the frontward-to-rearward direction of a load can be variable, and can be controlled by the load design. In a number of embodiments, the optimal COG can be half way between the maxCOG, described above, and the minCOG, described above, such as:

$$K = \tfrac{1}{2}(\text{minCOG} + \text{maxCOG})$$

where K is the optimal COG.

By designing the actual COG of the load design to be close to the optimal COG, if there is shifting (frontward or rearward) during a load, the load likely can remain within the COG constraints, minCOG and maxCOG, so as to not violate the weight limits on the axles.

In a number of embodiments, for a given route for a dry trailer with o orders, each order can include $n_i$ stacks, where i is an index, such that $i=1, \ldots, o$. There can be a total number of stacks $m = \Sigma_{i=1}^{o} n_i$, with $w_i$ as the weights of an index i, such as $i=1, \ldots, m$. The middle point (COG) of a jth floor spot to the front-most position can be denoted by $a_j$, in which j is an index such that $j=1, \ldots, m$. The total weight of the stacks in the route can be denoted by $g = \Sigma_{i=1}^{m} w_i$. The location of axle 731 (FIG. 7) can be denoted $\delta_1$, and the location of axle 732 (FIG. 7) can be denoted $\delta_2$. The max weight (weight limit) of axle 731 (FIG. 7) can be denoted $g_1$, and the max weight (weight limit) of axle 732 (FIG. 7) can be denoted $g_2$.

The lower bound of the COG, minCOG, also denoted as $COG_{lb}$, can be calculated as follows:

$$COG_{lb} = \delta_2 - \frac{g_2(\delta_2 - \delta_1)}{g}$$

and an upper bound of the COG, maxCOG, also denoted as $COG_{ub}$ can be calculated as follows:

$$COG_{ub} = \delta_1 + \frac{g_2(\delta_2 - \delta_1)}{g}$$

In a number of embodiments, stacks can be loaded to the front-most position. In several embodiments, decision variables $x_{ij}$, $(i, j) \in \mathcal{S}$ can represent an ith stack put in jth floor spot in the trailer, in which $\mathcal{S}$ represents a set of the combination of all stacks to floor spots in the trailer. In several embodiments, an optimal COG of a dry trailer can be approached using a minimization function, as follows:

$$\min_{x_{ij}, s} \left| \sum_{(i,j) \in S} \frac{w_i a_j}{g} x_{ij} - K \right|$$

such that $\sum_{i \in C(j)} x_{ij} = 1, j = 1, \ldots, m$, $\sum_{j \in C(j)} x_{ij} = 1, i = 1, \ldots, m$, $$S = \bigcup_{k=0}^{o} \left\{ \sum_{i=1}^{k-1} n_i + 1, \ldots, \sum_{i=1}^{k} n_i \right\} \times \left\{ \sum_{i=1}^{k-1} n_i + 1, \ldots, \sum_{i=1}^{k} n_i \right\},$$

where $\mathcal{C}(n)$ is a mapping of an index into a set $\mathcal{C}(n) = \{\Sigma_{i=1}^{k-1} n_i + 1, \ldots, \Sigma_{i=1}^{k} n_i\}$, when $n \in [\Sigma_{i=1}^{k-1} n_i + 1, \Sigma_{i=1}^{k} n_i]$.

In a number of embodiments, for a given route for a tri-temp trailer with o orders, the tth order can have $n_{kt}$ ($k=1, \ldots, 3, t=1, \ldots, o$) stacks in kth compartment of the tri-temp trailer. There can be a total number of stacks in the kth compartment of $m_k = \Sigma_{t=1}^{o} n_{kt}$, with $w_{ik}$ ($i=1, \ldots, m_k$, $k=1, \ldots, 3$) representing the weight of stack i in the kth compartment. The middle point (COG) of a jth floor spot to the front-most position of the kth compartment can be $a_{jk}$ ($j=1, \ldots, m_k$, $k=1, \ldots, 3$). The total weight of the stacks in kth compartment can be denoted by $w^{(k)} = \Sigma_{i=1}^{m_k} w_{ik}$ ($k=1, \ldots, 3$). The lower bound of the kth bulkhead can be denoted by $b_{lb}^{k}$, and the upper bound of the kth bulkhead can be denoted by $b_{ub}^{k}$, where $k=1,2$. The length of stacks in the kth compartment can be denoted by $\ell_s^k$, $k=1, 2, 3$. The total weight of the route can be denoted by $g = \Sigma_{k=1}^{3} w^{(k)}$. The location of axle 731 (FIG. 7) can be denoted $\delta_1$, and the location of axle 732 (FIG. 7) can be denoted $\delta_2$. The max weight (weight limit) of axle 731 (FIG. 7) can be denoted $g_1$, and the max weight (weight limit) of axle 732 (FIG. 7) can be denoted $g_2$.

The lower bound of the COG, minCOG, also denoted as $COG_{lb}$, can be calculated as follows:

$$COG_{lb} = \delta_2 - \frac{g_2(\delta_2 - \delta_1)}{g}$$

and an upper bound of the COG, maxCOG, also denoted as $COG_{ub}$ can be calculated as follows:

$$COG_{ub} = \delta_1 + \frac{g_2(\delta_2 - \delta_1)}{g}$$

In several embodiments, decision variables $x_{ijk}$, $(i, j) \in \mathcal{S}_k$, $k=1, 2, 3$ can represent an ith stack put in jth floor spot in the kth compartment in the trailer, in which $\mathcal{S}$ represents a set of the combination of all stacks to floor spots in the kth compartment. In several embodiments, an optimal COG, ($COG_{opt}$) of a dry trailer can be approached using a minimization function, as follows:

$$\min_{x_{ijk}} \left| \sum_{k=1}^{3} \sum_{(i,j) \in S_k} \frac{w_{ik} a_{jk}}{g} x_{ijk} + \ell_1 - CoG_{opt} \right|$$

such that $\sum_{j \in C_k(i)} x_{ijk} = 1, k = 1, 2, 3, i = 1, \ldots, m_k$, $\sum_{i \in C_k(j)} x_{ijk} = 1, k = 1, 2, 3, j = 1, \ldots, m_k$, $COG_{opt} = \frac{1}{2}(COG_{lb} + COG_{ub})$, $$S_k = \bigcup_{s=0}^{o} \left\{ \sum_{t=1}^{s-1} n_{kt} + 1, \ldots, \sum_{t=1}^{k} n_{kt} \right\} \times \left\{ \sum_{t=1}^{s-1} n_{kt} + 1, \ldots, \sum_{t=1}^{s} n_{kt} \right\},$$

where $\mathcal{C}_k(\bullet): \{1, \ldots, m_k\} \rightarrow \mathcal{P}\{1, \ldots, m_k\}$ is a mapping a given stack/floor spots to all feasible floor spots/stacks, and $\mathcal{C}_k(n) = \{\Sigma_{t=1}^{s-1} n_{kt} + 1, \ldots, \Sigma_{t=1}^{s} n_{kt}\}$, when $n \in [\Sigma_{t=1}^{s-1} n_{kt} + 1, \Sigma_{t=1}^{s} n_{kt}]$, and $\ell_1 = (w^{(2)} \max\{b_{lb}^{1}, \ell_s^{1}\} + w^{(3)} \max\{b_{lb}^{1} + \ell_s^{2},$ $\ell_s^1 + \ell_s^2$, $b_{lb}^2\})/g$, which can account for the gap at the rear-most section of a compartment frontward of the bulkhead.

Referring to load design 1401 in FIG. 14, a dry trailer can include various stacks, such as stacks 1411-1424. Stacks 1411-1413 can be for part or all of an order A, stacks 1414-1418 can be for part or all of an order B, and stacks 1419-1424 can be for part or all of an order C. The optimal COG for the trailer can be at an optimal COG location 1432. The actual COG for load design 1401 can be at an actual COG location 1431. In order to improve the load plan to minimize the distance between the actual COG and the optimal COG, the first simulated annealing can be used to swap stacks within a neighborhood. In many embodiments, the first simulated annealing can use a neighborhood defined by separate rows within a delivery group. The delivery group can be stacks that will be delivered at the same physical store. For example, stacks 1419-1424 can be in order C, and can be in a delivery group. Stacks 1423 and 1424 can be on a same row (front-to-rear), which would not be in the neighborhood, but stacks 1422 and 1423 can be on a different row (front-to-rear), which can be in the neighborhood. The different rows can be used to change the front-to-rear COG. The delivery group can be used to not create or increase unloading and reloading of stacks at stops. In several embodiments, the first simulated annealing can involve a series of iterations and a set of swaps within the neighborhood at each of the iterations. In many embodiments, the second simulated annealing can be performed in less than 800 ms, 500 ms, or 200 ms, for example.

For example, stack 1422 and stack 1423 can be in a same neighborhood for the first simulated annealing, and can be swapped in an iteration, among other pairs of stacks meeting the neighborhood constraint (e.g., 1412 and 1413, or 1416 and 1418). In simulated annealing, individual swaps may cause the distance between the actual COG and the optimal COG to increase, but at the end of an iteration involving multiple swaps, the distance will decrease, in order to use that iteration. In many embodiments, the minimization functions described above can be used for a dry trailer or a tri-temp trailer, as applicable. In a number of embodiments, the series of the iterations can end when an improvement at an iteration over an immediately previous iteration is smaller than a predetermined convergence threshold (e.g., the distance is converging on the minimum) and/or a quantity of the iterations meets a predetermined iteration limit. As shown in load design 1402, actual COG location 1431 can be adjusted by a swap of the position of stacks 1422 and 1423 from load design 1401 to load design 1402, such that the distance between actual COG location 1431 and optimal COG location 1432 for the optimal COG can be decreased from the distance in load design 1401.

Returning to FIG. 16, in a number of embodiments, method 1600 further can include a block 1620 of updating the load design using a second simulated annealing to adjust a side-to-side center-of-gravity of the load design. In several embodiments, block 1620 of updating the load design using the second simulated annealing to adjust the side-to-side center-of-gravity of the load design further can include minimizing a distance between the side-to-side center-of-gravity of the load design and an optimal side-to-side center-of-gravity for the trailer.

Figure 15:
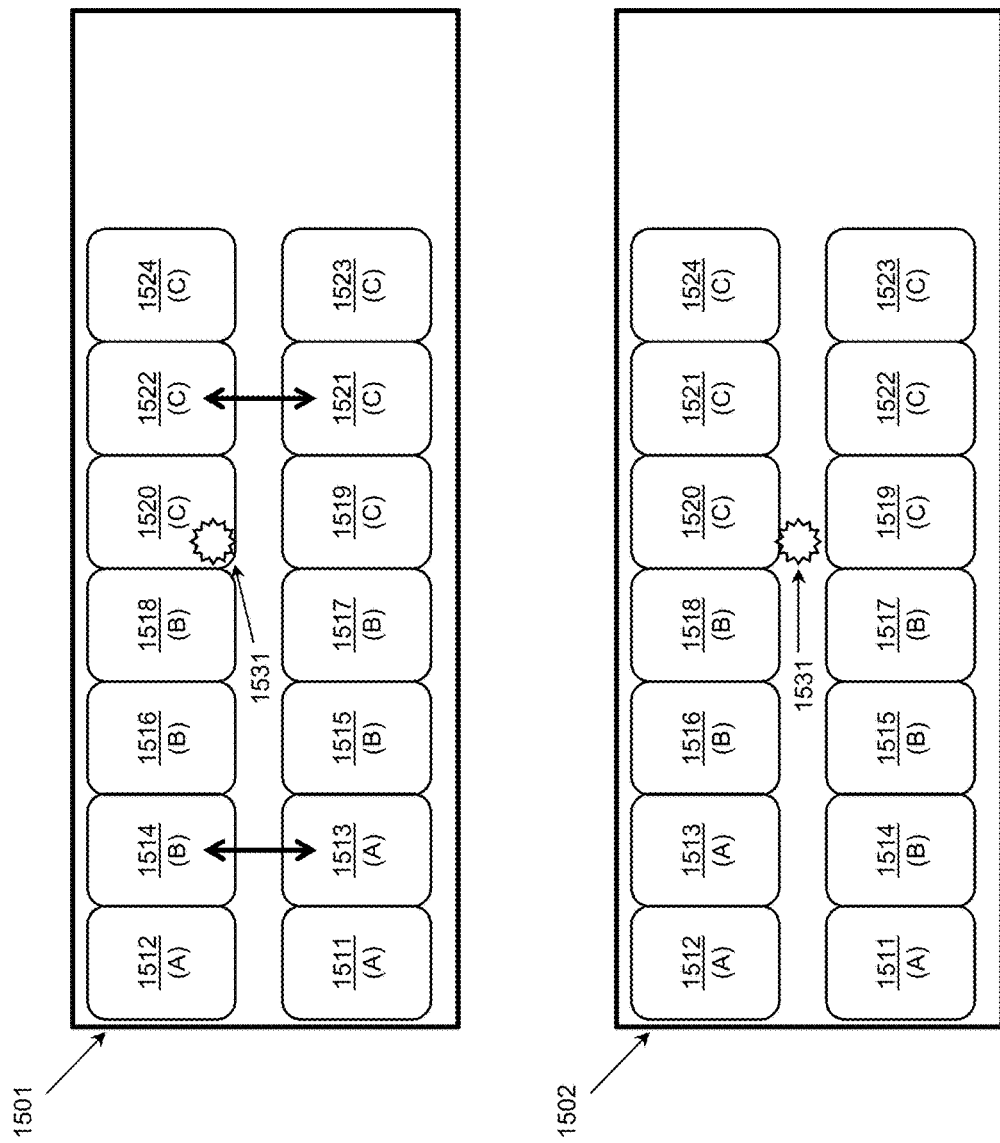
FIG. 15 illustrates top plan views of load designs for a dry trailer, showing swaps in a second simulated annealing.

Turning back in the drawings, FIG. 15 illustrates top plan views of load designs 1501 and 1502 for a dry trailer, showing swaps in a second simulated annealing. In many embodiments, the center of gravity can be heavier on the curbside (toward the top of FIG. 15) or on the roadside (toward the bottom of FIG. 15) of the trailer. For example, the actual COG can be at an actual COG position 1531 for load design 1501 that includes stacks 1511-1524.

In a number of embodiments, a number of rows (front-to-rear) of stacks in the container can be r, in which r>0, and the weight different of stacks in the ith row can be $w_i^d$, in which $w_i^d \geq 0$, i=1, . . . , r. In several embodiments, there can be defined $x_i$, i=1, . . . , r: 0/1 decision variables, which can be binary variables that indicate whether to put heavier stack to the curbside for ith row ($x_i$=1) or put the heavier stack to the roadside for the ith row (($x_i$=0). A variable W can be defined, which is half of the total weight difference, such that:

$$W = \frac{1}{2}\sum_{i=1}^{r} w_i^d$$

In order to minimize the difference between $\sum_{i=1}^{r} w_i^d x_i$ and W, the formulate can be expressed in an equivalent form of finding the largest possible $\sum_{i=1}^{r} w_i^d x_i$ less than W, which changes the formulation to a 0/1 knapsack problem (with item value and weight being the same), as follows:

$$\max \sum_{i=1}^{r} w_i^d x_i \text{ such that } \sum_{i=1}^{r} w_i^d x_i \leq W, x_i \in \{0, 1\}.$$

When there are 16 rows in a container, there can be at most 16 decision variables.

Referring to load design 1501 in FIG. 15, stacks 1511-1513 can be for part or all of an order A, stacks 1514-1518 can be for part or all of an order B, and stacks 1519-1524 can be for part or all of an order C. In order to improve the load plan to move the actual COG position 1531 closer to the center between the curbside and roadside, the second simulated annealing can be used to swap stacks within a neighborhood. In many embodiments, the second simulated annealing uses a neighborhood defined by a same row. The same row can be used to keep the front-to-rear COG constant and keep not create or increase unloading and reloading of stacks at stops, but instead to adjust the side-to-side COG. In several embodiments, the second simulated annealing can involves a series of iteration and a set of swaps within the neighborhood at each of the iterations. The second simulated annealing can use the maximization function described above.

For example, stack 1513 and stack 1514 can be in a same neighborhood for the second simulated annealing, and stack 1521 and stack 1522 can be in a same neighborhood for the second simulated annealing, and can be swapped in an iteration to update load design 1501 to become load design 1502. These swaps can adjust actual COG location 1531 to be closer to the side-to-side center in load design 1502 than in load design 1501. In many embodiments, the maximization function described above can be used for both dry trailers and tri-temp trailers, as the compartments in the tri-temp trailer and front-to-back, not side-to-side. In a number of embodiments, the series of the iterations can end when an improvement at an iteration over an immediately previous iteration is smaller than a predetermined convergence threshold (e.g., the distance is converging on the minimum) and/or a quantity of the iterations meets a predetermined iteration limit. In many embodiments, the second simulated annealing can be performed in less than 50 ms, 10 ms, or 5 ms, for example.

Returning to FIG. 16, in a number of embodiments, method 1600 also can include a block 1625 of outputting the load design, as updated by the first simulated annealing and the second simulated annealing. In several embodiments, the load design can specify a respective floor spot assignment for each of the stacks.

For example, an exemplary load design can is shown in Table 4 below, which can show stacks for two orders, with order identifiers 2040 and 2068. The height in inches and weight in pounds in shown for the stacks on each row on the left side (roadside) and the right side (curbside). In some cases, such as the left stack in row 5, the right stack in row 4, and the right stack in row 14, there can be two pallets in the stack, as opposed to the one pallet in the stack for the other stacks. The total weight of the load is 43,183 pounds. The total weight on axle 1 is 21,591.49 pounds, and the total weight on axle 2 is 21,591.51 pounds, which can indicate that the front-to-rear COG is close to the optimal COG. The total weight roadside weight is 21,589 pounds, and the total curbside weight is 21,594 pounds, which can indicate that the side-to-side COG is close to the side-to-side center.

TABLE 4

| Row | Left Side Order No. | Left Side Height | Left Side Weight | Right Side Order No. | Right Side Height | Right Side Weight |
|---|---|---|---|---|---|---|
| 1 | 2040 | 72 | 846 | 2040 | 72 | 2474 |
| 2 | 2040 | 71 | 1190 | 2040 | 30 | 798 |
| 3 | 2040 | 71 | 1783 | 2040 | 72 | 587 |
| 4 | 2040 | 72 | 565 | 2040 | 65 + 8 | 2575 + 106 |
| 5 | 2040 | 65 + 10 | 2507 + 02 | 2040 | 65 | 1906 |
| 6 | 2040 | 72 | 543 | 2040 | 65 | 348 |
| 7 | 2040 | 65 | 614 | 2040 | 72 | 2841 |
| 8 | 2040 | 65 | 2400 | 2040 | 71 | 697 |
| 9 | 2068 | 72 | 985 | 2068 | 72 | 3071 |
| 10 | 2068 | 72 | 1274 | 2068 | 72 | 674 |
| 11 | 2068 | 65 | 2281 | 2068 | 71 | 534 |
| 12 | 2068 | 65 | 2474 | 2068 | 71 | 589 |
| 13 | 2068 | 64 | 2456 | 2068 | 64 | 370 |
| 14 | 2068 | 65 | 785 | 2068 | 72 + 13 | 2370 + 150 |
| 15 | 2068 | 71 | 584 | 2068 | 66 | 1504 |

In a number of embodiments, the load design can provide a balanced front-to-rear weight, a balanced side-to-side weight, and/or provide for no or minimal unloading and reloading at stops.

Figure 17:
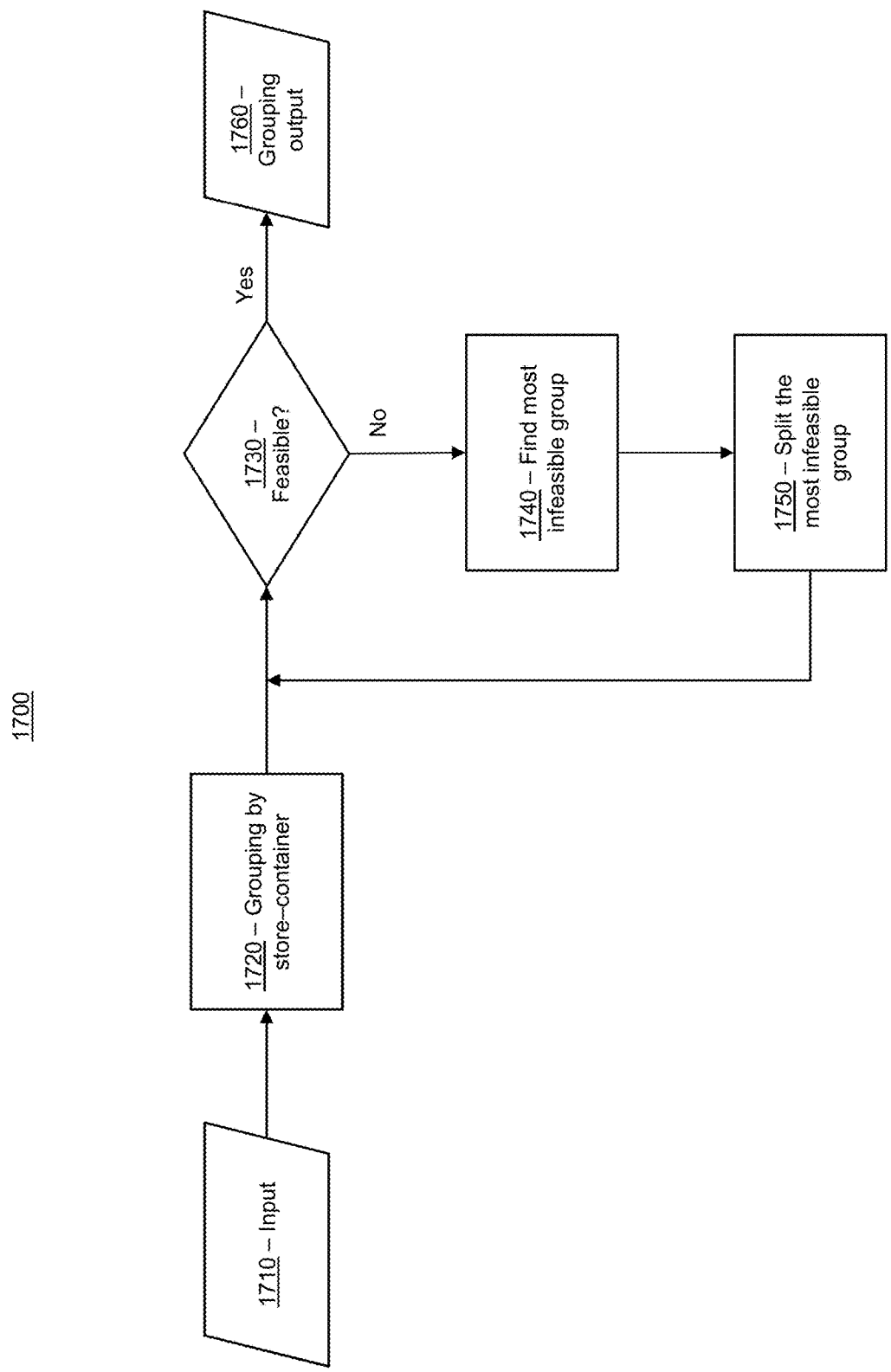
FIG. 17 illustrates a flow chart for a method, according to another embodiment.

Turning ahead in the drawings, FIG. 17 illustrates a flow chart for a method 1700, according to an embodiment. In some embodiments, method 1700 can be a method of automatically determining a flexible load design, according to an embodiment. Method 1700 is merely exemplary and is not limited to the embodiments presented herein. Method 1700 can be employed in many different embodiments or examples not specifically depicted or described herein. In some embodiments, the procedures, the processes, and/or the activities of method 1700 can be performed in the order presented. In other embodiments, the procedures, the processes, and/or the activities of method 1700 can be performed in any suitable order. In still other embodiments, one or more of the procedures, the processes, and/or the activities of method 1700 can be combined or skipped.

In many embodiments, load and route design system 300 (FIG. 3) can be suitable to perform method 1700 and/or one or more of the activities of method 1700. In these or other embodiments, one or more of the activities of method 1700 can be implemented as one or more computing instructions configured to run at one or more processors and configured to be stored at one or more non-transitory computer readable media. Such non-transitory computer readable media can be part of load and route design system 300. The processor(s) can be similar or identical to the processor(s) described above with respect to computer system 100 (FIG. 1).

In some embodiments, method 1700 and other blocks in method 1600 can include using a distributed network including distributed memory architecture to perform the associated activity. This distributed architecture can reduce the impact on the network and system resources to reduce congestion in bottlenecks while still allowing data to be accessible from a central location.

Referring to FIG. 17, method 1700 can include a block 1710 of receiving one or more inputs. In many embodiments, the inputs can include information about stacks of pallets to be loaded in the trailer, information about the trailer, a load design for loading the stacks into the trailer, and/or other suitable inputs. The information about the trailer can be information about the length, width, and/or height of the trailer, whether the trailer is a dry trailer or a tri-temp trailer, bulkhead ranges, and/or other suitable information. The load design can be similar or identical to the load design output in block 1625 (FIG. 16), which can be specify a respective floor spot assignment for each of the stacks to satisfies feasibility constraints, such as center of gravity constraints. The information about the stacks of pallets can include, for each stack, a stack identifier, a weight of the stack, an order and/or store to which the stack is associated, and/or other suitable information.

In a number of embodiments, method 1700 also can include a block 1720 of grouping the stacks by store and container. For a tri-temp trailer, there can be multiple containers (e.g., compartments of the trailer), such as three separate containers, and the stacks can be assigned in the load plan to one of the containers. For a dry trailer, there can be a single container. Each stack can be associated with a store to which it will be delivered. For example, all the stacks in a first container to be delivered to a first store can be grouped into a first group, all the stacks in the first container to be delivered to a second store can be grouped into a second group, all the stacks in a second container to be delivered to the first group can be grouped into a third group, and so on. The groupings by store-container can be similar or identical to fluid groups 1841-1843 shown in FIG. 18A, described below.

Figure 18A:
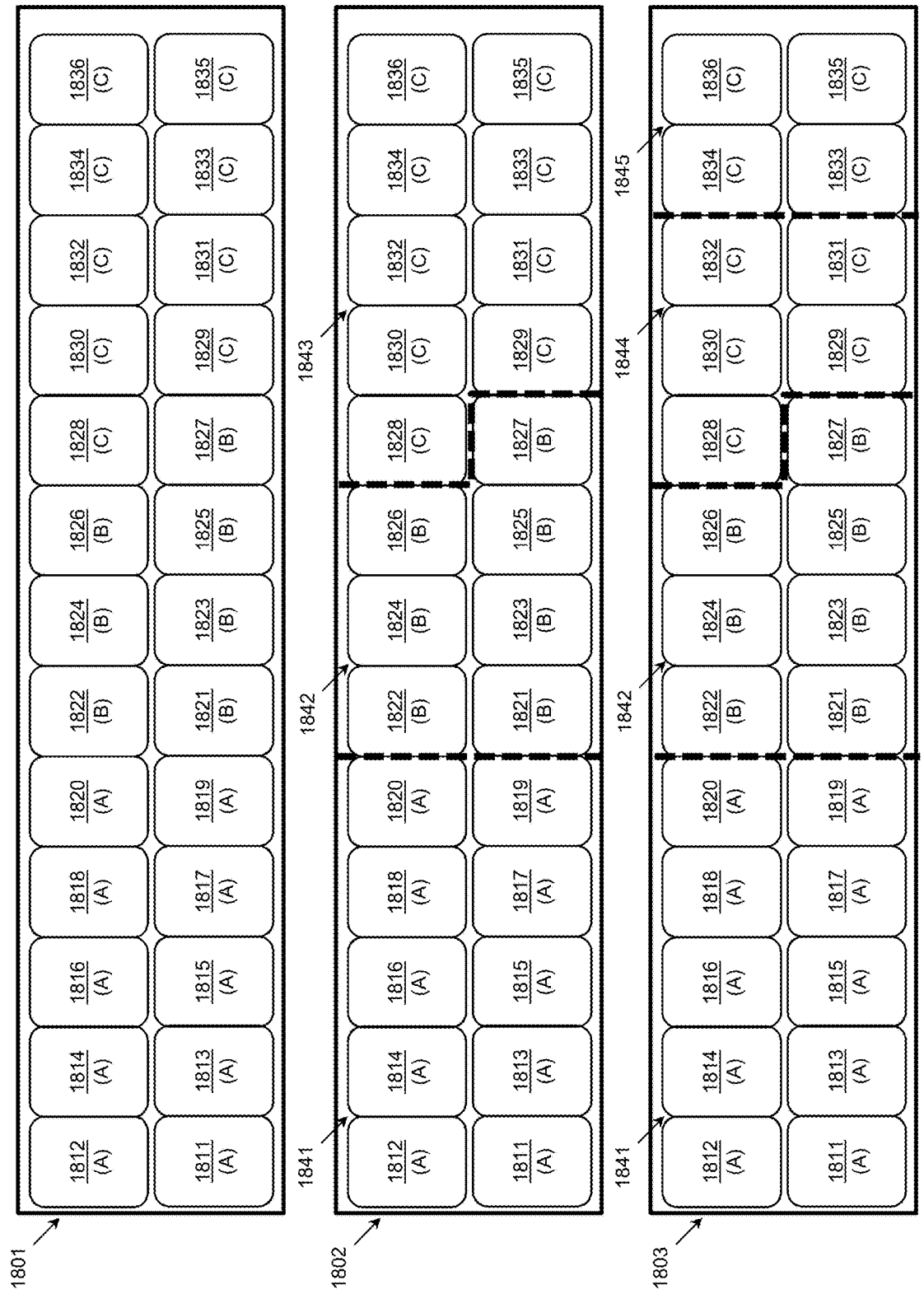
FIGS. 18A and 18B illustrate top plan views of load designs for a dry trailer, showing a progression from an original load design to load designs with fluid groups that are updated until the fluid groups are feasible.
Figure 18B:
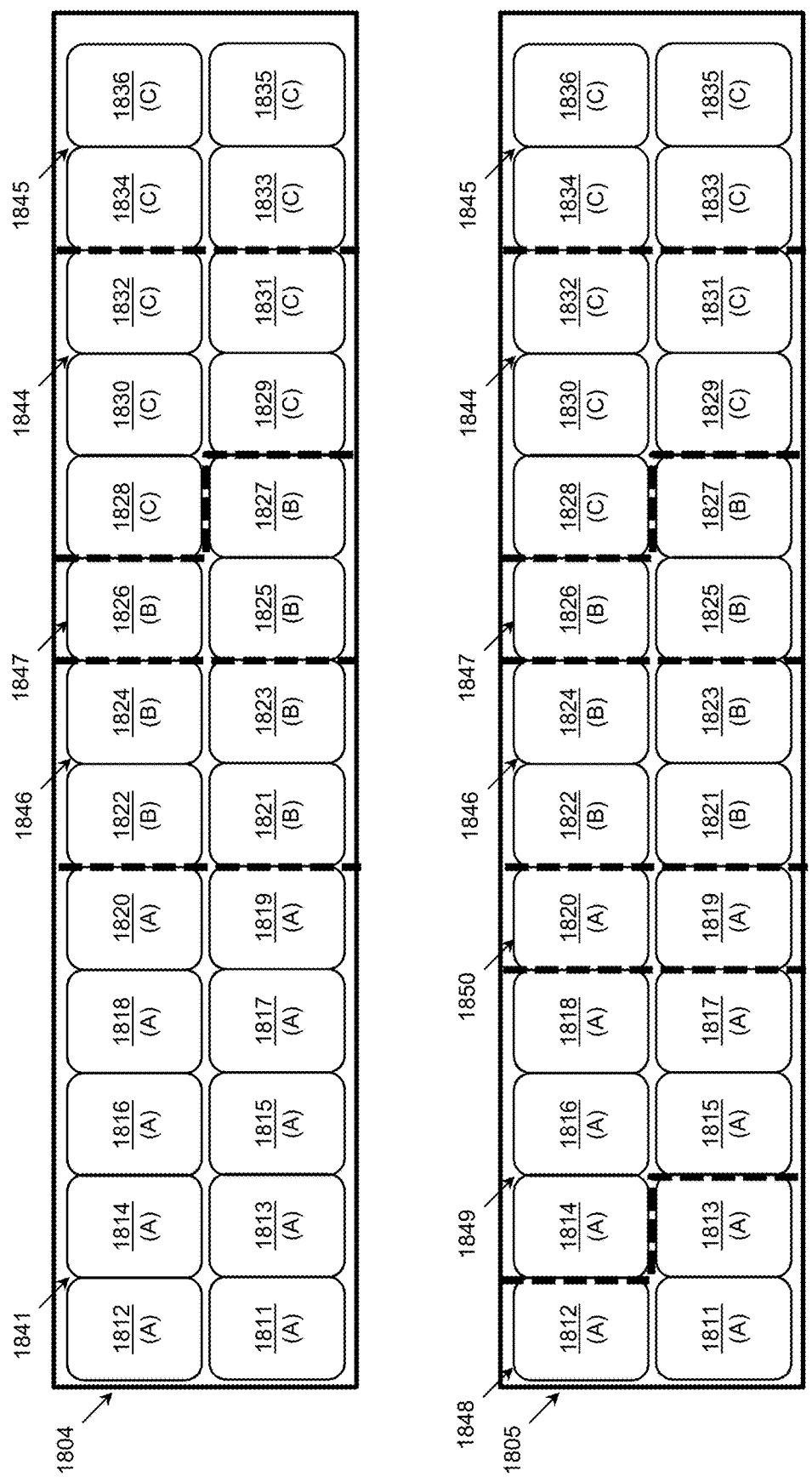

Turning ahead in the drawings, FIGS. 18A and 18B illustrate top plan views of load designs 1801-1805 for a dry trailer, showing a progression from an original load design 1801 to load designs 1802-1805 with fluid groups that are updated until the fluid groups are feasible, as shown in load design 1805. Load design 1801 can be a feasible load design that is received as an input in block 1710 (FIG. 17), which can specify floor positions for stacks 1811-1836. In load design 1801, stacks 1811-1836 are in a single container of the trailer at the same temperature. Stacks 1811-1836 are from separate orders, to be delivered at different physical stores (e.g., 360 (FIG. 3)). As shown in load design 1801, stacks 1811-1820 are for part or all of an order A, stacks 1821-1827 are for part or all of an order B, and stacks 1828-1836 are for part or all of an order C. In order to eliminate unloading and reloading of stacks, stacks 1811-1820 for order A can be loaded first (at the front of the trailer, which is on the left side of FIGS. 18A and B) because these stacks will be delivered at the last stop of the route, stacks 1821-1827 for order B can be loaded second because these stacks will be delivered at the second to last stop of the route, and stacks 1828-1836 for order C can be loaded last because these stacks will be delivered at the first stop of the route.

Load design 1802 shows an update to load design 1801 that includes groupings by store-container. There is a single container in this dry trailer, but the stacks will be delivered to three different stores, associated with orders A, B, and C, respectively. Accordingly, the stacks can be grouped into fluid groups 1841, 1842, and 1843. As shown in load design 1802, fluid group 1841 includes stacks 1811-1820 to be delivered to a first store associated with order A, fluid group 1842 includes stacks 1821-1827 to be delivered to a second store associated with order B, and fluid group 1843 includes stacks 1828-1836 to be delivered to a third store associated with order C. In this example, the trailer can deliver first to the third store, then to the second store, then to the first store.

In many embodiments, the fluid groups can be generated to determine groupings of stacks that can be loaded interchangeably in different floor spots within the same fluid group, which can advantageously allow a loader of the trailer using the load map with these groupings to have greater flexibility when loading the trailer. This greater flexibility with "fluid loading" can beneficially allow a loader to load a trailer faster and/or with less effort, as stacks are sometimes provided in an order that does not match the loading order (e.g., an order proceeding from 1811 to 1836). For example, pallets are sometimes built out of order due to inconsistencies in picking times, which can result in delays building certain stacks. If stack 1813 is available to be loaded before stack 1811 is available to be loaded, and/or if stack 1813 is positioned at the loading dock in a position that is more readily available to be accessed than stack 1811, it can be beneficial to load stack 1813 before loading stack 1811.

The generation of fluid groups 1841-1843 can be begin the process of determine fluid groups in which, for each fluid group, the loading of the respective stacks within the fluid group is fully interchangeable. The initial groupings generated in block 1720 (FIG. 17), such as fluid groups 1841-1843, are the largest possible groups, as the stacks within each store-container group are not interchangeable with other store-container groups. However, these initial groupings, namely fluid groups 1841-1843, can be infeasible, because loading the stacks in different floor spots can result in changes to the front-to-rear center of gravity and side-to-side center of gravity, which can violate center-of-gravity constraints. Accordingly, the fluid groups (e.g., 1841-1843) can be updated, such as split into additional fluid groups, to determine fluid groups that are collectively feasible, satisfying the center-of-gravity constraints.

In several embodiments, method 1700 additionally can include a block 1730 of determining whether the fluid groups are collectively feasible with any arrangement of respective stacks within each of the fluid groups. In some embodiments, in order to determine if the fluid groups are feasible, an axle weight feasibility check and/or a road/curb side balance feasibility check can be performed. The axle weight feasibility check can determine whether the load design, with the current fluid groups, satisfies the following conditions:

$$COG_{lb} \leq COG_{heavy\text{-}to\text{-}light} \leq COG_{light\text{-}to\text{-}heavy} \leq COG_{ub}$$

where $COG_{lb}$ is the lower bound of the range of positions of the center of gravity, $COG_{heavy\text{-}to\text{-}light}$ is the lowest position of the center of gravity for this load design with the current fluid groups as determined based on arranging the respective stacks within each of the fluid groups from heaviest-to-lightest (when viewed front-to-rear), $COG_{light\text{-}to\text{-}heavy}$ is the highest position of the center of gravity for this load design with the current fluid groups as determined based arranging the respective stacks within each of the fluid group from lightest-to-heaviest (when viewed front-to-rear), and $COG_{ub}$ is the upper bound of the range of positions of the center of gravity. These COG positions can be calculated as described above. The center inequality, $COG_{heavy\text{-}to\text{-}light} \leq COG_{light\text{-}to\text{-}heavy}$, will be satisfied in all cases, so the determination of axle weight feasibility can be based on the first and third inequalities being satisfied.

The road/curb side balance feasibility check can determine whether the load design, with the current fluid groups, satisfies the following conditions:

$$WDiff_{HR} \leq W_{threshold} \text{ and } WDiff_{LR} \leq W_{threshold}$$

where $WDiff_{HR}$ is an absolute difference of road side weight and curb side weight when the heaviest stacks are arranged on the road side of the trailer, $WDiff_{LR}$ is an absolute difference of road side weight and curb side weight when the lightest stacks are arranged on the road side of the trailer, and $W_{threshold}$ is a weight threshold. The weight threshold can be a suitable value that limits the side-to-side COG position from moving too far from the middle to prevent the trailer from tipping to one side or the other during transport. For example, for a dry truck fully loaded, which can generally have a fully loaded weight of approximately 45,000 to 50,000 pounds, the weight threshold can be 5,000 pounds. Other suitable weight thresholds can be used.

When block 1730 is not satisfied, method 1700 further can include a block 1740 of determining the most infeasible group from among the fluid groups. In many embodiments, when the axle weight feasibility check is not satisfied, the most infeasible group can be the fluid group that has the largest COG variation between when the fluid group is loaded heaviest-to-lightest versus when the fluid group is loaded lightest-to-heaviest. In several embodiments, when the road/curb side balance feasibility check is not satisfied, the most infeasible group can be the fluid group that has the largest road/curb side variation between when the fluid group is loaded with the heaviest stacks on the road side versus when the fluid group is loaded with the lightest stacks on the road side. If both of the feasibility checks are not satisfied, one of the two options described can be selected to determine the most infeasible group. In many embodiments, the most infeasible group can be the fluid group that contributes the most to the one or more feasibility checks not being satisfied. For example, in the example shown in load design 1802 in FIG. 18A, it can be determined that fluid group 1843 is the most infeasible group from among fluid groups 1841-1843.

Continuing with FIG. 17, in several embodiments, method 1700 additionally can include a block 1750 of splitting the most infeasible group into two fluid groups. In many embodiments, the most infeasible group can be split evenly to divide in half to the number of stacks in the most infeasible group (or close to evenly when the infeasible group has an odd number of stacks). In other embodiments, the split of the groups can be less evenly, or the split can be based on the weights of the stacks within the most infeasible group. In many embodiments, each of the two new fluid groups can be a contiguous group of stacks. For example, as shown in the progression from load design 1802 to load design 1803 of FIG. 18A, fluid group 1843 can be split into two groups, fluid group 1844 and fluid group 1845. Fluid group 1844 can include five stacks, namely stacks 1828-1832, and fluid group 1845 can include four stacks, namely stacks 1833-1836.

Returning to FIG. 17, after block 1750, the flow of method 1700 can return to block 1730 of determining whether the fluid groups are collectively feasible with any arrangement of respective stacks within each of the fluid groups. As long as the fluid groups, as updated, are still collectively infeasible, the flow of method 1700 can repeatedly proceed through blocks 1740 and 1750, then back to block 1730. For example, as shown in the progression from load design 1803 of FIG. 18A to load design 1804 of FIG. 18B, after fluid group 1843 was split into fluid groups 1844-1845, load design 1803 is still infeasible with fluid groups 1841, 1842, 1844, and 1845, so the most infeasible group can be determined, which can be fluid group 1842. Fluid group 1842 can be split into fluid groups 1846 and 1847. Similarly, fluid group 1841 can be split, through a series of splits, into fluid groups 1848, 1849, and 1850, as shown in the progression from load design 1804 to load design 1805. In this example, the fluid groups in load design 1805 can be determined to meet the feasibility requirements in block 1730 (FIG. 17). In the worst case, the fluid groups would be split until each fluid groups includes a single stack. Because the original load design is feasible, this worst case load design single stack fluid groups would be feasible.

Continuing with FIG. 17, when block 1730 is satisfied, method 1700 further can include a block 1760 of outputting the groupings of the fluid groups, which can be fluid groups that satisfy the feasibility checks in block 1730. For example, as shown in FIG. 18B, the output can include load design 1805, which specifies the groupings as fluid groups 1844-1850, with the stacks included in each of those fluid groups and the floor spots to which each of those fluid groups are assigned. Within each fluid group, the stacks assigned to the fluid group can be loaded in the floor spot positions in any arrangement and still maintain feasibility. A flexible load map, such as load design 1805, can beneficially provide flexibility to a loader that is loading stacks into the trailer. For example, load design 1801 specified the floor spot assignment for each stack, allowing for a single loading arrangement. By contrast, load design 1805 includes seven fluid groups, namely fluid groups 1848, 1849, 1850, 1846, 1847, 1844, and 1844, with sizes 3, 5, 2, 4, 3, 5, and 4, respectively. Thus, load design 1805 can be loaded in 597,196,800 different arrangements (calculated by 3!5!2!4!3!5!4!). This flexibility can increase loading productivity and/or can mitigate the effects of mismatches in pallet picking and loading.

For certain types of shipments, fluid loading is commonly performed, as the stacks are homogeneous. For example, a trailer delivering stacks with pallets of cans of soft drinks can include a trailer containing stacks each having identical contents and identical weights. In such cases, a load design is not used, as the stacks themselves are interchangeable. When the stacks are heterogeneous, with differing weights, the variations in weights can result in feasibility issues when loading the stacks unless the floor positions for the stacks are specified, as described above in generating an original load design. By updating the original load design to add fluid groups, the positions of the stacks can still be controlled to maintain feasibility, while nonetheless providing flexibility in loading.

Figure 19:
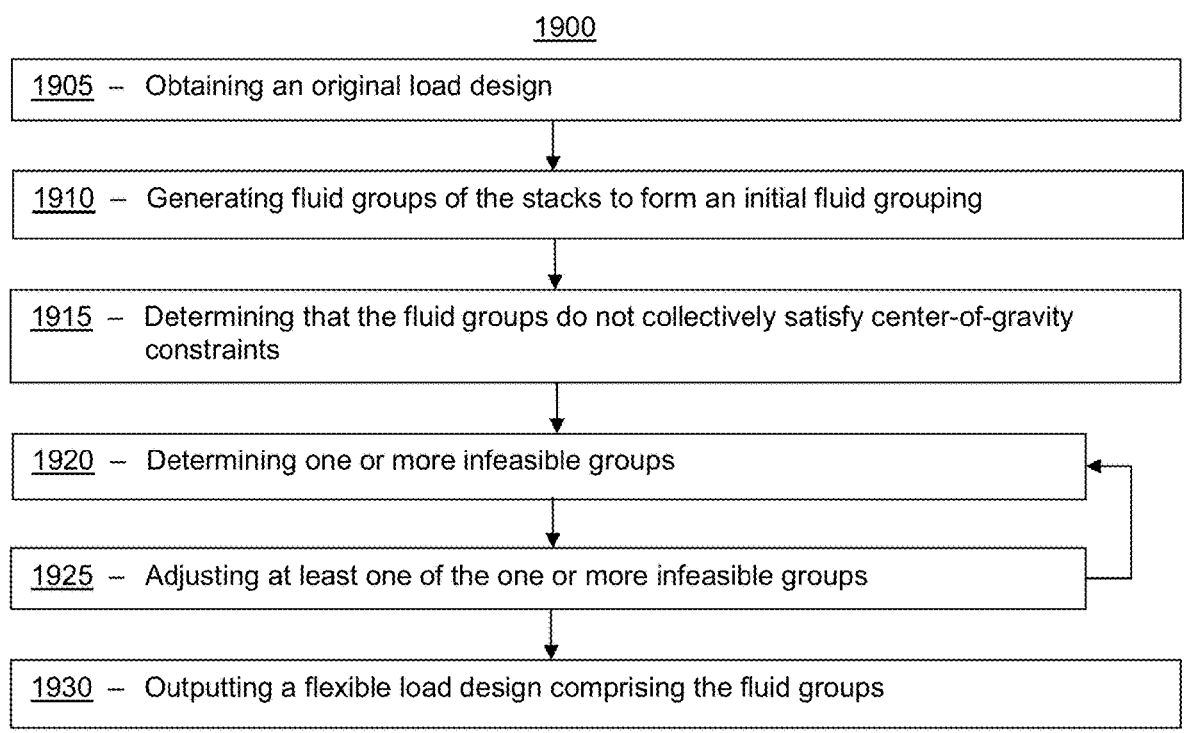
FIG. 19 illustrates a flow chart for a method, according to another embodiment.

Turning ahead in the drawings, FIG. 19 illustrates a flow chart for a method 1900, according to an embodiment. In some embodiments, method 1900 can be a method of automatically determining a flexible load design, according to an embodiment. Method 1900 is merely exemplary and is not limited to the embodiments presented herein. Method 1900 can be employed in many different embodiments or examples not specifically depicted or described herein. In some embodiments, the procedures, the processes, and/or the activities of method 1900 can be performed in the order presented. In other embodiments, the procedures, the processes, and/or the activities of method 1900 can be performed in any suitable order. In still other embodiments, one or more of the procedures, the processes, and/or the activities of method 1900 can be combined or skipped. Method 1900 can be similar to method 1700 (FIG. 17), and various activities of method 1900 can be similar or identical to various activities of method 1700 (FIG. 17).

In many embodiments, load and route design system 300 (FIG. 3) can be suitable to perform method 1900 and/or one or more of the activities of method 1900. In these or other embodiments, one or more of the activities of method 1900 can be implemented as one or more computing instructions configured to run at one or more processors and configured to be stored at one or more non-transitory computer readable media. Such non-transitory computer readable media can be part of load and route design system 300. The processor(s) can be similar or identical to the processor(s) described above with respect to computer system 100 (FIG. 1).

In some embodiments, method 1900 and other blocks in method 1600 can include using a distributed network including distributed memory architecture to perform the associated activity. This distributed architecture can reduce the impact on the network and system resources to reduce congestion in bottlenecks while still allowing data to be accessible from a central location.

Referring to FIG. 19, method 1900 can include a block 1905 of obtaining an original load design for loading a trailer to deliver stacks of pallets to physical stores. The load design can be similar or identical to the load design output in block 1625 (FIG. 16). Block 1905 can be similar or identical to block 1710 (FIG. 17). In many embodiments, the load design can specify a respective floor spot assignment for each of the stacks. In a number of embodiments, the original load design can satisfy center-of-gravity constraints. The center-of-gravity constraints can be similar or identical to the center-of-gravity constraints can be similar or identical to the center-of-gravity described above, including, for example, that the COG of the load design is between $COG_{lb}$ and $COG_{ub}$, and/or that the absolute difference in weight between the curbside and roadside weight is less than or equal to a weight threshold, such as 5000 pounds or another suitable weight threshold.

In a number of embodiments, method 1900 also can include a block 1910 of generating fluid groups of the stacks to form an initial fluid grouping. Block 1910 can be similar or identical to block 1720 (FIG. 17). The fluid groups can be groupings of the stacks. In some embodiments, generating the fluid groups of the stacks further can include generating the fluid groups of the stacks in the initial fluid groupings based at least in part on: (i) the physical stores to which the stacks are to be delivered, and (ii) one or more containers of the trailer to which the stacks are assigned in the original load design. For example, the fluid groups can be similar or identical to fluid groups 1841-1843, which can form the initial fluid grouping.

In several embodiments, method 1900 additionally can include a block 1915 of determining that the fluid groups do not collectively satisfy the center-of-gravity constraints. Block 1915 can be similar or identical to block 1730 (FIG. 17). In other embodiments, the initial fluid groups can satisfy the center-of-gravity constraints, in which case, the flow of method 1900 can proceed to block 1930, described below. The center-of-gravity constraints can be similar or identical to the center-of-gravity constraints described above in connection with block 1730 (FIG. 17). The center-of-gravity constraints can be the same as described above in connection with block 1905, but can be applied to the fluid groups based on testing the options of the stacks being arrange within each of the fluid groups, heaviest in the front, heaviest in the rear, heaviest roadside, and heaviest curbside.

In many embodiments, block 1915 of determining that the fluid groups do not collectively satisfy the center-of-gravity constraints can include determining if a lower bound center-of-gravity constraint is satisfied when the stacks in the fluid groups are arranged heaviest frontward in each of the fluid groups. The lower bound center-of-gravity constraint can be similar or identical to $COG_{lb}$ described above. In several embodiments, block 1915 of determining that the fluid groups do not collectively satisfy the center-of-gravity constraints can include determining if an upper bound center-of-gravity constraint is satisfied when the stacks in the fluid groups are arranged heaviest rearward in each of the fluid groups. The upper bound center-of-gravity constraint can be similar or identical to $COG_{ub}$ described above. In many embodiments, block 1915 of determining that the fluid groups do not collectively satisfy the center-of-gravity constraints can include determining if a first side-to-side weight difference is within a threshold weight when the stacks in the fluid groups are arranged heaviest roadside in each of the fluid groups. The first side-to-side weight difference can be similar or identical to $WDiff_{HR}$ described above. The threshold weight can be similar or identical to $W_{threshold}$ described above. In some embodiments, the threshold weight can be approximately 5,000 pounds. In some embodiments, block 1915 of determining that the fluid groups do not collectively satisfy the center-of-gravity constraints can include determining a second side-to-side weight difference is within the threshold weight when the stacks in the fluid groups are arranged lightest roadside in each of the fluid groups. The second side-to-side weight difference can be similar or identical to $WDiff_{LR}$ described above. In several embodiments, it can be determined that the fluid groups do not collectively satisfy the center-of-gravity constraints when one or more of these conditions is not satisfied.

In a number of embodiments, method 1900 further can include a block 1920 of determining one or more infeasible groups from the fluid groups. Block 1920 can be similar or identical to block 1740 (FIG. 17). In some embodiments, the one or more infeasible groups can be the most infeasible group. In other embodiments, the one or more infeasible groups can include fluid groups in which the front-to-rear COG variation between the heaviest frontward and lightest frontward loading arrangements exceeds a threshold, a percentage of the weight of the stack group, or a percentage of the weight of the overall load design; and/or can include fluid groups in which the road/curb side weight difference between the heaviest roadside and lightest roadside loading arrangements exceeds a threshold, a percentage of the weight of the stack group, or a percentage of the weight of the overall load design.

In several embodiments, method 1900 additionally can include a block 1925 of adjusting at least one of the one or more infeasible groups to update the fluid groups. Block 1925 can be similar or identical to block 1750 (FIG. 17). In some embodiments, block 1925 of adjusting at least one of the one or more infeasible groups to update the fluid groups can include determining a first group of the fluid groups that is most infeasible. For example, the first group that is most infeasible can be determined as described above in connection with block 1740 (FIG. 17). In a number of embodiments, determining the first group of the fluid groups that is most infeasible can include determining the first group based on one or more of front-to-rear center-of-gravity variations of the fluid groups or side-to-side weight differences of the fluid groups. For example, the first group can be the fluid group with the largest front-to-rear COG variation between the heaviest frontward and lightest frontward loading arrangement or the largest road/curb side weight difference between the heaviest roadside and lightest roadside loading arrangement.

In a number of embodiments, block 1925 of adjusting at least one of the one or more infeasible groups to update the fluid groups can include a first option of splitting the first group into two subgroups to update the fluid groups, which can be similar as described above in connection with block 1750 (FIG. 17). For example, as shown in the progression from load design 1802 to load design 1803 of FIG. 18A, fluid group 1843 can be split into fluid groups 1844 and 1845.

Returning to FIG. 19, in some embodiments, block 1925 of adjusting at least one of the one or more infeasible groups to update the fluid groups can include a second option of moving a stack from a second fluid group to an adjacent fluid group. In several embodiments, the second fluid group and the adjacent fluid group can both be part of a same initial fluid group of the initial fluid groupings. In some embodiments, at least one of the second fluid group and the adjacent fluid group can be part of the one or more infeasible groups. For example, stack 1832 (FIG. 18A) can be moved from fluid group 1844 (FIG. 18A) to fluid group 1845 (FIG. 18A). In many embodiments, this second option of moving a stack from a second fluid group to an adjacent fluid group will not be used during the first iteration of block 1925, but can be used after there has been a split of at least one fluid group in the initial fluid groupings, as stacks are not moved across the initial fluid groupings.

Returning to FIG. 19, in several embodiments, block 1925 of adjusting at least one of the one or more infeasible groups to update the fluid groups can include a third option of combining two of the fluid groups. In many embodiments, this third option of combining fluid group will not be used during the first iteration of block 1925, but can be used after there has been a split of at least one fluid group in the initial fluid groupings, as the initial fluid groupings are not combined.

In some embodiments, a single option can be used to adjust at least one of the infeasible groups. In other embodiments, more than one option can be used before re-evaluating whether the fluid groups, as updated, are feasible. For example, if the third option of combining two fluid groups is used, the fluid groups, as updated, will remain infeasible, but a different split of that combined fluid group can be performed. In many embodiments, blocks 1920 and 1925 can be performed repeatedly until the fluid groups, as updated, satisfy the center-of-gravity constraints. For example, blocks 1920 and 1925 if block 1915 is performed again and it is determined that the fluid groups, as updated, are infeasible. Once the fluid groups, as updated, are collective feasible, the flow of method 1900 can proceed to block 1930, described below.

In a number of embodiments, method 1900 further can include a block 1930 of outputting a flexible load design comprising the fluid groups that collectively satisfy the center-of-gravity constraints. In several embodiments, the flexible load design can specify respective floor spot assignments for a respective set of stacks for each respective fluid group of the fluid groups, and the stacks within the respective set of stacks for the each respective fluid group are interchangeable, to satisfy the center-of-gravity constraints, among the respective floor spot assignments for the each respective fluid group. For example, in load design 1805 of FIG. 18B, stacks 1811, 1812, and 1813 of fluid group 1848 can be loaded in any arrangement for any of the positions shown for stacks 1811-1813, which allows six arrangements of loading options for fluid group 1848 (e.g., (1) 1811, 1812, 1813; (2) 1811, 1813, 1812; (3) 1812, 1811, 1813; (4) 1812, 1813, 1811; (6) 1813, 1811, 1812; and (6) 1813, 1812, 1811). Similarly, stacks 1814-1818 of fluid group 1849 can be loaded in any arrangement for any of the positions shown for stacks 1814-1818, which allows 120 arrangement of loading options for fluid group 1849. Fluid groups 1850, 1846, 1847, 1844, and 1845 similarly each allow for multiple different arrangements of the stacks within each of the fluid groups.

Turning ahead in the drawings, FIG. 20 illustrates a user interface display 2010 of an original load design for a tri-temp trailer and a user interface display 2020 of a flexible load design that includes fluid groups for the tri-temp trailer. In many embodiments, user interface display 2010 can include an original load design, such as the load design output in block 1625 (FIG. 16). The original load design can include a table of rows, with roadside and curbside cells columns for each row. Each cell can include information about a stack assigned to that row and side (roadside or curbside). For example, the information about the stack can include a stack identifier, such as ID 1581, which can be used to identify the stack; a store number, such as S3380, which can identify the store and/or order to which the stack is associated; a weight, such as 2495 pounds (lbs), which can indicate a weight of the stack; and an orientation, which can indicate in which orientation the stack is to be loaded at that row and side specified. W" refers to wide orientation, in which the wider (e.g., 48 inch wide) side of the stack faces the rear of the trailer (e.g., the wide side of the stack is visible from the rear immediately after the stack is loaded); and "N" refers to narrow orientation, in which the narrower (e.g., 40 inch wide) side of the stack faces the rear of the trailer. The orientation can be relevant for trailers having an inside width of approximately 90 inches to approximately 98 inches, as the inside width can be large enough to allow one of the stacks in each row to be in the wide orientation, but not wide enough to allow both of the stacks in each row to be in the wide orientation. In some embodiments, user interface display 2010 can include a temperature column, which can indicate a temperature of the compartment for the row.

For the load design shown in user interface display 2010, there will be a first bulkhead installed after rows 1 and 2, so that rows 1 and 2 can be set to a freezing temperature of −20° F. (Fahrenheit). A second bulkhead will be installed after row 9 roadside and row 10 curbside. Due to the orientation of the stacks, the roadside stacks in the second compartment from rows 3 to 9 extend further rearward than the curbside stacks in the second compartment from rows 3 to 9, so there can be a curbside stack in row 10 in this compartment. The bulkhead is nonetheless straight across from side-to-side. This second compartment between the first bulkhead and the second bulkhead can be set to a refrigeration temperature of 32° F. A third compartment behind the second bulkhead can include roadside rows 10 to 13 and curbside rows 11 to 13. The third compartment can be set to a freezing temperature of −20° F., similar to the first compartment.

User interface display 2020 can be displayed after generating a flexible load design, which can include fluid groups that are feasible. The flexible load design can be similar or identical to the output in block 1760 (FIG. 17) and/or block 1930 (FIG. 19). The flexible load design can include the table of the original load design, with additional information showing the fluid groups. As shown in user interface display 2020, a first fluid group can include roadside and curbside rows 1 and 2. A second fluid group can include roadside rows 3 to 5 and curbside rows 3 to 6. A third fluid group can include roadside rows 6 to 9 and curbside rows 7 to 10. A fourth fluid group can include roadside rows 10 to 13 and curbside rows 11 to 13.

Returning to FIG. 3, in several embodiments, communication system 301 can at least partially perform block 505 (FIG. 5) of receiving orders from physical stores for fulfillment from a distribution center, block 1710 (FIG. 17) of receiving one or more inputs, block 1760 (FIG. 17) of outputting the groupings of the fluid groups, block 1905 (FIG. 19) of obtaining an original load design for loading a trailer to deliver stacks of pallets to physical stores, and/or block 1930 (FIG. 19) of outputting a flexible load design comprising the fluid groups that collectively satisfy the center-of-gravity constraints.

In several embodiments, order initiation system 302 can at least partially perform block 410 (FIG. 4) of receiving orders and performing initial processing, and/or block 505 (FIG. 5) of receiving orders from physical stores for fulfillment from a distribution center.

In a number of embodiments, stack building system 303 can at least partially perform block 420 (FIG. 4) of stack building, and/or block 510 (FIG. 5) of generating a stack building plan for each of the orders using simulated annealing.

In several embodiments, routing system 304 can at least partially perform block 430 (FIG. 4) of route optimization and load building, block 460 (FIG. 4) of storing initial load design, block 470 (FIG. 4) of storing the delivery routes, block 515 (FIG. 5) of obtaining routes for delivering the orders in trailers from the distribution center to the physical stores based at least in part on the stack building plan, block 910 (FIG. 9) of route construction, block 920 (FIG. 9) of route improvement, block 930 (FIG. 9) of services, block 1010 (FIG. 10) of receiving inputs, block 1020 (FIG. 10) of processing, block 1030 (FIG. 10) of responding with an output, block 1105 (FIG. 11) of obtaining orders for fulfillment to physical stores from a distribution center, block 1110 (FIG. 11) of generating a set of feasible route templates for delivering the orders to the physical stores, block 1115 (FIG. 11) of formulating a mixed integer programming formulation for an assignment of the respective stack groups associated with the orders to the set of route templates, block 1120 (FIG. 11) of using an optimization solver for the mixed integer programming formation to determine the assignment that minimizes an overall cost of delivering the orders to the physical stores from the distribution center, block 1125 (FIG. 11) of outputting the assignment, block 1205 (FIG. 12) of obtaining a sequence of stops and service time windows for the stops, block 1210 (FIG. 12) of generating a sequence of driver states that satisfies the sequence of stops, block 1215 (FIG. 12) of determining, for each pair of respective sequential driver states from the sequence of driver states, whether to generate a respective recommendation to add a respective additional driver state within the respective sequential driver states in order to satisfy a set of rules, block 1220 (FIG. 12) of updating the sequence of driver states based on the respective recommendations, such that the sequence of driver states is feasible in view of the service time windows and the set of rules, and/or block 1225 (FIG. 12) of outputting the sequence of driver states.

In a number of embodiments, load design system 305 can at least partially perform block 480 (FIG. 4) of completing the load design, block 490 (FIG. 4) of storing the final load designs, block 520 (FIG. 5) of generating a load design for each of the routes to deliver in a trailer of the trailers a load for one or more of the orders, block 1605 (FIG. 16) of obtaining a route for delivering one or more orders in a trailer from a distribution center to physical stores in a sequence of stops, block 1610 (FIG. 16) of determining a load design for the stacks in the trailer based on the sequence of the stops in the route, block 1615 (FIG. 16) of updating the load design using a first simulated annealing to adjust a front-to-rear center-of-gravity of the load design, block 1620 (FIG. 16) of updating the load design using a second simulated annealing to adjust a side-to-side center-of-gravity of the load design, block 1625 (FIG. 16) of outputting the load design, as updated by the first simulated annealing and the second simulated annealing, block 1720 (FIG. 17) of grouping the stacks by store and container, block 1730 (FIG. 17) of determining whether the fluid groups are collectively feasible with any arrangement of respective stacks within each of the fluid groups, block 1740 (FIG. 17) of determining the most infeasible group from among the fluid groups, block 1750 (FIG. 17) of splitting the most infeasible group into two fluid groups, block 1910 (FIG. 19) of generating fluid groups of the stacks to form an initial fluid grouping, block 1915 (FIG. 19) of determining that the fluid groups do not collectively satisfy the center-of-gravity constraints, block 1920 (FIG. 19) of determining one or more infeasible groups from the fluid groups, and/or block 1925 (FIG. 19) of adjusting at least one of the one or more infeasible groups to update the fluid groups In many embodiments, the techniques described herein can provide a practical application and several technological improvements. In some embodiments, the techniques described herein can provide for automatic generation of load and route designs using specific inputs and machine-implemented simulated annealing to determine stacks, routes, and loads that minimize travel distance and/or time and comply with applicable constraints. These techniques described herein can provide a significant improvement over conventional approaches of building stacks, designing routes, and/or designing loads without considering the breadth of possible options. Further, when considering these aspects collectively, additional improvements can be derived. Moreover, these designs are improvements over other possible approaches, such as subjective estimates, greedy heuristic approaches, and constraint programming. In a number of embodiments, the techniques described herein can provide an algorithmic approach for rapidly creating and adjusting fluid groups, with a rapid load feasibility check for the load groupings. For example, in some embodiments, these techniques can be performed in real-time. In several embodiments, a flexible loading design can be presented to a user, such as a loader, in an intuitive and easy-to-use format, which in some embodiments, includes minimal additional information yet nonetheless displays the fluid groupings.

In many embodiments, the techniques described herein can be used continuously at a scale that cannot be handled using manual techniques. For example, the number of loads from each distribution center per day can exceed a hundred or more.

In a number of embodiments, the techniques described herein can solve a technical problem that arises only within the realm of computer networks, as automatic solutions do not exist outside the realm of computer networks. Moreover, the techniques described herein can solve a technical problem that cannot be solved outside the context of computer networks. Specifically, the techniques described herein cannot be used outside the context of computer networks, in view of a lack of data, and because the simulated annealing approach cannot be performed without a computer.

Various embodiments include a system. The system can include one or more processors and one or more non-transitory computer-readable media storing computing instructions configured to run on the one or more processors and perform certain acts. The acts can include receiving orders from physical stores for fulfillment from a distribution center, each of the orders comprising a set of items and a requested delivery date. The acts also can include generating a stack building plan for each of the orders using simulated annealing. The acts additionally can include obtaining routes for delivering the orders in trailers from the distribution center to the physical stores based at least in part on the stack building plan. The acts further can include generating a load design for each of the routes to deliver in a trailer of the trailers a load for one or more of the orders, such that floor spot assignments for stacks for each of the one or more of the orders in the load carried by the trailer satisfy sequence-of-delivery constraints and center-of-gravity constraints.

Several embodiments include a method. The method can be implemented via execution of computing instructions configured to run at one or more processors and stored at one or more non-transitory computer-readable media. The method can include receiving orders from physical stores for fulfillment from a distribution center, each of the orders comprising a set of items and a requested delivery date. The method also can include generating a stack building plan for each of the orders using simulated annealing. The method further can include obtaining routes for delivering the orders in trailers from the distribution center to the physical stores based at least in part on the stack building plan. The method additionally can include generating a load design for each of the routes to deliver in a trailer of the trailers a load for one or more of the orders, such that floor spot assignments for stacks for each of the one or more of the orders in the load carried by trailer satisfy sequence-of-delivery constraints and center-of-gravity constraints.

Various embodiments include a system. The system can include one or more processors and one or more non-transitory computer-readable media storing computing instructions configured to run on the one or more processors and perform certain acts. The acts can include obtaining a sequence of stops and service time windows for the stops. The acts also can include generating a sequence of driver states that satisfies the sequence of the stops. The acts further can include determining, for each pair of respective sequential driver states from the sequence of driver states, whether to generate a respective recommendation to add a respective additional driver state within the respective sequential driver states in order to satisfy a set of rules. The acts additionally can include updating the sequence of driver states based on the respective recommendations, such that the sequence of driver states is feasible in view of the service time windows and the set of rules. The acts further can include outputting the sequence of driver states.

Several embodiments include a method. The method can be implemented via execution of computing instructions configured to run at one or more processors and stored at one or more non-transitory computer-readable media. The method can include obtaining a sequence of stops and service time windows for the stops. The method also can include generating a sequence of driver states that satisfies the sequence of the stops. The method further can include determining, for each pair of respective sequential driver states from the sequence of driver states, whether to generate a respective recommendation to add a respective additional driver state within the respective sequential driver states in order to satisfy a set of rules. The method additionally can include updating the sequence of driver states based on the respective recommendations, such that the sequence of driver states is feasible in view of the service time windows and the set of rules. The method further can include outputting the sequence of driver states.

Various embodiments include a system. The system can include one or more processors and one or more non-transitory computer-readable media storing computing instructions configured to run on the one or more processors and perform certain acts. The acts can include obtaining a route for delivering one or more orders in a trailer from a distribution center to physical stores in a sequence of stops. The route can have an associated assignment of stack groups comprising stacks of pallets. The acts also can include determining a load design for the stacks in the trailer based on the sequence of the stops in the route. The acts additionally can include updating the load design using a first simulated annealing to adjust a front-to-rear center-of-gravity of the load design. The acts further can include updating the load design using a second simulated annealing to adjust a side-to-side center-of-gravity of the load design. The acts additionally can include outputting the load design, as updated by the first simulated annealing and the second simulated annealing. The load design can specify a respective floor spot assignment for each of the stacks.

Several embodiments include a method. The method can be implemented via execution of computing instructions configured to run at one or more processors and stored at one or more non-transitory computer-readable media. The method can include obtaining a route for delivering one or more orders in a trailer from a distribution center to physical stores in a sequence of stops. The route can have an associated assignment of stack groups comprising stacks of pallets. The method also can include determining a load design for the stacks in the trailer based on the sequence of the stops in the route. The method additionally can include updating the load design using a first simulated annealing to adjust a front-to-rear center-of-gravity of the load design. The method further can include updating the load design using a second simulated annealing to adjust a side-to-side center-of-gravity of the load design. The method additionally can include outputting the load design, as updated by the first simulated annealing and the second simulated annealing. The load design can specify a respective floor spot assignment for each of the stacks.

Various embodiments include a system. The system can include one or more processors and one or more non-transitory computer-readable media storing computing instructions configured to run on the one or more processors and perform certain acts. The acts can include obtaining orders for fulfillment to physical stores from a distribution center. There can be one or more respective stack groups associated with each of the orders. The acts also can include generating a set of feasible route templates for delivering the orders to the physical stores. The acts additionally can include formulating a mixed integer programming formulation for an assignment of the respective stack groups associated with the orders to the set of route templates. The acts further can include using an optimization solver for the mixed integer programming formation to determine the assignment that minimizes an overall cost of delivering the orders to the physical stores from the distribution center. The acts additionally can include outputting the assignment.

Several embodiments include a method. The method can be implemented via execution of computing instructions configured to run at one or more processors and stored at one or more non-transitory computer-readable media. The method can include obtaining orders for fulfillment to physical stores from a distribution center. There can be one or more respective stack groups associated with each of the orders. The method also can include generating a set of feasible route templates for delivering the orders to the physical stores. The method additionally can include formulating a mixed integer programming formulation for an assignment of the respective stack groups associated with the orders to the set of route templates. The method further can include using an optimization solver for the mixed integer programming formation to determine the assignment that minimizes an overall cost of delivering the orders to the physical stores from the distribution center. The method additionally can include outputting the assignment.

Various embodiments include a system. The system can include one or more processors and one or more non-transitory computer-readable media storing computing instructions that, when executed on the one or more processors, perform certain acts. The acts can include obtaining an original load design for loading a trailer to deliver stacks of pallets to physical stores. The load design specifies a respective floor spot assignment for each of the stacks. The original load design satisfies center-of-gravity constraints. The acts also can include generating fluid groups of the stacks to form an initial fluid grouping. The acts additionally can include determining that the fluid groups do not collectively satisfy the center-of-gravity constraints. The acts further can include until the fluid groups collectively satisfy the center-of-gravity constraints, repeatedly determining one or more infeasible groups from the fluid groups, and adjusting at least one of the one or more infeasible groups to update the fluid groups. The acts additionally can include outputting a flexible load design comprising the fluid groups that collectively satisfy the center-of-gravity constraints.

Several embodiments include a method implemented via execution of computing instructions at one or more processors. The method can include obtaining an original load design for loading a trailer to deliver stacks of pallets to physical stores. The load design specifies a respective floor spot assignment for each of the stacks. The original load design satisfies center-of-gravity constraints. The method also can include generating fluid groups of the stacks to form an initial fluid grouping. The method additionally can include determining that the fluid groups do not collectively satisfy the center-of-gravity constraints. The method further can include until the fluid groups collectively satisfy the center-of-gravity constraints, repeatedly determining one or more infeasible groups from the fluid groups, and adjusting at least one of the one or more infeasible groups to update the fluid groups. The method additionally can include outputting a flexible load design comprising the fluid groups that collectively satisfy the center-of-gravity constraints.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although automatic generation of load and route designs and automatic generation of flexible load design and automatic generation of flexible load design has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-20 may be modified, and that the foregoing discussion of certain of these embodiments does not necessarily represent a complete description of all possible embodiments. For example, one or more of the procedures, processes, or activities of FIGS. 4-5, 9-12, 16-17, and 19 may include different procedures, processes, and/or activities and be performed by many different modules, in many different orders, and/or one or more of the procedures, processes, or activities of FIGS. 4-5, 9-12, 16-17, and 19 may include one or more of the procedures, processes, or activities of another different one of FIGS. 4-5, 9-12, 16-17 and 19. As another example, the systems within load and route design system 300 (FIG. 3) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
obtaining an original load design for loading a trailer to deliver stacks of pallets to physical stores, wherein the original load design specifies a respective floor spot assignment for each of the stacks in the trailer, and wherein the original load design satisfies center-of-gravity constraints;
generating fluid groups of the stacks to form an initial fluid grouping of initial fluid groupings, wherein:
generating the fluid groups is based on one or more containers of the trailer to which the stacks are assigned in the original load design;
the fluid groups comprise groupings of the stacks that are configured to be loaded interchangeably in different floor spots within each respective fluid group; and
the stacks within a respective set of the stacks for each respective fluid group are interchangeable, to satisfy the center-of-gravity constraints, among respective floor spot assignments for each respective fluid group;
determining that the fluid groups do not collectively satisfy the center-of-gravity constraints, comprising determining when an upper bound center-of-gravity constraint is satisfied when the stacks of the fluid groups are arranged heaviest rearward in each of the fluid groups;
until the fluid groups collectively satisfy the center-of-gravity constraints in a final load design, repeatedly:
determining one or more infeasible groups from the fluid groups, wherein the one or more infeasible groups comprise at least one feasibility check unsatisfied; and
adjusting at least one of the one or more infeasible groups to update the fluid groups; and
outputting the final load design comprising the fluid groups that collectively satisfy the center-of-gravity constraints to cause the stacks to be loaded into the trailer according to the final load design for delivery to the physical stores according to respective delivery routes, wherein the final load design satisfies the center-of-gravity constraints and specifies the respective floor spot assignments for each respective set of stacks for each respective fluid group of the fluid groups.

2. The system of claim 1, wherein:
generating the fluid groups of the stacks to form the initial fluid groupings is further based on the physical stores to which the stacks are to be delivered.

3. The system of claim 1, wherein determining that the fluid groups do not collectively satisfy the center-of-gravity constraints further comprises:

determining when a lower bound center-of-gravity constraint is satisfied when the stacks of the fluid groups are arranged heaviest frontward in each of the fluid groups.

4. The system of claim 1, wherein determining that the fluid groups do not collectively satisfy the center-of-gravity constraints further comprises:
determining when a first side-to-side weight difference is within a threshold weight when the stacks of the fluid groups are arranged heaviest roadside in each of the fluid groups; and
determining a second side-to-side weight difference is within the threshold weight when the stacks of the fluid groups are arranged lightest roadside in each of the fluid groups.

5. The system of claim 4, wherein the threshold weight is 5,000 pounds plus or a minus ten percent.

6. The system of claim 1, wherein:
adjusting the at least one of the one or more infeasible groups further comprises:
determining a first group of the fluid groups that is most infeasible, wherein a most infeasible first group of the fluid groups contributes more than remaining infeasible groups of the fluid groups to cause the at least one feasibility check to remain unsatisfied; and
splitting the first group into two subgroups to update the fluid groups; and
the computing instructions, when executed by the one or more processors, further cause the one or more processors to perform:
determining that the fluid groups do collectively satisfy the center-of-gravity constraints wherein each fluid group of the fluid groups in a final load design collectively satisfies at least an axle weight feasibility check in an arrangement of respective stacks within each of the fluid groups.

7. The system of claim 6, wherein determining the first group of the fluid groups that is most infeasible further comprises:
determining the first group based on one or more of front-to-rear center-of-gravity variations of the fluid groups or side-to-side weight differences of the fluid groups.

8. The system of claim 1, wherein adjusting the at least one of the one or more infeasible groups further comprises:
moving a stack from a second fluid group to an adjacent fluid group, wherein the second fluid group and the adjacent fluid group were both part of a same initial fluid group of the initial fluid groupings, and wherein at least one of the second fluid group and the adjacent fluid group are part of the one or more infeasible groups.

9. The system of claim 1, wherein adjusting the at least one of the one or more infeasible groups further comprises:
combining two of the fluid groups.

10. The system of claim 1, wherein:
each respective set of stacks within each respective fluid group of the fluid groups of the final load design are interchangeable.

11. A method implemented via execution of computing instructions configured to run on one or more processors and stored at one or more non-transitory media, the method comprising:
obtaining an original load design for loading a trailer to deliver stacks of pallets to physical stores, wherein the original load design specifies a respective floor spot assignment for each of the stacks in the trailer, and wherein the original load design satisfies center-of-gravity constraints;
generating fluid groups of the stacks to form an initial fluid grouping of initial fluid groupings, wherein:
generating the fluid groups is based on one or more containers of the trailer to which the stacks are assigned in the original load design;
the fluid groups comprise groupings of the stacks that are configured to be loaded interchangeably in different floor spots within each respective fluid group; and
the stacks within a respective set of the stacks for each respective fluid group are interchangeable, to satisfy the center-of-gravity constraints, among respective floor spot assignments for each respective fluid group;
determining that the fluid groups do not collectively satisfy the center-of-gravity constraint, comprising determining when an upper bound center-of-gravity constraint is satisfied when the stacks of the fluid groups are arranged heaviest rearward in each of the fluid groups;
until the fluid groups collectively satisfy the center-of-gravity constraints in a final load design, repeatedly:
determining one or more infeasible groups from the fluid groups, wherein the one or more infeasible groups comprise at least one feasibility check unsatisfied; and
adjusting at least one of the one or more infeasible groups to update the fluid groups; and
outputting the final load design comprising the fluid groups that collectively satisfy the center-of-gravity constraints to cause the stacks to be loaded into the trailer according to the final load design for delivery to the physical stores according to respective delivery routes, wherein the final load design satisfies the center-of-gravity constraints and specifies the respective floor spot assignments for each respective set of stacks for each respective fluid group of the fluid groups.

12. The method of claim 11, wherein:
generating the fluid groups of the stacks to form the initial fluid groupings based on the physical stores to which the stacks are to be delivered.

13. The method of claim 11, wherein determining that the fluid groups do not collectively satisfy the center-of-gravity constraints further comprises:
determining when a lower bound center-of-gravity constraint is satisfied when the stacks of the fluid groups are arranged heaviest frontward in each of the fluid groups.

14. The method of claim 11, wherein determining that the fluid groups do not collectively satisfy the center-of-gravity constraints further comprises:
determining when a first side-to-side weight difference is within a threshold weight when the stacks of the fluid groups are arranged heaviest roadside in each of the fluid groups; and
determining a second side-to-side weight difference is within the threshold weight when the stacks of the fluid groups are arranged lightest roadside in each of the fluid groups.

15. The method of claim 14, wherein the threshold weight is 5,000 pounds plus or a minus ten percent.

16. The method of claim 11, wherein:
adjusting at least one of the one or more infeasible groups further comprises:

determining a first group of the fluid groups that is most infeasible, wherein a most infeasible first group of the fluid groups contributes more than remaining infeasible groups of the fluid groups to cause the at least one feasibility check to remain unsatisfied; and splitting the first group into two subgroups to update the fluid groups; and further comprising:

determining that the fluid groups do collectively satisfy the center-of-gravity constraints wherein each fluid group of the fluid groups in a final load design collectively satisfies at least an axle weight feasibility check in an arrangement of respective stacks within each of the fluid groups.

17. The method of claim 16, wherein determining the first group of the fluid groups that is most infeasible further comprises:

determining the first group based on one or more of front-to-rear center-of-gravity variations of the fluid groups or side-to-side weight differences of the fluid groups.

18. The method of claim 11, wherein adjusting at least one of the one or more infeasible groups further comprises:

moving a stack from a second fluid group to an adjacent fluid group, wherein the second fluid group and the adjacent fluid group were both part of a same initial fluid group of the initial fluid groupings, and wherein at least one of the second fluid group and the adjacent fluid group are part of the one or more infeasible groups.

19. The method of claim 11, wherein adjusting at least one of the one or more infeasible groups further comprises:

combining two of the fluid groups.

20. The method of claim 11, wherein:

each respective set of stacks within each respective fluid group of the fluid groups of the final load design are interchangeable.

\* \* \* \* \*